(12) United States Patent
Haberkamp et al.

(10) Patent No.: US 10,583,720 B2
(45) Date of Patent: Mar. 10, 2020

(54) FOLDING SLANTED BACK SOFT TOP ASSEMBLY FOR SUV

(71) Applicant: Bestop, Inc., Louisville, CO (US)

(72) Inventors: William H. Haberkamp, Rochester Hills, MI (US); Eric D. Getzschman, New Baltimore, MI (US); Jose N. Vigil, Westminster, CO (US); Andy Waite, Aurora, CO (US); Rick H. Troeger, Westminster, CO (US); Blake A. Jensen, Lafayette, CO (US); James A. Robertson, Thornton, CO (US); Ronald Manzanares, Westminster, CO (US); George C. Stickles, Thornton, CO (US)

(73) Assignee: Bestop, Inc., Louisville, CO (US)

( * ) Notice: Subject to any disclaimer, the term of this patent is extended or adjusted under 35 U.S.C. 154(b) by 37 days.

(21) Appl. No.: 15/861,194

(22) Filed: Jan. 3, 2018

(65) Prior Publication Data
US 2018/0141419 A1 May 24, 2018

Related U.S. Application Data

(63) Continuation-in-part of application No. 15/790,836, filed on Oct. 23, 2017, which is a continuation-in-part of application No. 15/595,396, filed on May 15, 2017.
(Continued)

(51) Int. Cl.
*B60J 7/12* (2006.01)
*B60J 1/18* (2006.01)
*B60J 1/08* (2006.01)

(52) U.S. Cl.
CPC .......... *B60J 7/1204* (2013.01); *B60J 7/1226* (2013.01); *B60J 1/08* (2013.01); *B60J 1/1815* (2013.01)

(58) Field of Classification Search
CPC . B60J 7/061; B60J 7/028; B60J 7/1234; B60J 7/043; B60J 7/1265; B60J 7/1291;
(Continued)

(56) References Cited

U.S. PATENT DOCUMENTS 5,299,850 A 4/1994 Kaneko et al.
6,015,181 A 1/2000 Exner
(Continued)

FOREIGN PATENT DOCUMENTS

BE 350963 A 4/1928
DE 19544619 A1 6/1997
(Continued)

OTHER PUBLICATIONS

International Search Report for Application No. PCT/US2017/032715, datd Aug. 24, 2017.
(Continued)

*Primary Examiner* — D Glenn Dayoan
*Assistant Examiner* — Melissa Ann Bonifazi
(74) *Attorney, Agent, or Firm* — Warn Partners, P.C.

(57) ABSTRACT

An articulating slanted back soft top assembly for 4-door and 2-door SUVs. A fabric cover is supported by a frame that is at least partially articulatable from at least a closed position to at least one open air position. The frame includes at least one forward fabric support bow member and at least one rearward fabric support bow member. The rear fabric support bow member being positioned when in the closed position in a manner which allows the fabric to clear a sport bar or "roll bar" member of a vehicle in the closed position such that a rear portion of the top is angled from the vertical when viewing the vehicle from the side.

24 Claims, 59 Drawing Sheets

Related U.S. Application Data

(60) Provisional application No. 62/336,062, filed on May 13, 2016, provisional application No. 62/411,249, filed on Oct. 21, 2016, provisional application No. 62/441,810, filed on Jan. 3, 2017.

(58) Field of Classification Search
CPC ... B60J 1/085; B60J 1/1823; B60J 1/08; B60J 1/1815; B60J 7/1226; B60J 7/1204
See application file for complete search history.

(56) References Cited

U.S. PATENT DOCUMENTS

| | | |
|---|---|---|
| 6,409,247 B1 | 6/2002 | Maass |
| 6,827,391 B1 | 12/2004 | Kohn et al. |
| 8,845,005 B2 | 9/2014 | Houtari et al. |
| 9,238,400 B2 | 1/2016 | Hanson |
| 9,346,342 B1 | 5/2016 | Bowles |
| 9,827,833 B2 | 11/2017 | Hanson |
| 2001/0030443 A1 | 10/2001 | Barker |
| 2004/0108747 A1 | 6/2004 | Obendiek |
| 2012/0098292 A1 | 4/2012 | Huotari et al. |
| 2012/0286540 A1 | 11/2012 | Moran et al. |
| 2014/0138983 A1 | 5/2014 | Haberkamp et al. |
| 2015/0115646 A1 | 4/2015 | Bowles |

FOREIGN PATENT DOCUMENTS

| | | |
|---|---|---|
| DE | 10102643 A1 | 7/2002 |
| FR | 2937591 A1 | 4/2010 |
| FR | 2943281 A1 | 9/2010 |
| GB | 311081 A | 5/1929 |
| GB | 312485 A | 5/1929 |
| GB | 336514 A | 10/1930 |
| GB | 946781 A | 1/1964 |
| WO | 2004056596 A2 | 7/2004 |

OTHER PUBLICATIONS

International Search Report and Written Opinion for International Application No. PCT/US2011/001816 Filed Oct. 27, 2011.
International Search Report for Application No. PCT/US2015/022716, dated Jun. 12, 2015.

FIG. 66
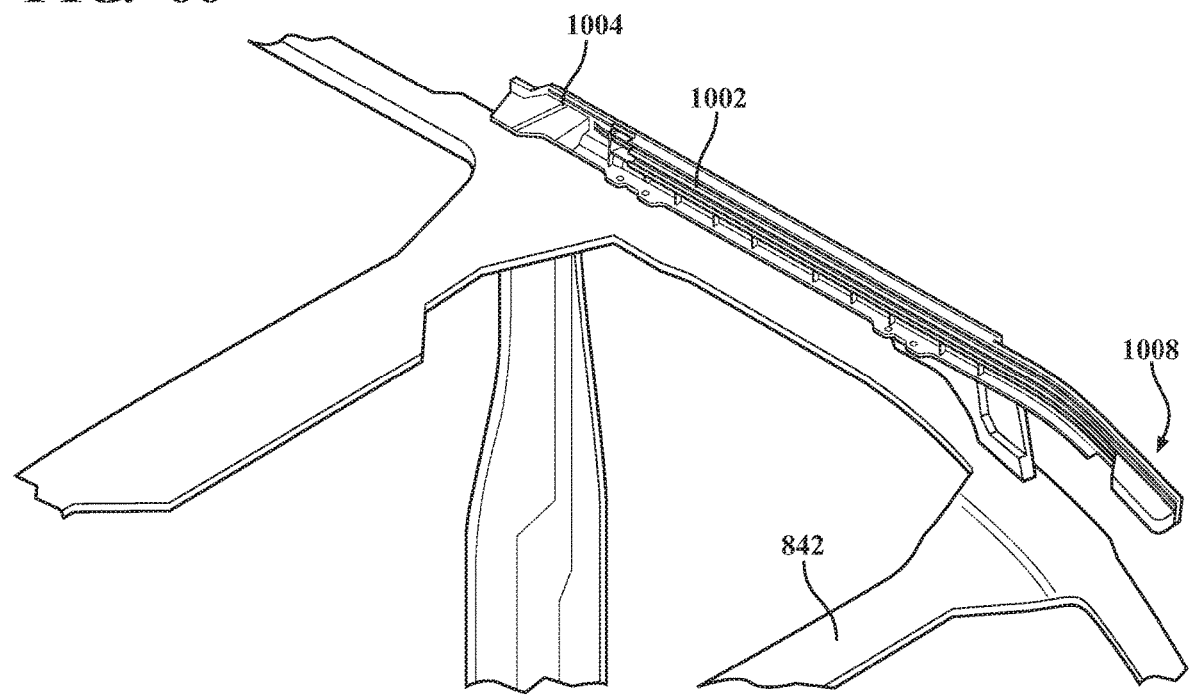
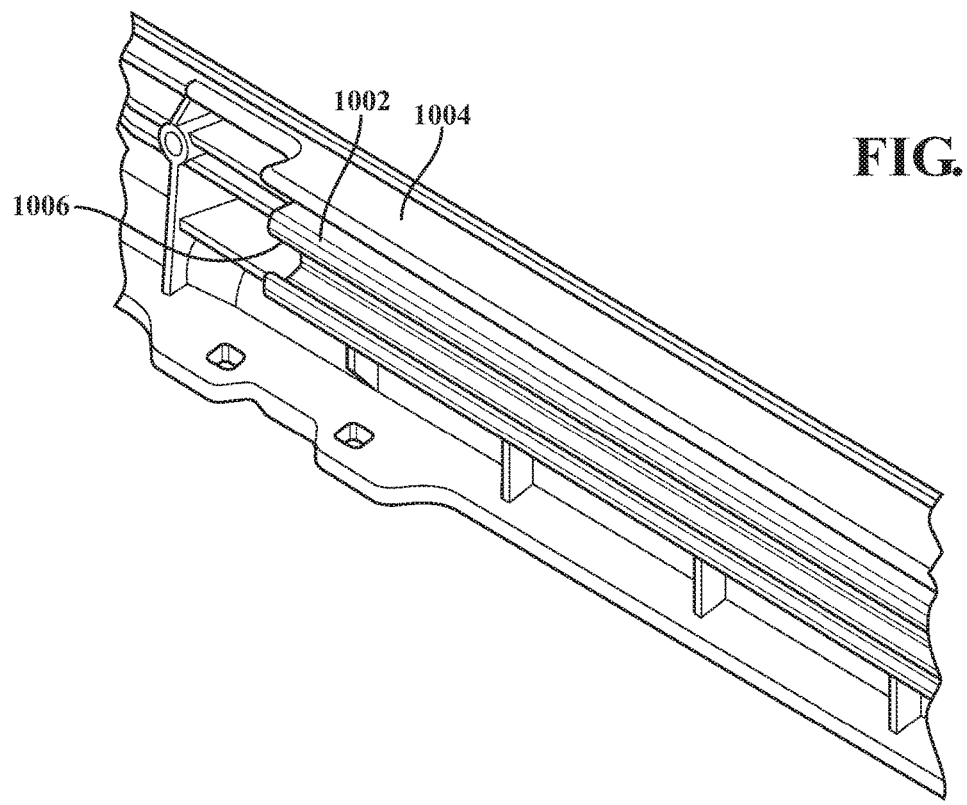
FIG. 67

US 10,583,720 B2

FOLDING SLANTED BACK SOFT TOP ASSEMBLY FOR SUV

CROSS-REFERENCE TO RELATED APPLICATIONS

The instant application is a continuation-in-part of U.S. patent application Ser. No. 15/790,836, filed Oct. 23, 2017, which is a continuation-in-part of U.S. patent application Ser. No. 15/595,396, filed May 15, 2017, which claims the benefit of U.S. Provisional Application No. 62/336,062, filed May 13, 2016, and which also claims the benefit of U.S. Provisional Patent Application No. 62/411,249, filed Oct. 21, 2016. The instant application additionally claims the benefit of U.S. Provisional Patent Application No. 62/441,810, filed Jan. 3, 2017. The disclosures of the above applications are incorporated herein by reference.

FIELD OF THE INVENTION

The present invention relates to a frameless SUV soft top for a vehicle. In particular, the present invention relates to a soft top assembly including a slanted rear window for a sport utility vehicle. The present invention also relates to a tensioning system for incorporation with the soft top.

BACKGROUND OF THE INVENTION

Providing sunroof or convertible tops for sport utility (SUV) type vehicles is desired. In recent years, soft top technology has advanced. In recent years, the use of "frameless" designs (e.g., tops that are not attached to the frame of the SUV) have allowed fold-back sunroof top designs and even completely retractable tops.

Other advances in soft top design has been a sportier and very popular slanted back design. Unfortunately, in the past such slanted designs have required a framed type structure, e.g., a lot of conventional framed features and assembly support bows, such as that are fixed attachment to the frame of the SUV or fixed cross car arches or rear fixed cross car arch. Therefore, typically, customers had a tradeoff decision as to whether they wanted the sporty slanted back look on their vehicle or the open air features and amenities offered in a frameless design.

Known soft top designs do not allow multiple options for conversion of a slanted back top. Furthermore, conventional soft top designs have complicated, difficult and time consuming attachment arrangements for soft goods of the top assembly. Further, conventional soft tops have inadequate tensioning creating rippling effects, flapping or undesired movement or other undesired fit and function of the soft top, e.g., roof deck or window panels, in the installed position on the vehicle, e.g., 2 door or 4 door SUVs.

Therefore, there remains a need in the art for a soft top design with the open air features and amenities of a frameless top design but with the styling features of a slanted back design.

SUMMARY OF THE INVENTION

The present invention is directed to a sliding/folding, or otherwise articulating, slanted back soft top assembly for 4-door and 2-door SUVs, Jeep® type SUVs, the assembly having a slant back window area feature. A soft top cover is supported by a frame that is articulatable from at least a closed position, open air sunroof position and open stowed position(s). The frame includes at least one forward fabric support bow member and at least one rearward fabric support bow member. The rearward fabric support bow member being positioned when in the closed position in a manner which allows the cover to clear a sport bar or "roll bar" member of a vehicle in the closed position such that a rear portion of the top is angled from the vertical when viewing the vehicle from the side. The positioning of the rearward fabric support bow member also allows the cover to clear the sport bar when rotating to the open stowed position. In general, the soft top is mounted to the sport bars to provide lower profile, shape and support, or is mountable to a tub.

The present invention is also directed to a folding slanted back soft top assembly for 4-door and 2-door SUVs, Jeep® type SUVs, or any other suitable type of motor vehicle, the assembly having a slant back window area feature. A soft top cover is supported by a frame including a pivotal portion articulatable from at least a closed position to an open air sunroof position and a rearward fabric support bow member operable to set the height and tensioning of the rear of soft top assembly which is angled downward to adjacent a tailgate opening of the vehicle. The assembly includes quarter windows and a rear window that are slanted back and provide zipperless or substantially zipperless install. The quarter windows and rear window of the soft assembly are separately removable from the assembly/vehicle or articulatable to at least one open position for an open air top down position. The rearward fabric support bow member is position to allow the cover to be positioned over or above the sport bar of the vehicle when the assembly is in the closed or sunroof position while allowing the rear of the assembly to be angled from vertical at a predetermined angle. The rearward fabric support bow member also allows the cover to stay in position when the rear or quarter window(s) are removed.

On a 2-door SUV, the rearward fabric support bow member replaces a rear arch, by way of example, and adjusts the rear window position to avoid contact with the headrest on the rear seats while keeping the slanted back style and appearance. On a 2-door or 4-door SUV, the rearward fabric support bow member can also be quickly removed from the sport bar, e.g., such as by using quick release pivot knuckles for full top down experience.

At least one tensioning system is incorporated with the soft top assembly for adjusting the tension of the assembly to provide adjustment for the attachment position and fabric tension, which also reduces installation effort.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 66 is a perspective view of a door rail with an integrated track, in accordance with an embodiment of the present invention;

FIG. 67 is an enlarged view of FIG. 66;

DETAILED DESCRIPTION OF THE PREFERRED EMBODIMENTS

The following description of the preferred embodiment(s) is merely exemplary in nature and is in no way intended to limit the invention, its application, or uses.

Referring to the FIGS. 1-14 generally, the present invention provides an articulating/folding slanted back soft top assembly or "soft top cover assembly" or "assembly" (used interchangeably herein). A rear support structure provides for the slanted back. The slanted back provides a profile that is angled downward in the rear of the vehicle toward the tailgate. More particularly, a rear window panel is a predetermined angle from the upright position, off-vertical. Generally, at least 15 degrees from vertical, typically at least 20 degrees, preferably at least 25 degrees, most preferably, at least 35 degrees.

The soft top includes an articulating folding frame that folds into a convertible/stowed/down position. The soft top assembly mounts to a vehicle body structure, e.g., body tub or sport bar, most preferably, to the sport bar. Both independently removable and non-removable windows can be incorporated with the assembly (e.g., rear window, rear quarter windows, rear passenger compartment side windows and/or front side windows). The window can be attached to the top deck of the cover and/or stay pad of the cover or with a rear window extrusion mounted to the bow structure or soft goods, e.g., rear window and/or quarter rear windows that are attached by zippers, retainers, P-welt retainers within channels, J hooks, belt rails, door surrounds or any other suitable attachment and combinations thereof. The soft top assembly is incorporated with an articulating portion, including, a sunroof portion, e.g., flip back header, scissor, and/or sliding. The top deck of the cover is attached to a rear most bow provided for the particular slanted back profile/vehicle, e.g., to a main pivoting bow or 3-bow, a 4-bow, 5-bow, etc.

It is understood that the left side of the assemblies are substantially a mirror-image of the right side of the assemblies. Therefore, for example, the rear support includes a pair of upright bows connected to the cross car bow spanning therebetween.

Figure 1:
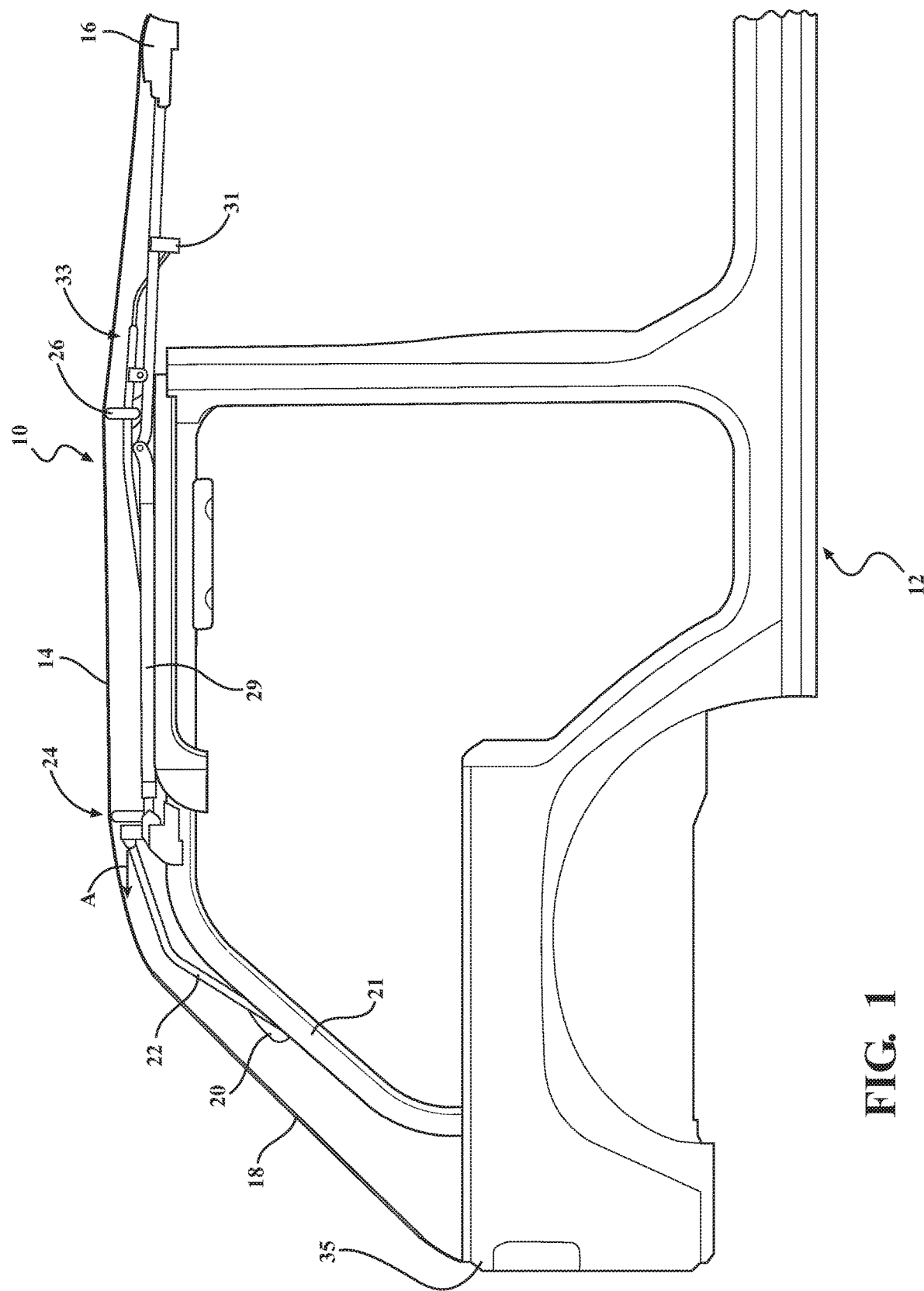
FIG. 1 is a side elevation view of a soft top cover assembly with no 4-bow and having a slanted back window feature and articulating linkage assembly, the assembly is shown in a closed position connected to a 4-door vehicle, in accordance with a first embodiment of the present invention.

FIG. 1 is a side elevation view of a soft top cover assembly shown generally at 10 with no 4-bow, the assembly 10 is shown in a closed position connected to a 4-door SUV vehicle (with portions removed for clarity, e.g., windshield frame, door rails, door surrounds, front sport bars, fasteners to the sport bars, etc) shown generally at 12, in accordance with a first embodiment of the present invention. A cover 14 is connected to a header 16 or "1-bow", which connects cross-car to a windshield frame in the closed position to close out the vehicle interior when desired. The cover 14 is connected to a plurality of bows and moves between at least a closed position, open sunroof position, and open/down position(s) such as folded back behind the rearmost seats for a completely open-air experience. The cover 14 is a soft top material, e.g., twill, sailcloth fabric, etc. A rear window is provided on a panel 18, which is part of the cover 14 or operably connected thereto. The rear window panel 18 is additionally independently removable in one embodiment.

At least one bracket 20 is provided (and optionally incorporated with a lift assist device such as a lockable lift assist) that is connected to one of the bows, preferably an upright bow, most preferably, a 3-bow upright 22. The bracket 20 is connected to the vehicle, preferably the rear sport bar 21, and the 3-bow upright 22 is rotatably connected to the bracket 20 for rotation of the bow 22 between up/down positions. The 3-bow upright 22 is coupled to a bow, preferably, to a 3-bow shown generally at 24, which is a cross vehicle bow and the rearmost cross car bow in this embodiment. The cover 14 top deck is connected to the 3-bow 24. The assembly 10 also includes a 2-bow 26, which is a cross vehicle bow, and a front rail 27 pivotally connected to a rear rail 29 by at least one joint for rotating the header 16 to the open sunroof position. At least one intermediate bow 31 is also provided, such as on a linkage assembly shown generally at 33.

The rear panel 18 angles downward and connects toward the rear or rear corners of the vehicle. In one embodiment, the rear panel 18 is connected to angled upright corners of the rear quarter panels and/or to tailgate bars.

The 3-bow 24 and 3-bow upright 22 helps set the rear height of the top deck/cover transition to the rear window panel.

When the top is closed the material is taut. But when the header 16 is disconnected from the vehicle and rotated rearward to the open sunroof position, the 3-bow can be slid or otherwise moved generally rearward. When the 3-bow 24 is slid back in a rearward direction (as indicated by arrow, "A") to a predetermined location this allows at least one window to be attached by making it easier to reach and manipulate attachment features. According to one embodiment, the articulatable frame is slid in a captive motion track.

Figure 2:
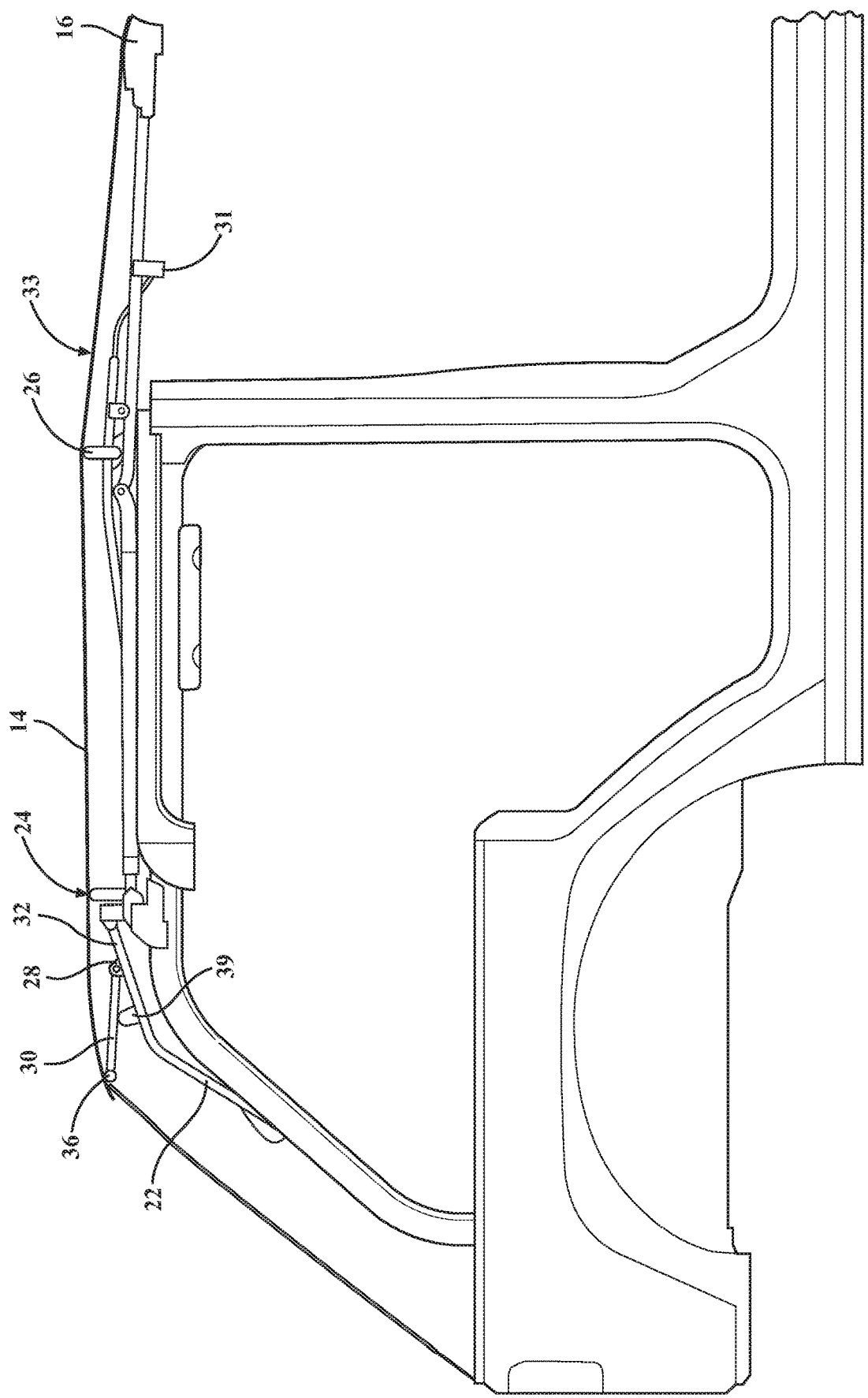
FIG. 2 is a side elevation view of a soft top cover assembly with an articulating 4-bow coupled to a 3-bow upright and having a slanted back window feature and articulating linkage assembly, the assembly is shown in a closed position connected to a 4-door vehicle, in accordance with another embodiment of the present invention.

FIG. 2 is a side elevation view of a soft top cover assembly with an articulating 4-bow 30 rotatably connected to the 3-bow upright 22 at pivot joint 28, the assembly is shown in a closed position connected to a 4-door vehicle (with portions, e.g., front sport bar, removed for clarity), in accordance with another embodiment of the present invention. This embodiment preferably has like components as FIG. 1, however, a bow link 30, preferably, a 4-bow link 30, is provided on a forward portion 32 of the 3-bow upright 22, which 4-bow link 30 is an articulating 4-bow. The 4-bow link 30 is suitably fastened to the 3-bow upright 22, e.g., bolted and/or welded, etc. The 4-bow link 30 has a cross vehicle 4-bow 36 that is connected to the cover 14 top deck. The 4-bow is the rearmost upper bow in this embodiment. The 4-bow 36 sets the rear height of the top deck/cover transition to the rear window panel. A stop 39 is provided on the 3-bow upright 22 to locate the 4-bow link 30/bow 36. Alternatively, stay pad to the rear bow locates.

Figure 3:
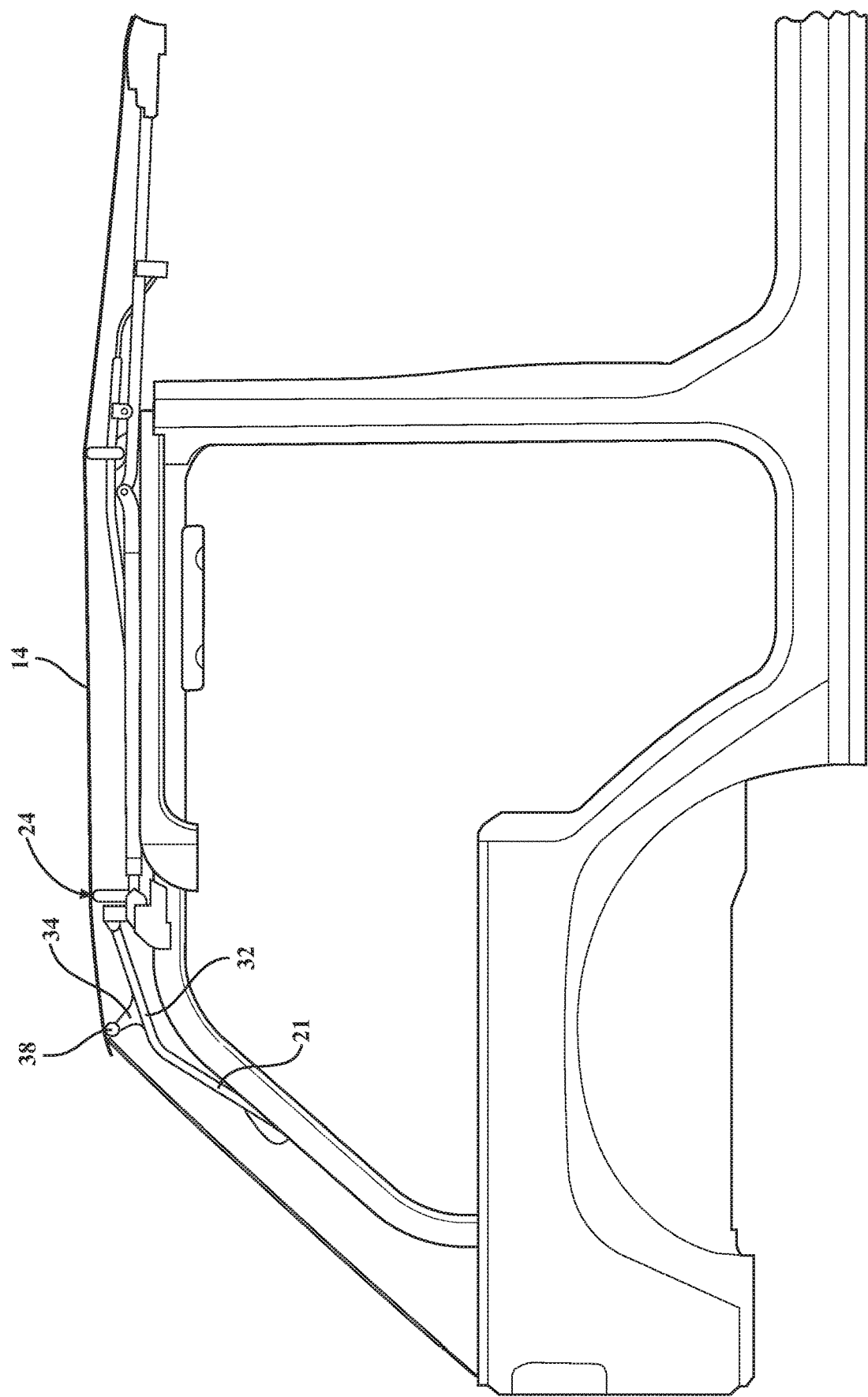
FIG. 3 is a side elevation view of a soft top cover assembly with a fixed 4-bow coupled to a 3-bow upright and having a slanted back window feature, the assembly is shown in a closed position connected to a 4-door vehicle, in accordance with yet another embodiment of the present invention.

FIG. 3 is a side elevation view of a soft top cover assembly with a fixed 4-bow 34 connected to the 3-bow upright 22, the assembly is shown in a closed position connected to a 4-door vehicle (with portions removed for clarity, e.g., windshield frame, front sport bar), in accordance with yet another embodiment of the present invention. This embodiment preferably has like components as FIG. 1, however, a bow 34, preferably, a 4-bow 34, is provided on a forward portion 32 of the 3-bow upright 22, which 4-bow 34 is not an articulating 4-bow. The 4-bow 34 helps set the rear height of the top deck/cover transition to the rear window panel. The 4-bow 34 has a cross vehicle bow 38 that is connected to the cover 14 top deck.

Figure 4:
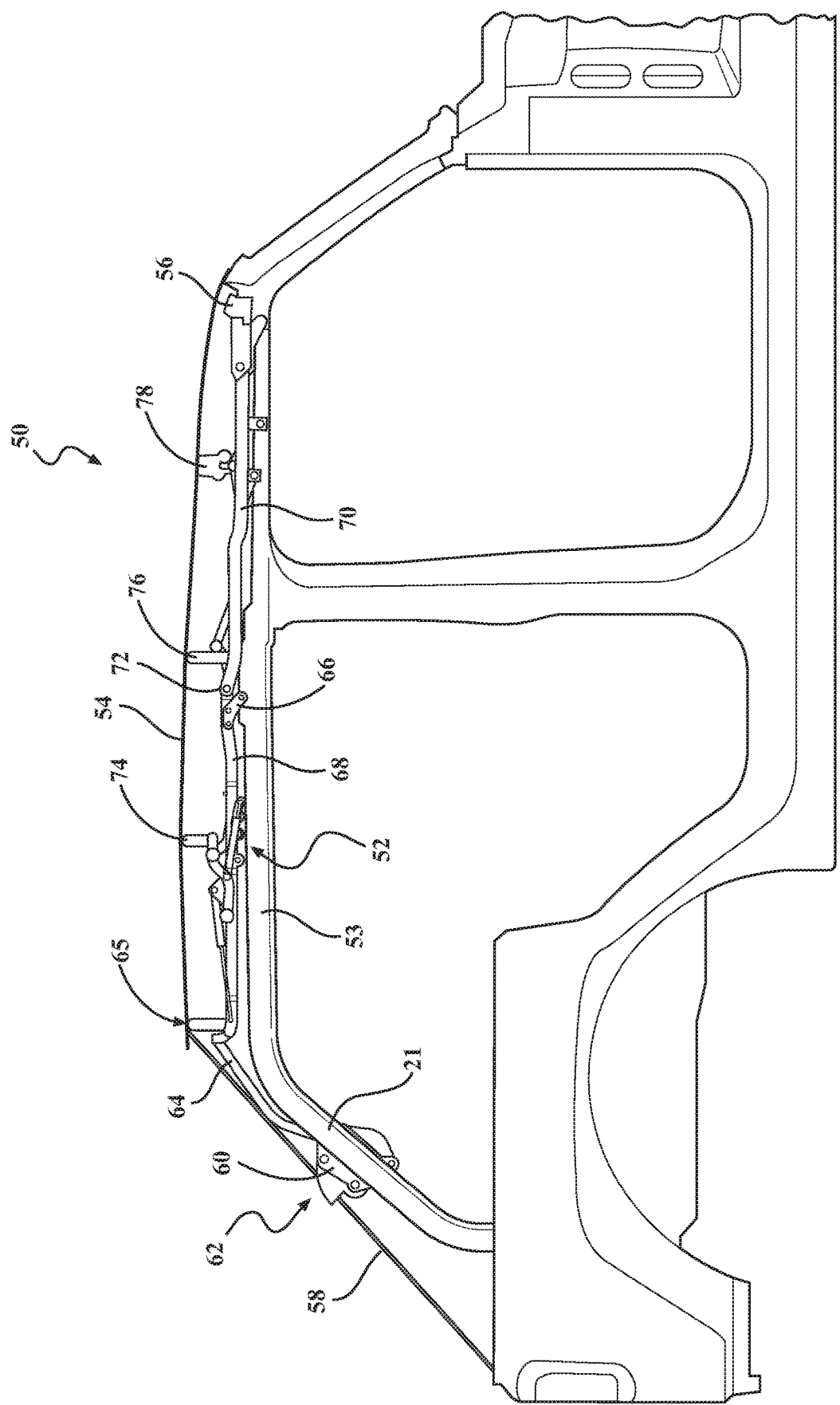
FIG. 4 is a side elevation view of a soft top cover assembly with a rear bow removed and having a slanted back window feature and articulating linkage assembly, the assembly is shown in a closed position connected to a 4-door vehicle, in accordance with another embodiment of the present invention.

FIG. 4 is a side elevation view of a soft top cover assembly shown generally at 50 having a sliding framework indicated generally at 52, the assembly 50 is shown in a closed position connected to a 4-door vehicle, in accordance with another embodiment of the present invention. Preferably, the sliding framework 52 includes rollers guided within guide track(s) that are operably connected to at least the sport bar 53. The guide tracks run fore-aft along the sport bar 53 and may also curve downward to generally follow the rear sport bar 21. Most preferably, at least one bracket 66 is fixedly connected to a linkage 68 of the assembly 50 and is connected to at least one roller that slides in a channel of the track (guide tracks are omitted for clarity). A front rail 70 is pivotally connected to the linkage 68 at least one pivot joint 72 to rotate the front rail 70 to the open sunroof position.

A cover 54 is operably connected to a header 56 or "1-bow", which connects to a windshield frame in the closed position to close out the vehicle interior. The cover 54 is operably connected to a plurality of bows and moves between at least a closed position, open sunroof position, and open/down position(s) (e.g., such as the articulating linkage assembly 418, depicted in FIGS. 21-22 but without the rear bow). A rear window is provided on a panel 58, which is part of the cover 54 or operably connected thereto. The rear window panel 58 is independently removable in one embodiment (e.g., attached by zippers, retainers, P-welt retainers within channels, belt rail or any other suitable attachment and combinations thereof).

At least one bracket 60 is provided (and optionally incorporated with a lift assist device such as a lockable lift assist shown generally at 62), wherein the bracket 60 is operably connected to one of the bows, preferably an upright bow, most preferably, a 5-bow upright 64. The bracket 60 is connected to the vehicle, preferably the rear sport bar 21, and the 5-bow upright 64 is rotatably connected to the bracket 20 for rotation of the bow 64 between up/down positions. The 5-bow upright 64 is coupled to a bow shown generally at 65, preferably, a 5-bow 65, which is a cross vehicle bow. The assembly 10 also includes a 4-bow 74, 3-bow 76 and 2-bow 78, which are cross vehicle bows. There is no rear 6-bow, e.g., connected to the bracket 62 and extending generally upward in a rearward direction.

The 5-bow 65 and 5-bow upright 64 helps set the rear height of the top deck/cover transition to the rear window panel.

Figure 5:
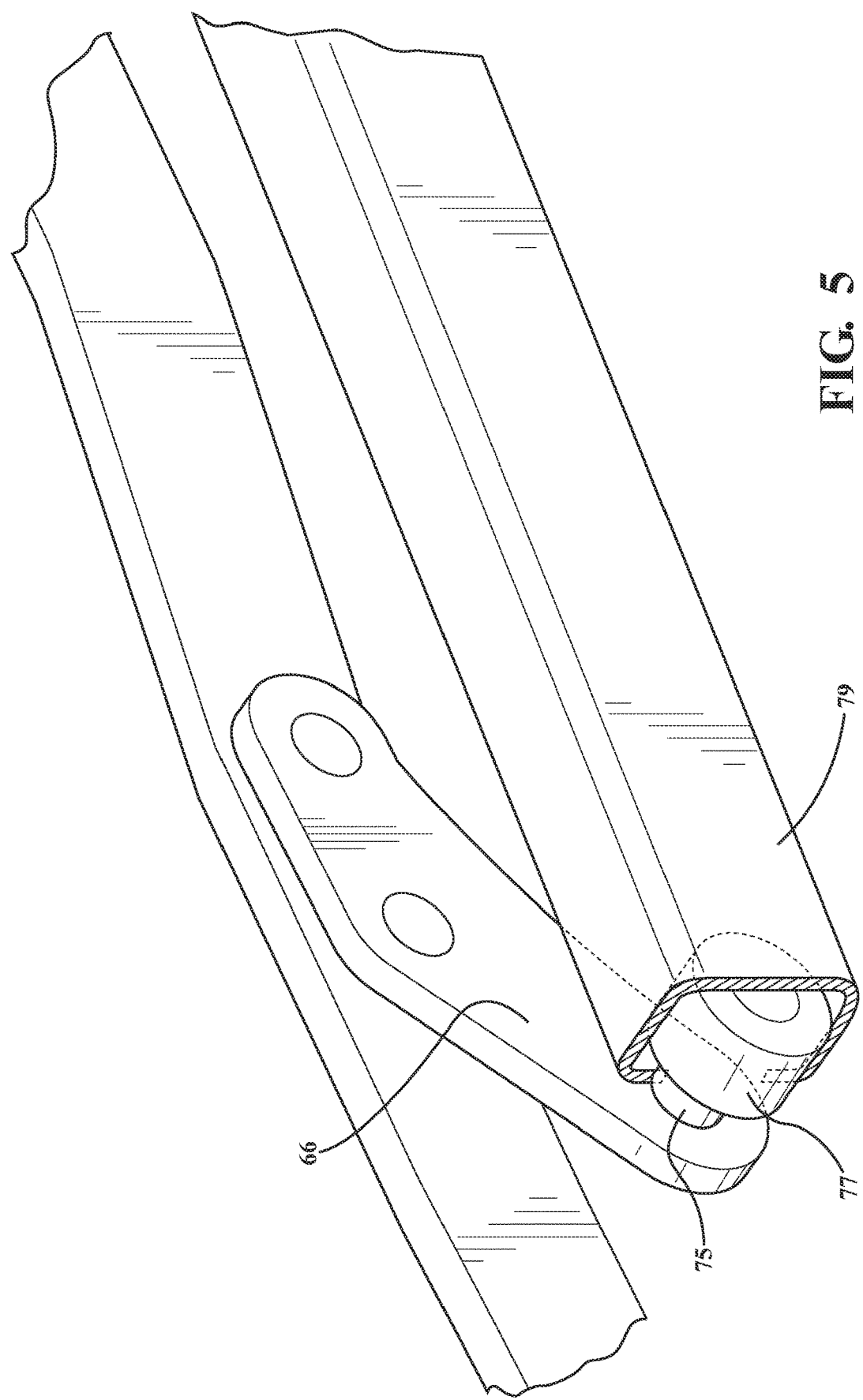
FIG. 5 is a perspective view of a guide roller captured in a track for a soft top cover assembly, according to an embodiment of the present invention.

FIG. 5 depicts an exemplary roller guided in a track. At least one track 79 is connected to the vehicle, e.g., sport bar, and the articulating frame is coupled to the track. Preferably, at least one guide feature retained in the track is slid to move the top rearward to an open/down position. The at least one bracket 66 has a pin 75 connected to at least one roller 79 guided in the guide track 79. The track 79 is connected to the vehicle, preferably, to the sport bar 53 and/or 21 with a plurality of brackets. The roller 77 guided, slid or rolled, in the track 79 moves the top 10 between the open sunroof position and at least one rearward open position.

Figure 6:
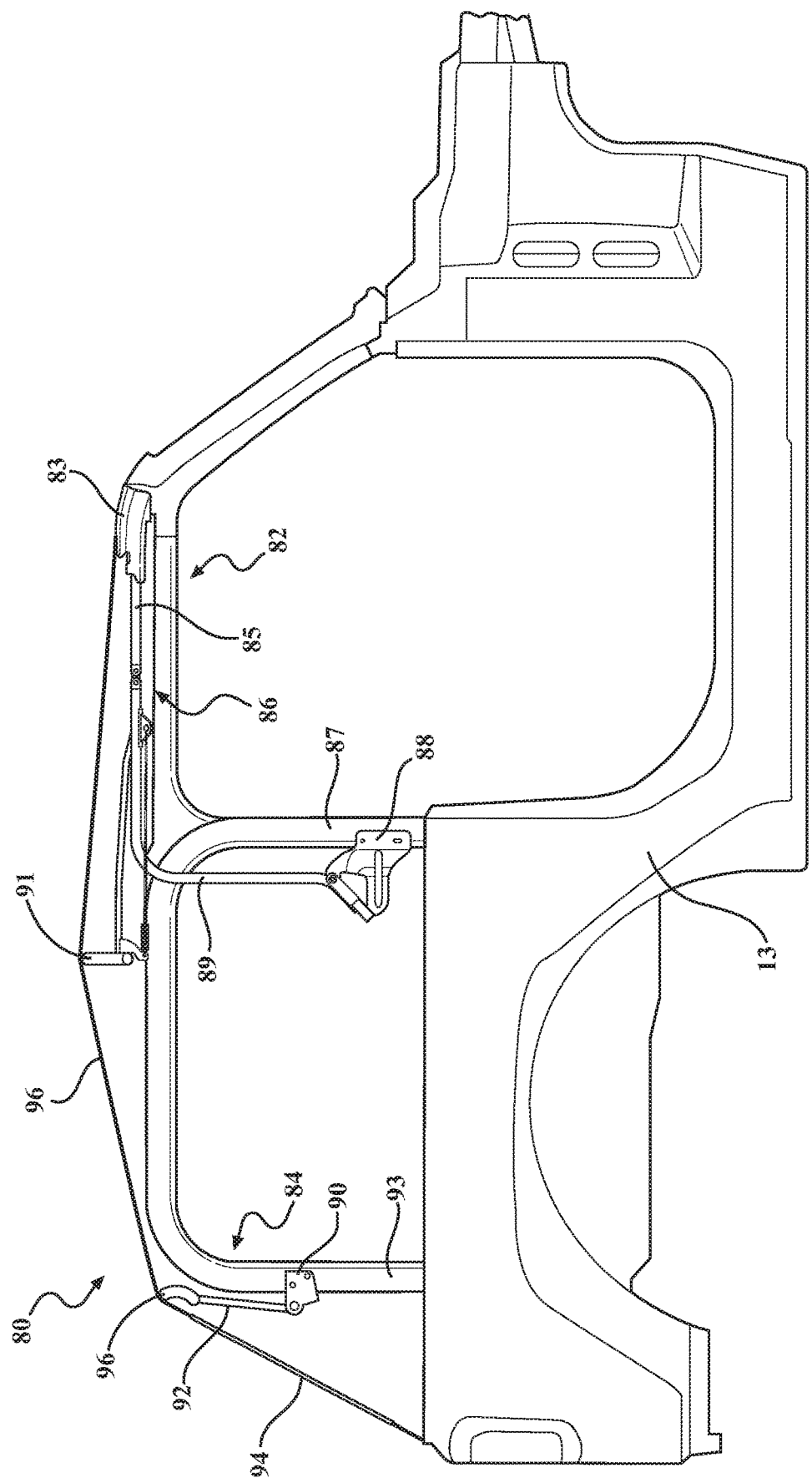
FIG. 6 is a side elevation view of a soft top cover assembly with a dual bow system and having a slanted back window feature, the assembly is shown in a closed position connected to a 2-door vehicle, in accordance with another embodiment of the present invention.

FIG. 6 is a side elevation view of a soft top cover assembly shown generally at 80 having a dual bow system, the assembly 80 is shown in a closed position connected to a 2-door vehicle 13, in accordance with another embodiment of the present invention. There is provided a front bow system shown generally at 82 and a rear support structure that is a rear bow system shown generally at 84. The front bow system 82 is moveable between at least a closed position and open sunroof position. A front rail 85 of the front bow system 82 is connected to a header 83. The front rail 85 is also connected to a rear rail 89 by at least one pivot joint shown generally at 86 such that the front bow system 82 pivots about this joint 86 to the open sunroof position. A bracket 88 is connected to the vehicle, preferably, to a mid-way sport bar upright 87 to pivotally attach the rear rail 89 of the front bow system 82 to the vehicle. The rear rail 89 is also connected to a 2-bow 91. The rear rail 89 rotates the front bow system 82 between the open sunroof position and a downward stowed position.

The rear bow system 84 is a rear bracket system with an upstanding bow to set the rear height of the top deck/cover transition to the rear window. At least one bracket 90 is connected to the vehicle, preferably, to a rear upright sport bar 93. Alternatively, the bracket 90 is mounted to tub(s). A rear bow upright 92 is rotatably connected to the bracket 90. A rear window is provided on a panel 94, which is part of the cover 96 or operably connected thereto. The rear bow upright 92 helps set the rear height of the top deck/cover transition to the rear window panel. The rear bow upright 92 has a cross vehicle bow 99 that is connected to the cover 96 top deck.

The rear window panel 94 is additionally independently removable in one embodiment.

The rear panel 94 angles downward and connects toward the rear or rear corners of the vehicle. In one embodiment, the rear panel 94 is connected to angled upright corners of the rear quarter panels and/or to tailgate bars.

A system to fully open the cover 96 to an open/down position is within the scope of the present invention. In one embodiment, there is no 3-bow. In another, there is a 3-bow connected to the bracket 88, e.g., pivotally connected to the bracket and operably coupled to the cover 96.

Figure 6A:
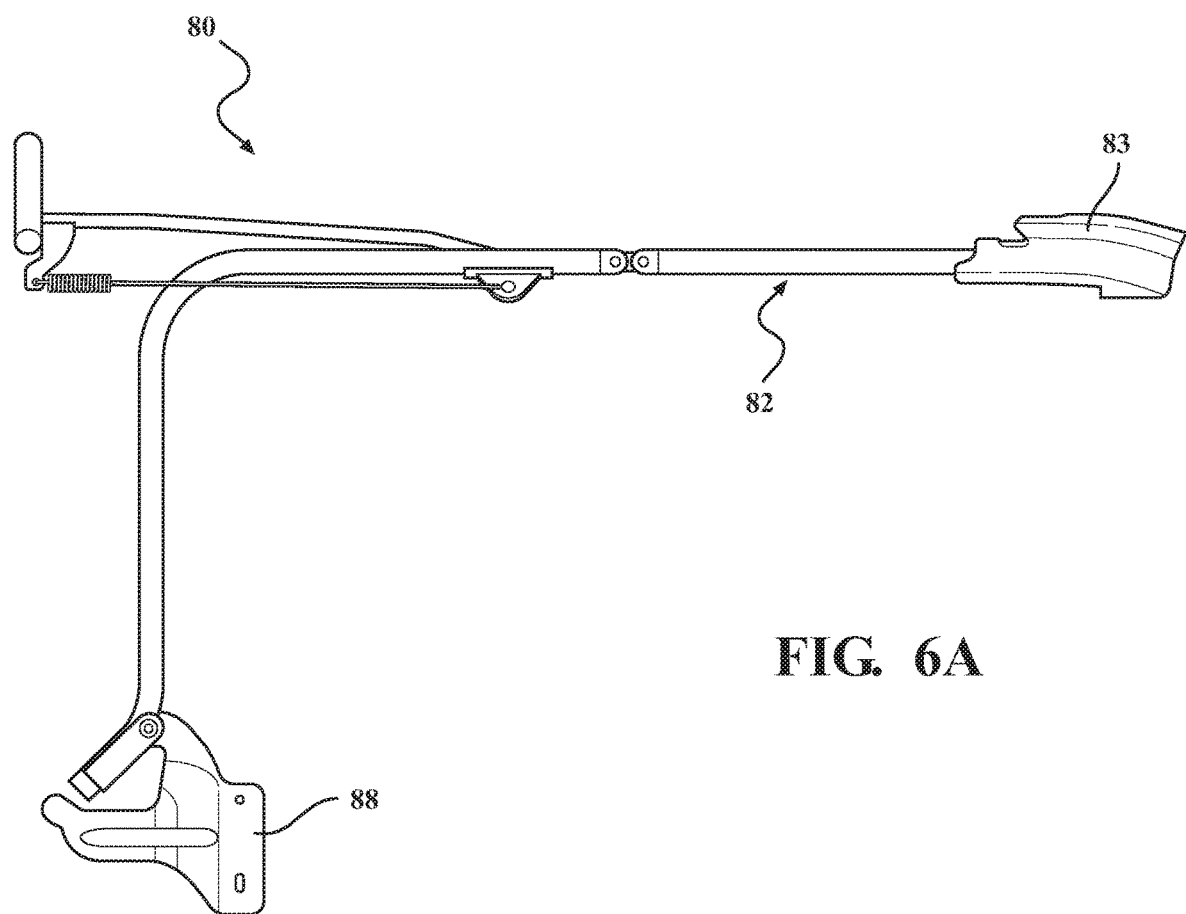
FIG. 6A is a side elevation illustrating a front bow system of the dual bow system having no 3-bow, the assembly being in a closed position, according to an embodiment of the present invention.

FIG. 6A is an enlarged side elevation of FIG. 6 having no 3-bow, according to one embodiment.

Figure 6B:
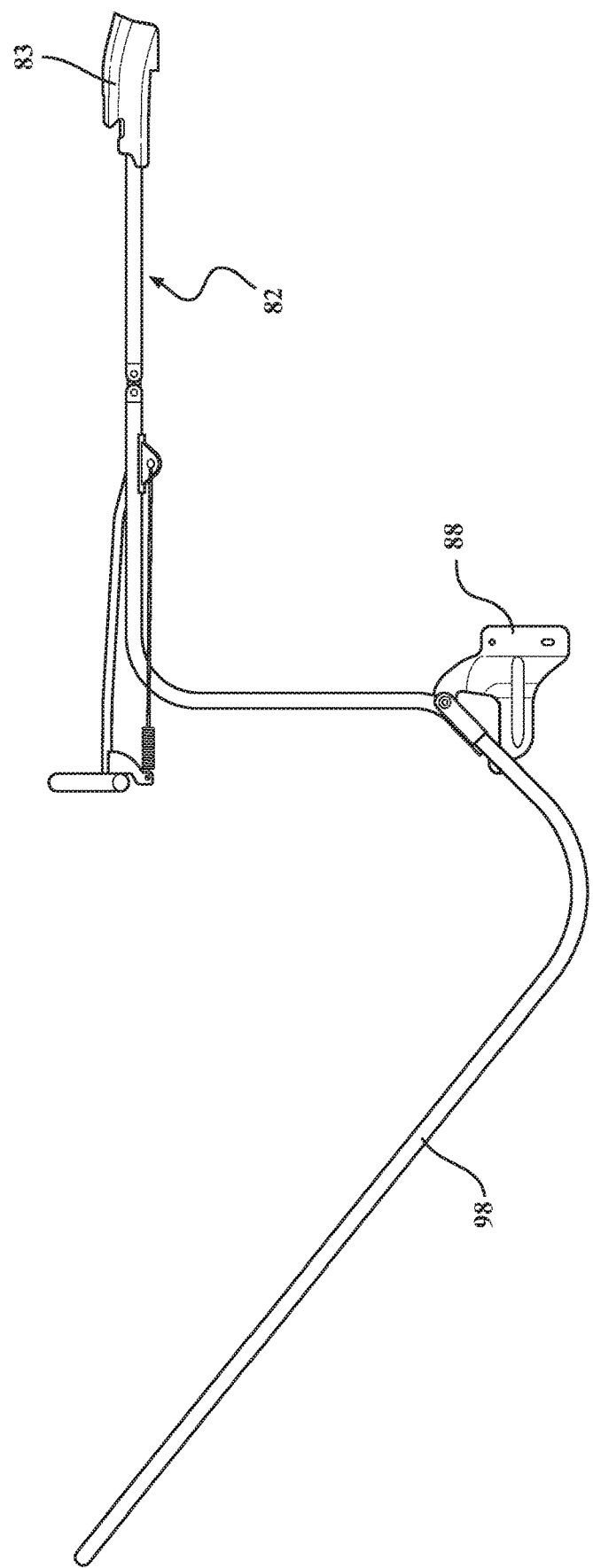
FIG. 6B is a side elevation of a front bow system with the addition of a 3-bow, according to another embodiment of the present invention.

FIG. 6B is a side elevation illustrating some features of the soft top cover assembly of FIG. 6 (with the vehicle omitted for clarity), the assembly being in a closed position and having a 3-bow 98, according to another embodiment of the present invention.

Figure 7:
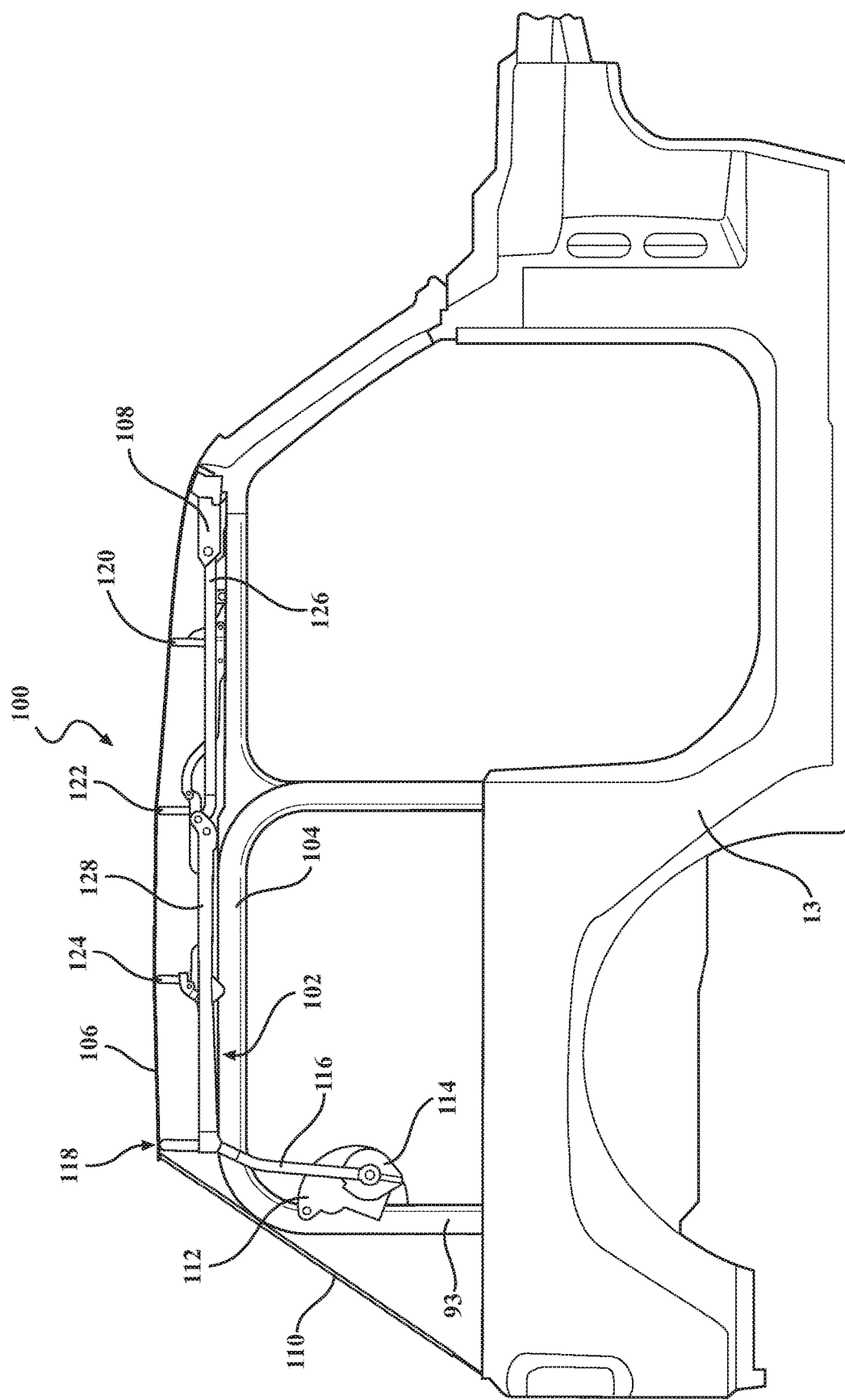
FIG. 7 is a side elevation view of a soft top cover assembly having no rear bow and having a slanted back window feature and articulating linkage assembly, the assembly is shown in a closed position connected to a 2-door vehicle, in accordance with another embodiment of the present invention.

FIG. 7 is a side elevation view of a soft top cover assembly shown generally at 100 with a guide track/slider system indicated generally at 102, the assembly 100 is shown in a closed position connected to a 2-door vehicle 13, in accordance with another embodiment of the present invention. Preferably, the sliding framework, e.g., guide track with rollers guided therein carried by at least one bracket, is operably connected to at least the rear sport bars 104 upper. FIG. 5 depicts an exemplary guide track and roller system. A cover 106 is connected to a header 108 or "1-bow", which connects to a windshield frame in the closed position to close out the vehicle interior. The cover 106 is operably connected to a plurality of bows and moves between at least a closed position, open sunroof position, and open/down position(s) (e.g., such as the articulating linkage assembly 418, depicted in FIGS. 16-18 but without the rear bow of FIG. 16). A rear window is provided on a panel 110, which is part of the cover 106 or operably connected thereto, as set forth above. The rear window panel 110 is independently removable in one embodiment.

At least one bracket 112 is provided (and optionally incorporated with a lift assist device such as a lockable lift assist 114) that is connected to a rear support structure including one of the bows, preferably an upright bow, most preferably, a 5-bow upright 116. The bracket 112 is mounted to the vehicle, preferably the rear sport bar 93, and the 5-bow upright 116 is rotatably connected to the bracket 112 for rotation of the bow 116 between up/down positions. The 5-bow upright 116 is coupled to a bow shown generally at 118, preferably, a 5-bow 118, which is a cross vehicle bow. The assembly 100 can also include a 2-bow 120, 3-bow 122 and 4-bow 124 which are cross vehicle bows. The assembly also includes a front rail 126 pivotally connected to a rear rail 128 by at least one joint for rotating the header 108 to the open sunroof position. There is no rear bow (e.g., such as an original equipment rear bow, extending generally upward in a rearward direction).

The rear panel 110 angles downward and connects toward the rear or rear corners of the vehicle. In one embodiment, the rear panel 110 is connected to angled upright corners of the rear quarter panels and/or to tailgate bars.

The 5-bow 118 and 5-bow upright 116 helps set the rear height of the top deck/cover transition to the rear window panel.

In any of the aforementioned embodiments, more or less bows are contemplated (including fabric management bows, bows to clear the cover for articulating down to the stowed position, etc) depending on the application without departure from the scope of the present invention. The additional bows can, by way of non-limiting example, be mounted off existing holes for a stay pad, mounted off uprights for additional articulations, etc.

Figure 8:
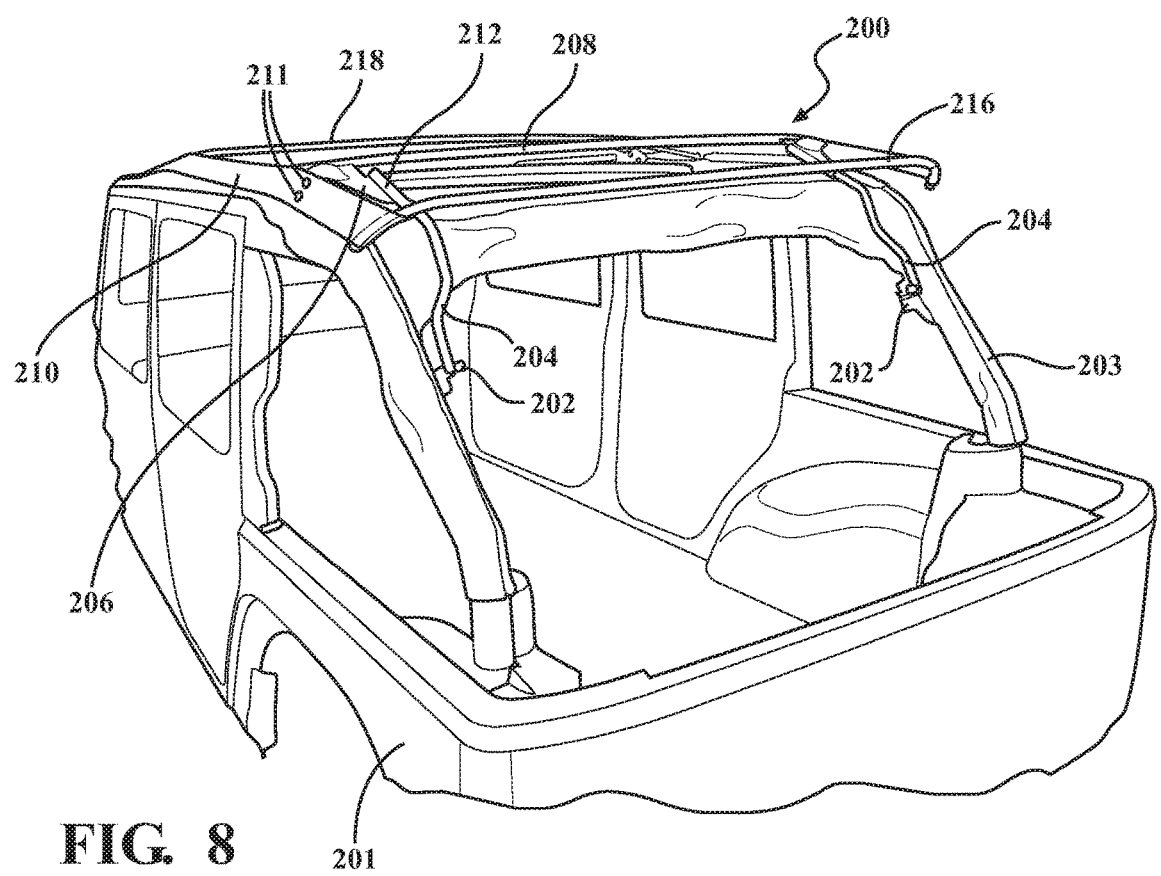
FIG. 8 is a left side rear perspective view of a soft top cover assembly in a closed position, according to the present invention.

Referring generally to FIGS. 8-14, a soft top cover assembly, shown generally at 200, is provided that is a slanted back profile, according to an embodiment of the present invention (with the cover removed for clarity). The assembly 200 in FIG. 8 is in a closed position on a vehicle 201. A cover is operably connected to a header (shown in FIG. 2), which connects to a windshield frame in the closed position to close out the vehicle interior. The cover is operably connected to a plurality of bows and moves between at least a closed position, open sunroof position, and open/down position. A rear window is provided on a panel, which is part of the cover or operably connected thereto. The rear window is independently removable in one embodiment. The rear panel angles downward and connects toward the rear or rear corners of the vehicle. Preferably, the front of the assembly is a flip back sunroof that moves between the closed and open sunroof position (e.g., FIG. 2).

At least one bracket 202 is provided (and optionally incorporated with a lift assist device such as a lockable lift assist) that is mounted to the vehicle, preferably the rear sport bar 203, one of the bows, preferably an upright bow, most preferably, a 3-bow upright 204, is rotatably connected to the bracket 202 to rotate the cover between the up position and the open/down position. The 3-bow upright 204 is connected to a 3-bow 208 via a bracket 206 that is connected to the 3-bow 208 and to the 3-bow upright 204. The 3-bow is a cross car bow. Optionally, the bracket 206 is fastened to a strap pad 210, e.g., woven strap, by a plurality of fasteners 211.

A 4-bow link 212 is mounted to the 3-bow upright 204 via a pivot joint 214 (alternatively, the joint 214 is a fixed joint). The 4-bow link 212 is connected to a 4-bow 216, which is a cross vehicle bow. This 4-bow 216 is the rearmost bow in this embodiment. The 4-bow 216 sets the rear height of the top deck/cover transition to the rear window panel.

The assembly also includes at least a 2-bow 218. Additional bows, such as intermediate bows or fabric management bows, and additional linkages are within the scope of the present invention.

Figure 10:
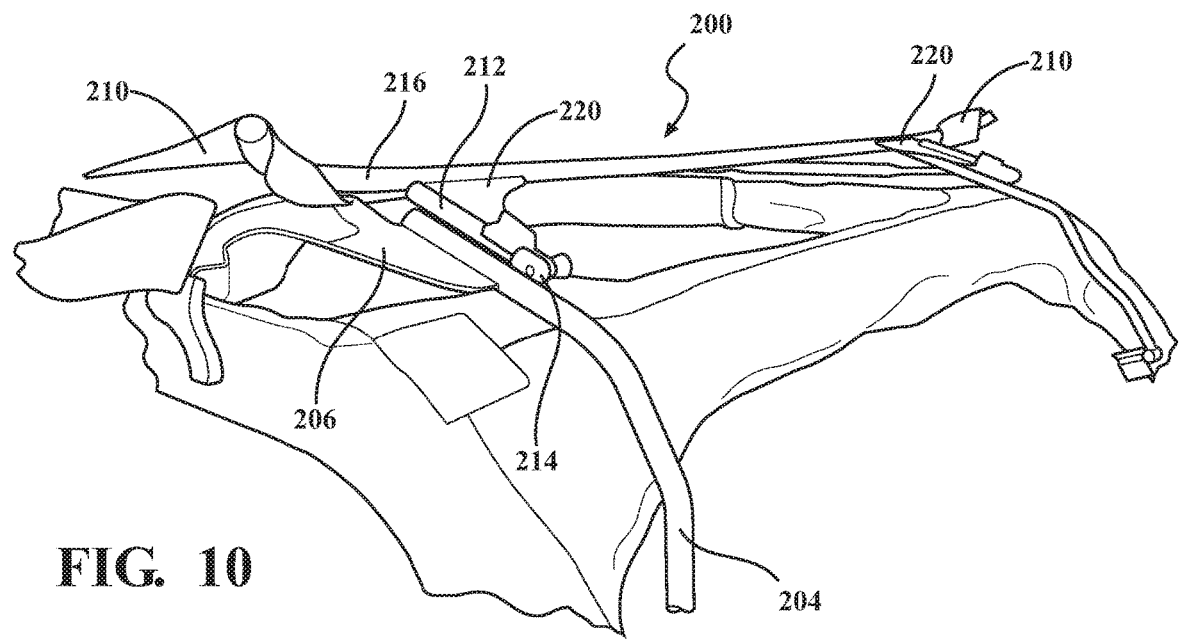
FIG. 10 is a perspective view of FIG. 9 with a bow and upright bow flipped up and forward, according to an embodiment of the present invention.

Another bracket 220 connects the 4-bow 216 to the 4-bow link 212 (as shown in FIG. 10 where the 4-bow 216 is flipped up/forward revealing the bracket 220).

The assembly also includes a lockout system shown generally at 222, including an upstanding brace 224 connected to the 3-bow upright 204 to selectively hold the 4-bow link 212 in a locked position. A mounting bracket 226 is provided on the bow 204 to pivotally connect the 4-bow link 212 at the joint 214. The 4-bow link 212 is also connected to the bracket 220 connected to the 4-bow 216. The forward end of the 3-bow upright 204 is connected to the other bracket 206 which is operably connected to a spring system shown generally at 228. The 4-bow link 212 of the lockdown assembly 224 selectively fits into the brace 224 to hold the 4-bow 216 generally in a locked position.

Referring to FIGS. 15-23 generally, there are provided additional embodiments with a rear bow added. These tops are preferably not slanted back or are minimally slanted. Thus, the rear window will be more vertical to the top deck of the cover. However, the soft tops are convertible to a slant back with modifications, including, removing the rear bow and using a suitable cover for a rear support structure of a slanted back arrangement, depending on the particular application. It is particularly preferable in an embodiment that the articulating frame largely stays the same, regardless of whether or not the soft top assembly is a slanted back, but the rear bow features are removed and any other suitable modifications are made or attachment features added to set the rear height of the top deck/cover transition to the rear window panel depending on the application when a slanted back is desired. This results in significant advantages by not having to change out the entire soft top assembly. Further, universal framework can be used.

Referring more particularly to FIGS. 15-18, there is provided a soft top cover assembly shown generally at 300 in a closed position (or "up position") connected to a 2-door vehicle 13 (the cover and windows are omitted for clarity) with the addition of a rear bow, according to an embodiment of the present invention. This embodiment is similar to FIG. 7, however, there is a rear bow link 318 with a lift assist and handle release provided on the rear bow, shown generally at 316. The assembly 300 has a guide track/slider system indicated generally at 302. Preferably, the sliding framework 302, e.g., guide track with a plurality of rollers guided therein such as depicted in FIG. 5) is operably connected to at least the rear sport bars 304. A cover is operably connected to a header 308, which connects to a windshield frame in the closed position to close out the vehicle interior. The cover is operably connected to a plurality of bows and moves between at least a closed position, open sunroof position (or "sun position"), and open/down position (or "down position"). A rear window is provided on a panel, which is part of the cover or operably connected thereto. The rear window is independently removable in one embodiment. A bracket 310 is provided on the rear sport bars 304 operably connected to one of the bows 312 for rotation to an open/down position. A lift assist assembly shown generally at 314 is operably connected to the bracket 310. Preferably, the lift assist 314 is a locking lift assist. A lift assist release assembly (or "trigger assembly") is provided on the rear bow 316 to release the lift assist 314 to allow rotation of the assembly 300 to the open/down position. The trigger assembly 316 is connected to the rear bow link 318, which link 318 is pivotally connected to the bracket 310, and can be a cord type release with a pull that releases at least one lift assist assemblies 314 at the same time to facilitate rotation of the assembly 300. This embodiment can have two lift assists; the lift assist 314 in the rear cargo area and a lift assist arrangement on a linkage assembly coupled to a side rail 322 of the assembly 300.

Figure 15:
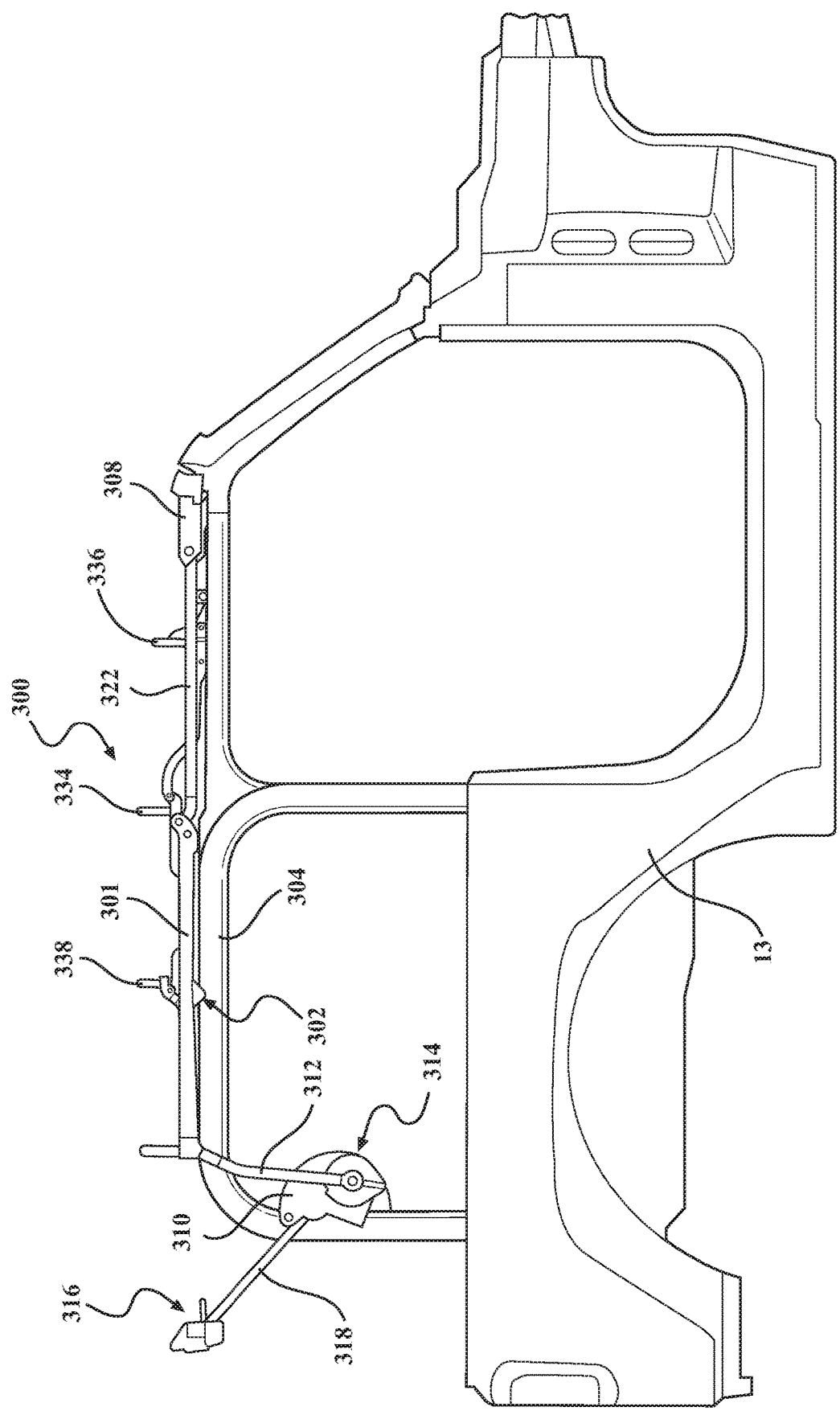
FIG. 15 is a side elevation view of a soft top cover assembly with a rear bow connected, shown in a closed position connected to a 2-door vehicle, according to another embodiment of the present invention.
Figure 16:
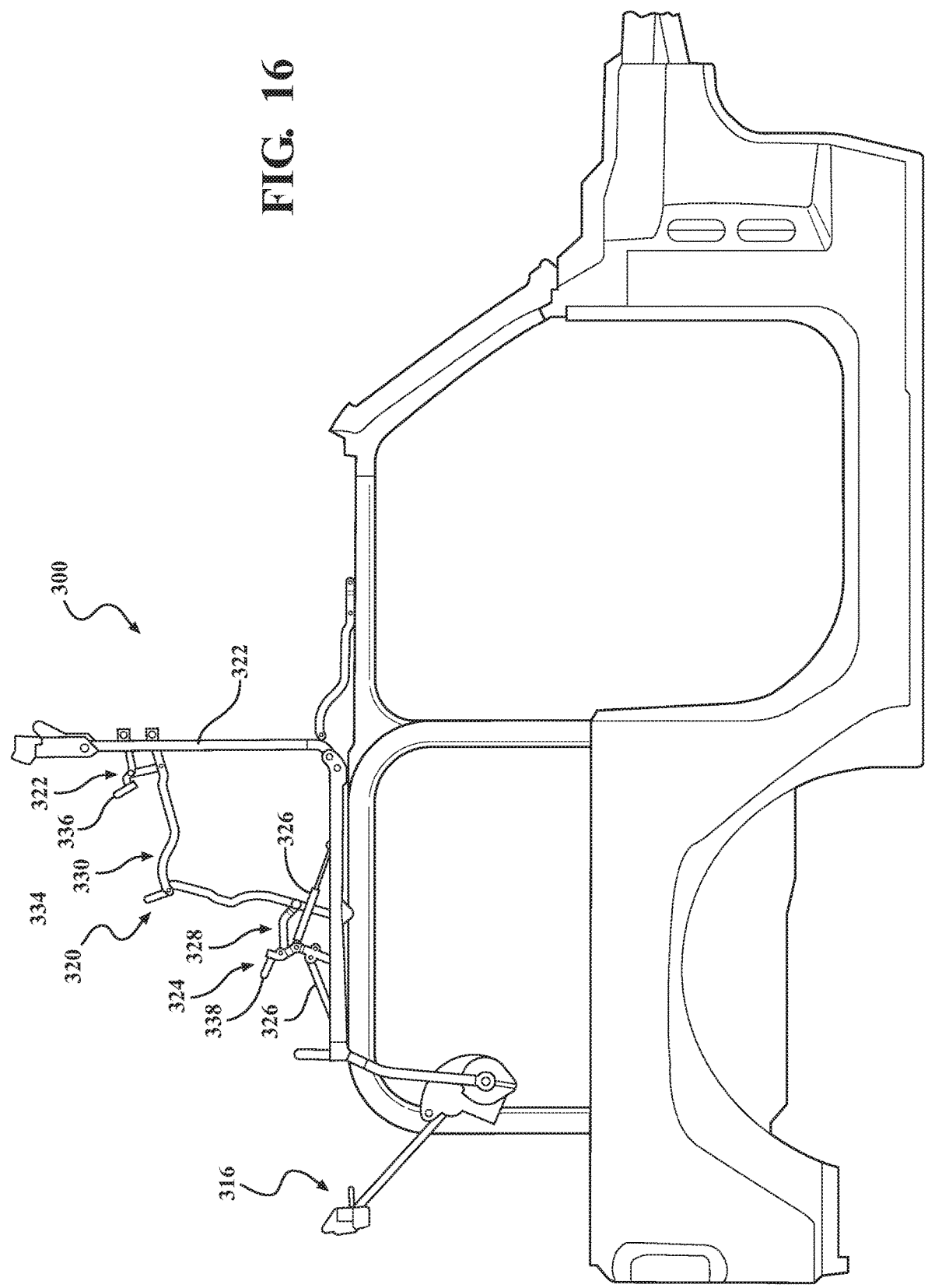
FIG. 16 is a side elevation view of the soft top cover assembly of FIG. 15 with a sunroof portion rotating to an open position.

FIG. 16 is a side elevation view of the soft top cover assembly 300 of FIG. 15 with a sunroof portion in the process of rotating to an open sunroof position, according to the present invention. There is illustrated the articulating linkage assembly shown generally at 320 with at least one lift assist mechanism, shown generally at 324. By way of non-limiting example, the lift assist 324 can include two gas cylinders 326,326 in force opposition coupled to the rear rail 301 and to a linkage assembly shown generally at 328 to assist in opening and closing of the sunroof portion of the soft top. The linkage assembly 328 is connected to a 4-bow 338, which may be a fabric assist bow. A second and third linkage assembly, shown generally at 330 and 322 are provided with a 3-bow and 2-bow, respectively, 324,326 which either or both may be fabric management bows.

Figure 17:
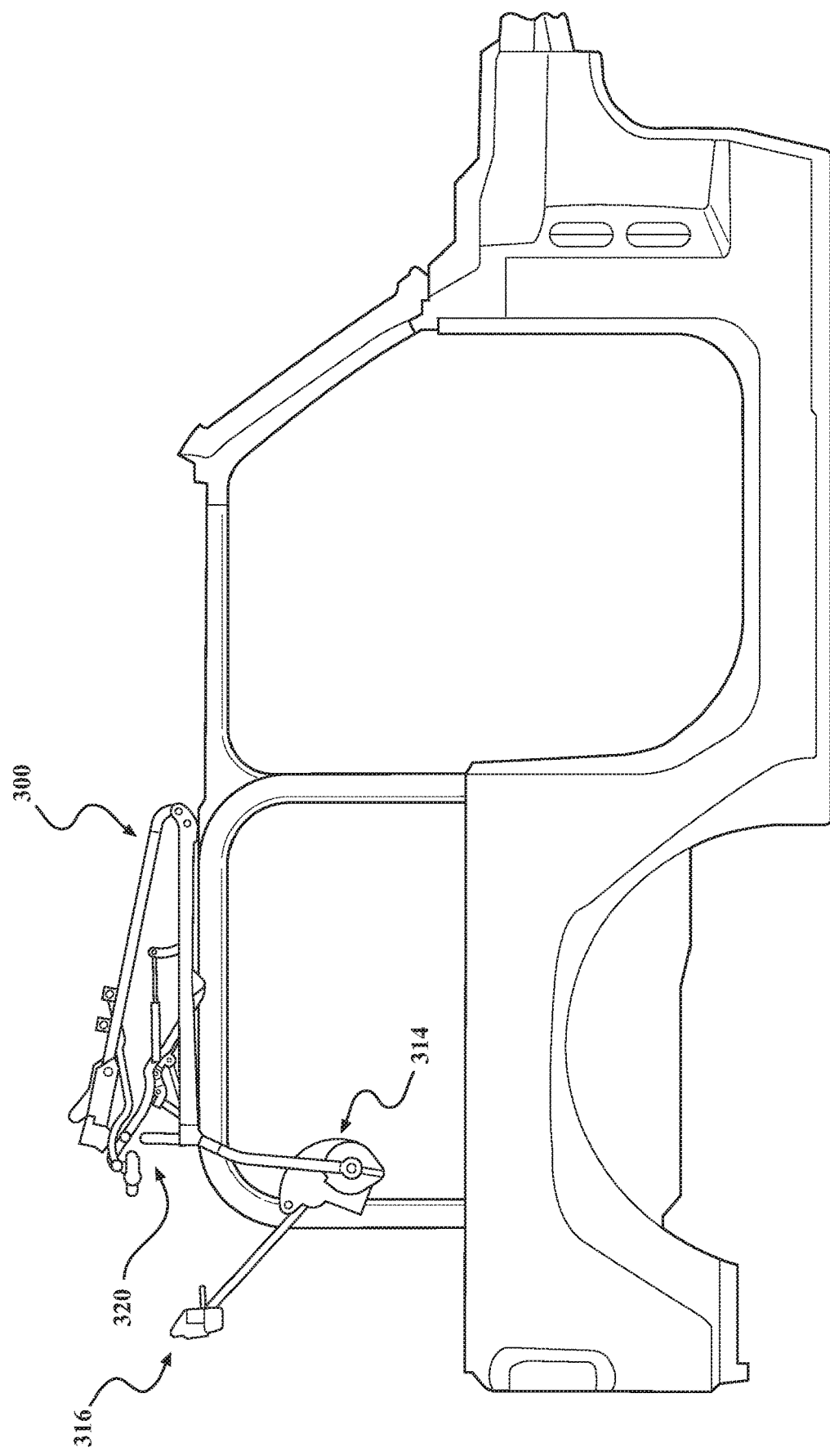
FIG. 17 is a side elevation view of the soft top cover assembly of FIGS. 15-16 in an open sunroof position.

FIG. 17 is a side elevation view of the soft top cover assembly 300 of FIG. 15 in an open sunroof position, according to the present invention.

Figure 18:
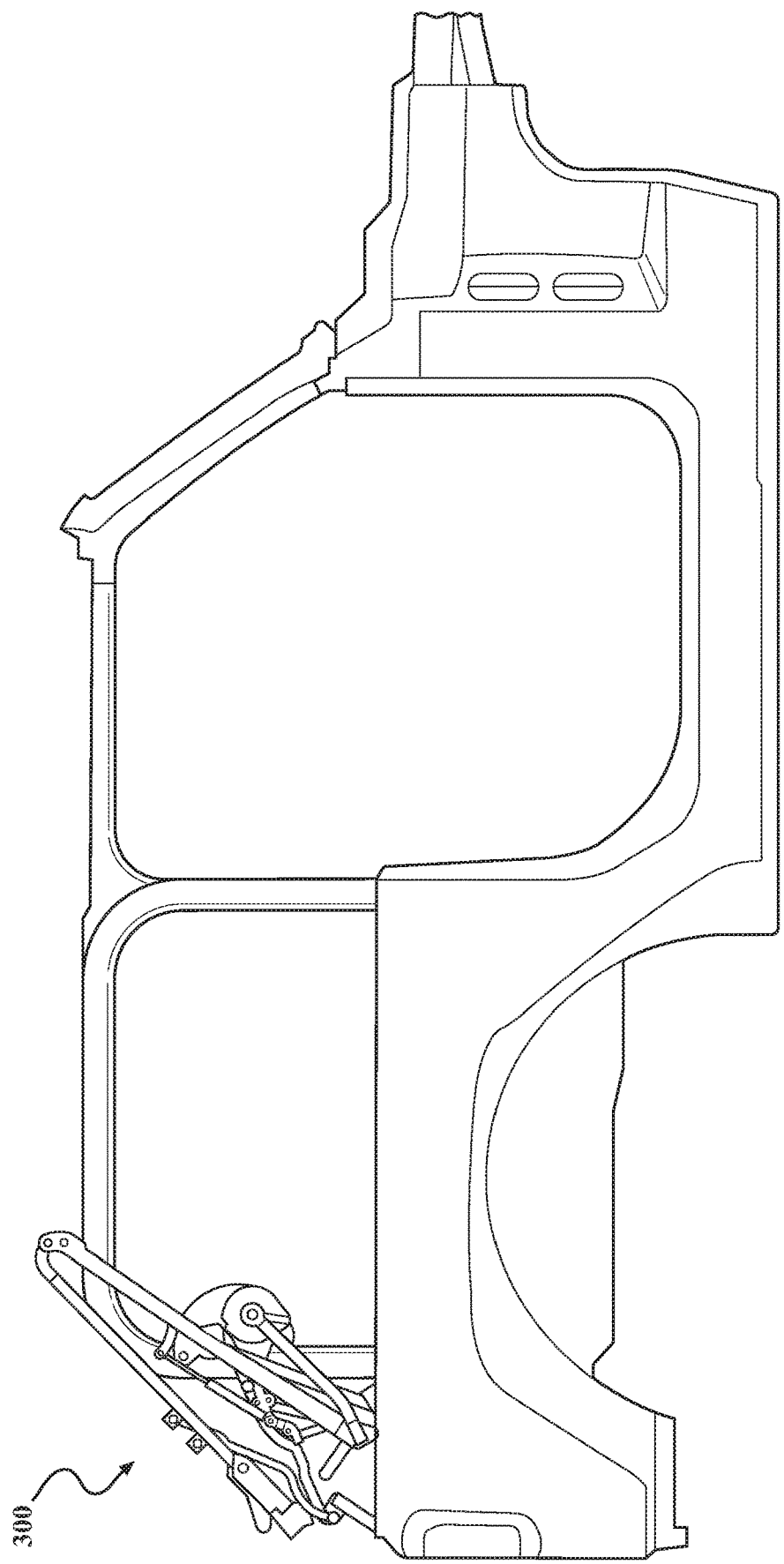
FIG. 18 is a side elevation view of the soft top cover assembly of FIGS. 15-18 in an open/down position.

FIG. 18 is a side elevation view of the soft top cover assembly of FIG. 15 in an open/down position, according to the present invention.

Referring to FIGS. 19-22 generally there is provided a side elevation view of a soft top cover assembly shown generally at 400 in a closed position (or "up position") connected to a 4-door vehicle (the cover and rear window panel is omitted for clarity), according to another embodiment of the present invention. This embodiment is similar to FIG. 4, however, there is a rear bow added, shown generally at 420, with a handle release provided for a lift assist, shown generally at 422. A rear bow link 424 pivotally connects the rear bow 420 to the lift assist 422 and bracket 406. The assembly 400 has a sliding framework indicated generally at 402 (e.g., such as depicted in FIG. 5). Preferably, the sliding framework 402, e.g., guide track with rollers guided therein) is operably connected to at least the rear sport bars. A cover (omitted for clarity) is operably connected to a header 404, which connects to a windshield frame in the closed position to close out the vehicle interior. The cover is operably connected to a plurality of bows and moves between at least a closed position, open sunroof position, and open/down position. A rear window is provided on a panel (omitted for clarity), which is part of the cover or operably connected thereto. The rear window is independently removable in one embodiment. A bracket 406 is operably connected to one of the bows, preferably 5-bow upright 408, for rotation to an open/down position.

The lift assist assembly 422 is operably connected to the bracket 406. Preferably, the lift assist 420 is a locking lift assist. A lift assist release assembly (or "trigger assembly") on the rear bow 420 is provided to release the lift assist 422 to allow rotation of the assembly 400 to the open/down position. The trigger can be a cord type release (or any other suitable release) with a pull that releases at least one lift assist assemblies 422 at the same time to facilitate rotation of the assembly 400. Another lift assist arrangement on a linkage assembly coupled to a side rail 416 of the assembly 400, e.g., incorporating gas cylinders 440,400 in force opposition.

There is illustrated the articulating linkage assembly 418. At least a 4-bow 430 is provided on a first linkage assembly, shown generally at 438. At least a 3-bow 428 is provided on a second linkage assembly, shown generally at 436. At least a 2-bow 426 is provided on a third linkage assembly, shown generally at 434. The 5-bow 432 is also provided connected to the 5-bow upright 408. The 5-bow upright 408 is rotatably connected to the lift assist 422 and bracket 406.

Figure 19:
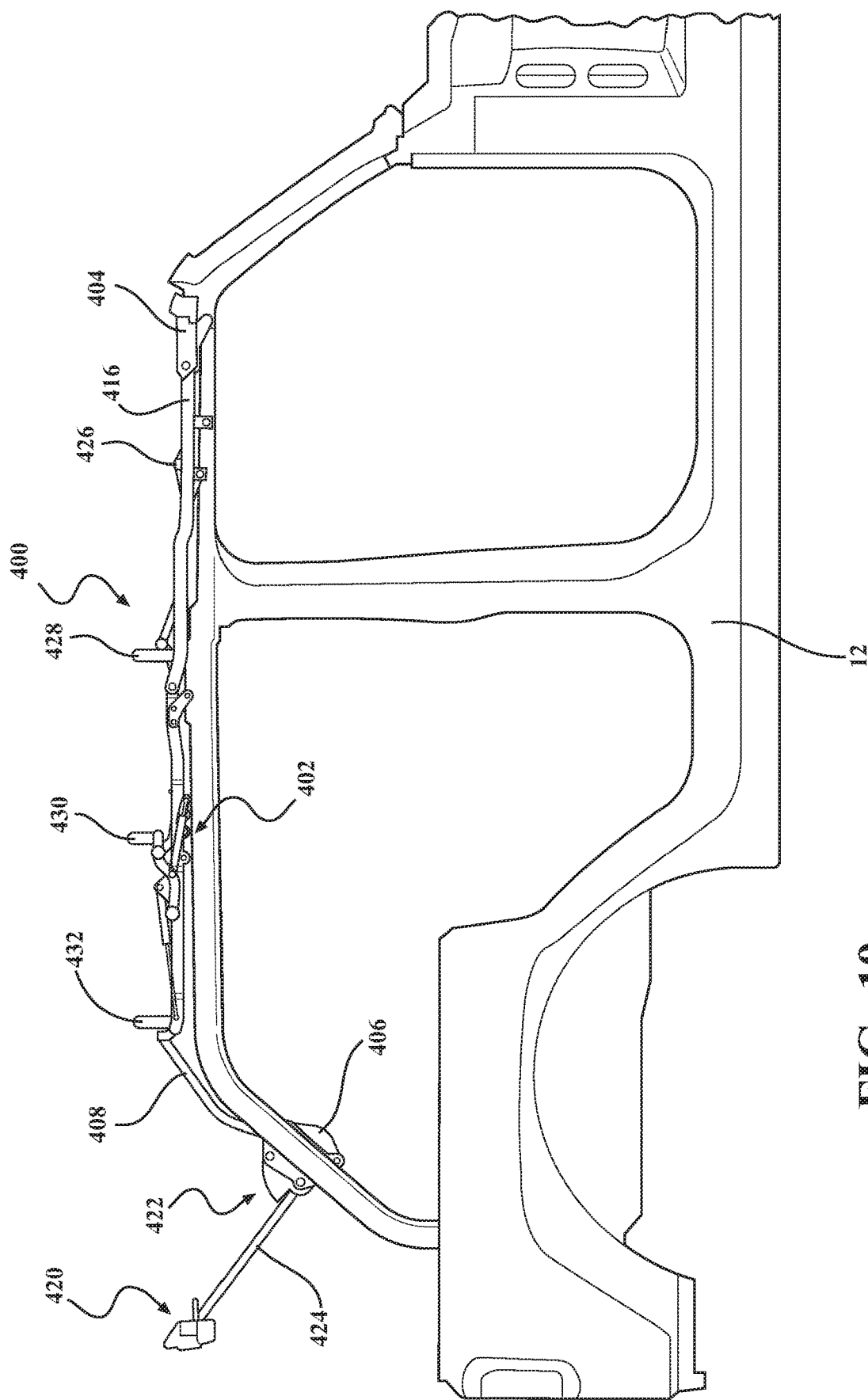
FIG. 19 is a side elevation view of a soft top cover assembly with a rear bow attached, shown in a closed position connected to a 4-door vehicle, according to another embodiment of the present invention.
Figure 20:
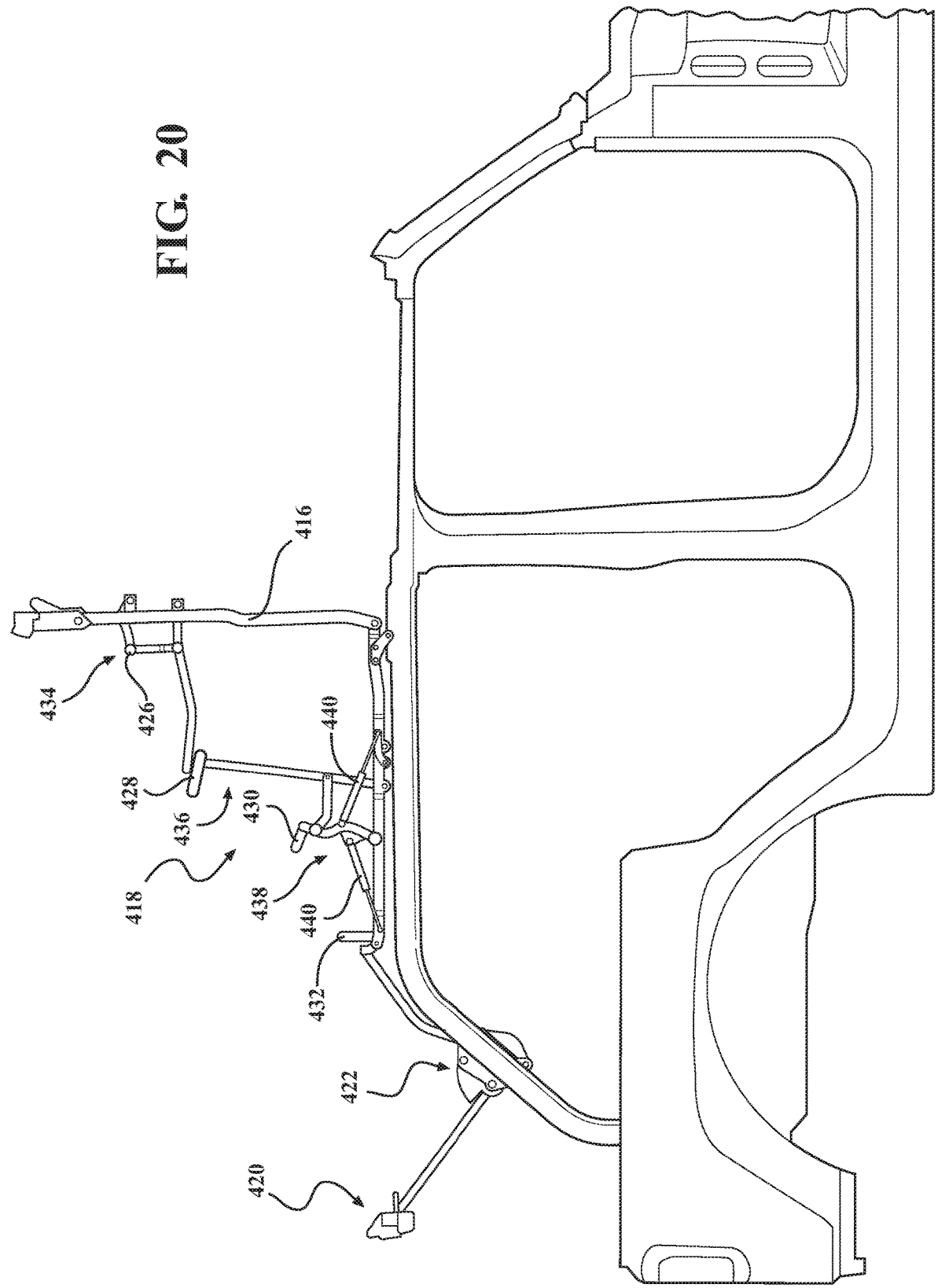
FIG. 20 is a side elevation view of the soft top cover assembly of FIG. 19 with a sunroof portion rotating to an open position.

FIG. 20 is a side elevation view of the soft top cover assembly 400 of FIG. 19 with a sunroof portion in the process of rotating to an open sunroof position, according to the present invention.

Figure 21:
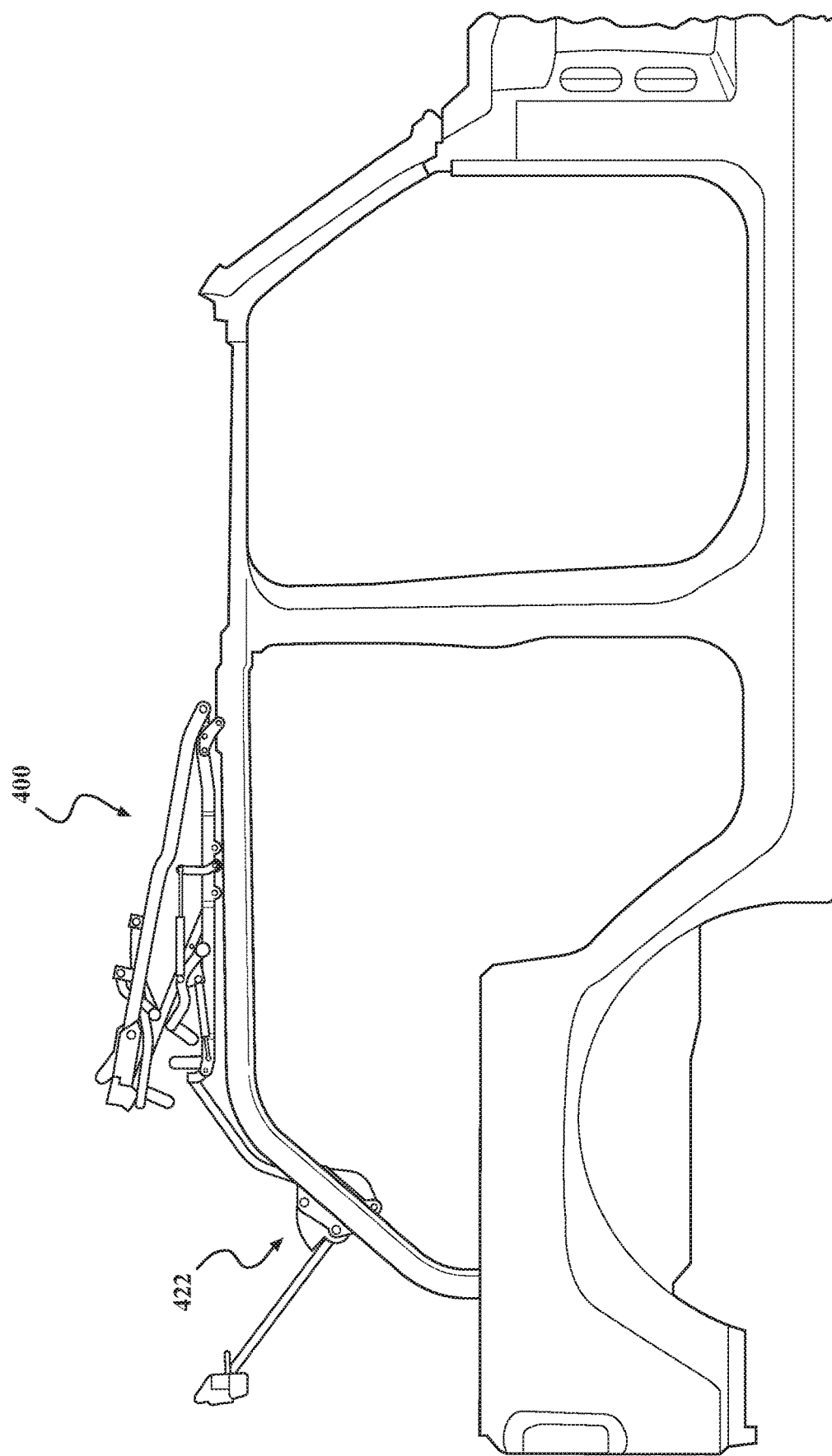
FIG. 21 is a side elevation view of the soft top cover assembly of FIGS. 19-20 in an open sunroof position.

FIG. 21 is a side elevation view of the soft top cover assembly 400 of FIG. 20 in an open sunroof position, according to the present invention.

Figure 22:
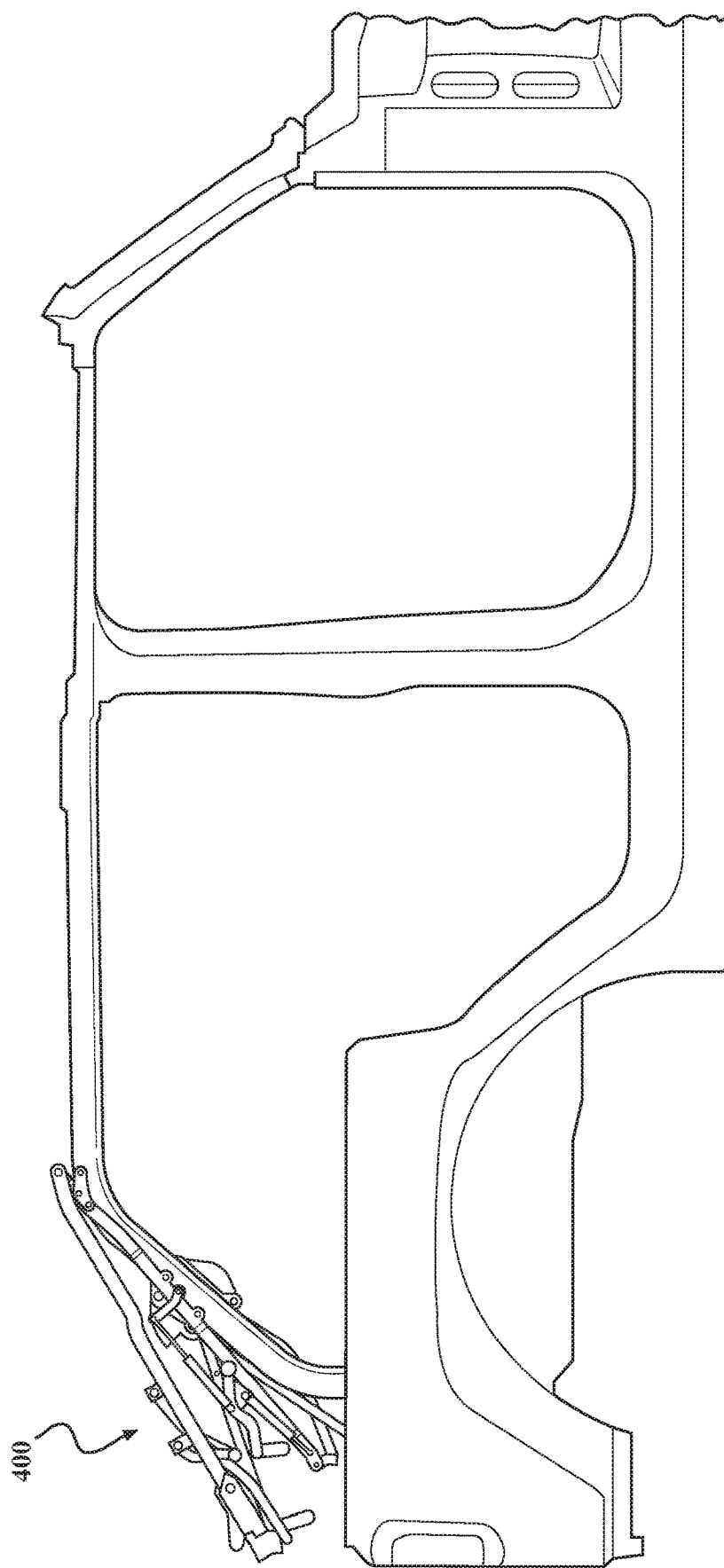
FIG. 22 is a side elevation view of the soft top cover assembly of FIGS. 19-21 in an open/down position.
Figure 23:
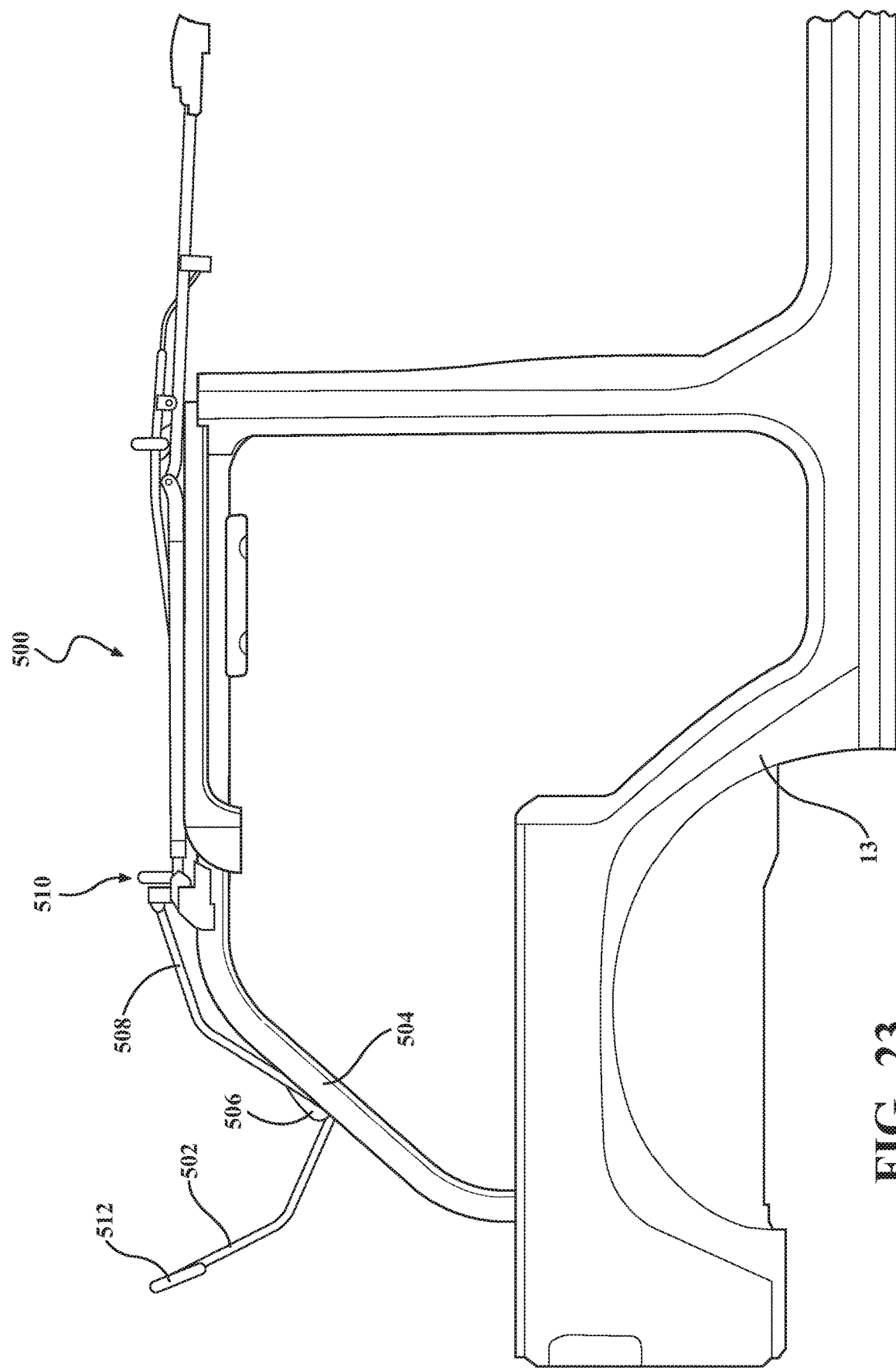
FIG. 23 is a side elevation view of a soft top cover assembly with a rear bow attached, shown in a closed position connected to a 4-door vehicle, according to another embodiment of the present invention.
Figure 24:
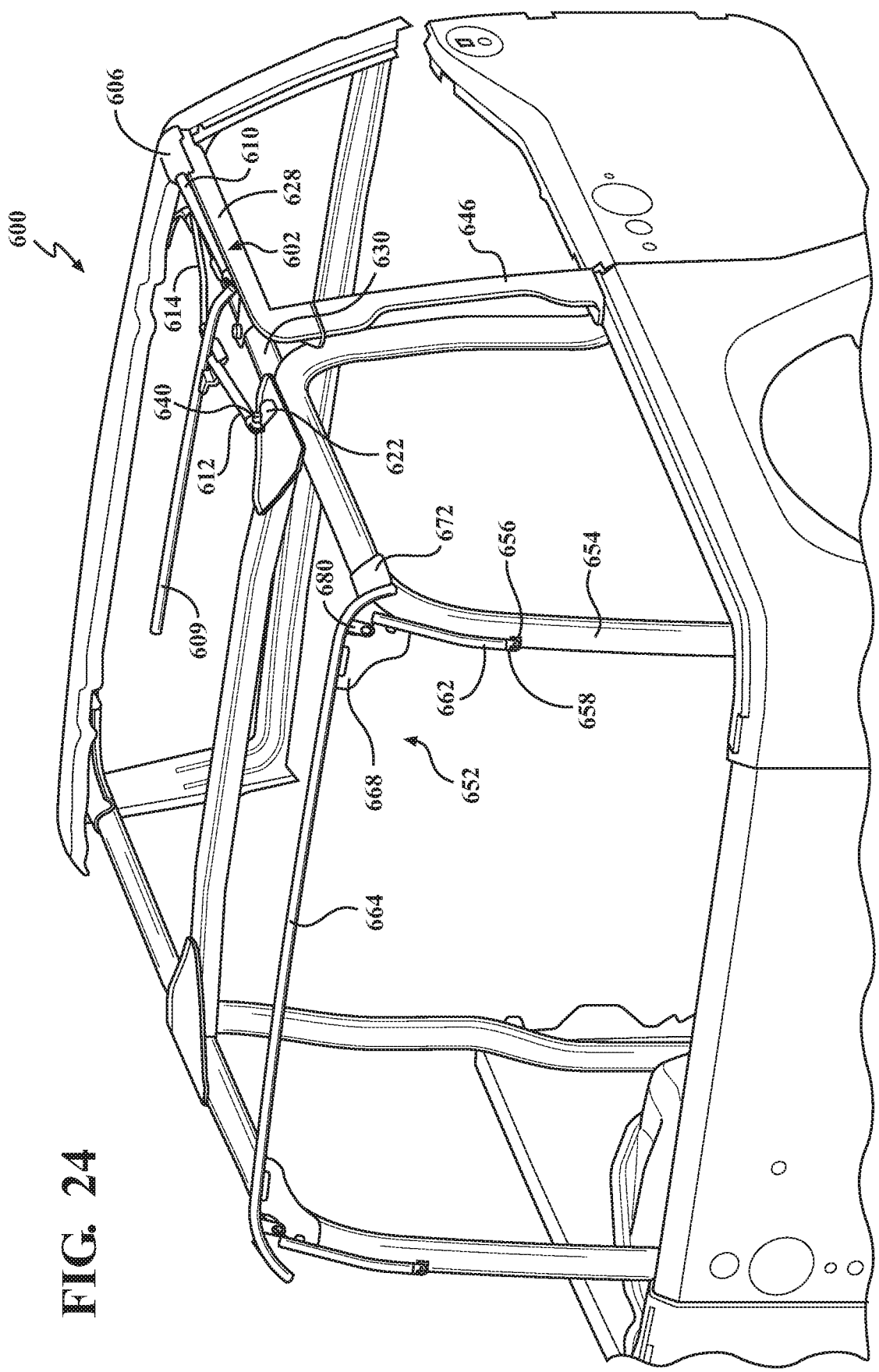
FIG. 24 is a perspective view of a soft top cover assembly on a 2-door vehicle, according to an embodiment of the present invention.
Figure 25:
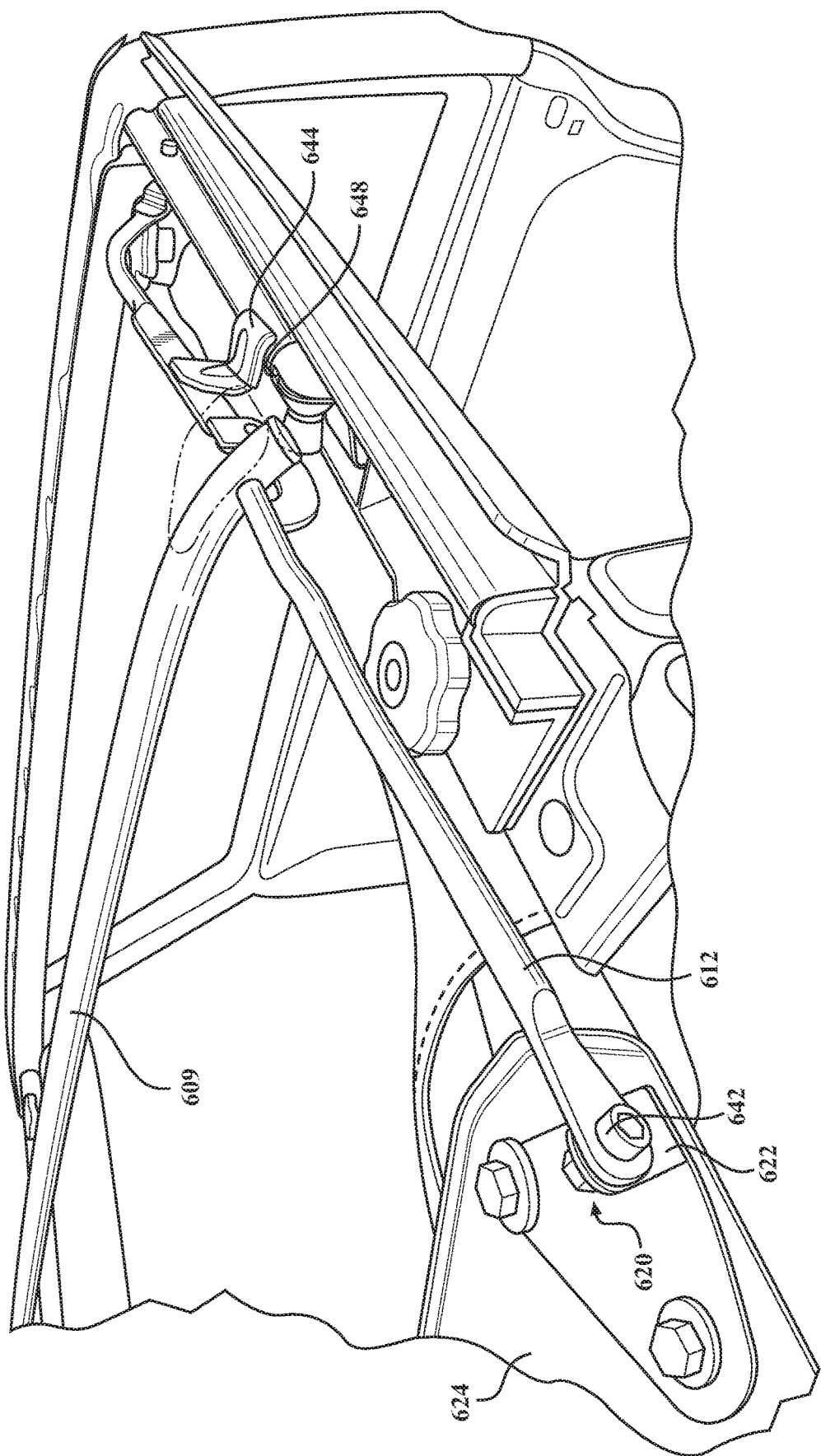
FIG. 25 is an enlarged perspective view of a pivotal portion of the soft top cover assembly in a closed position, in accordance with the present invention.
Figure 26:
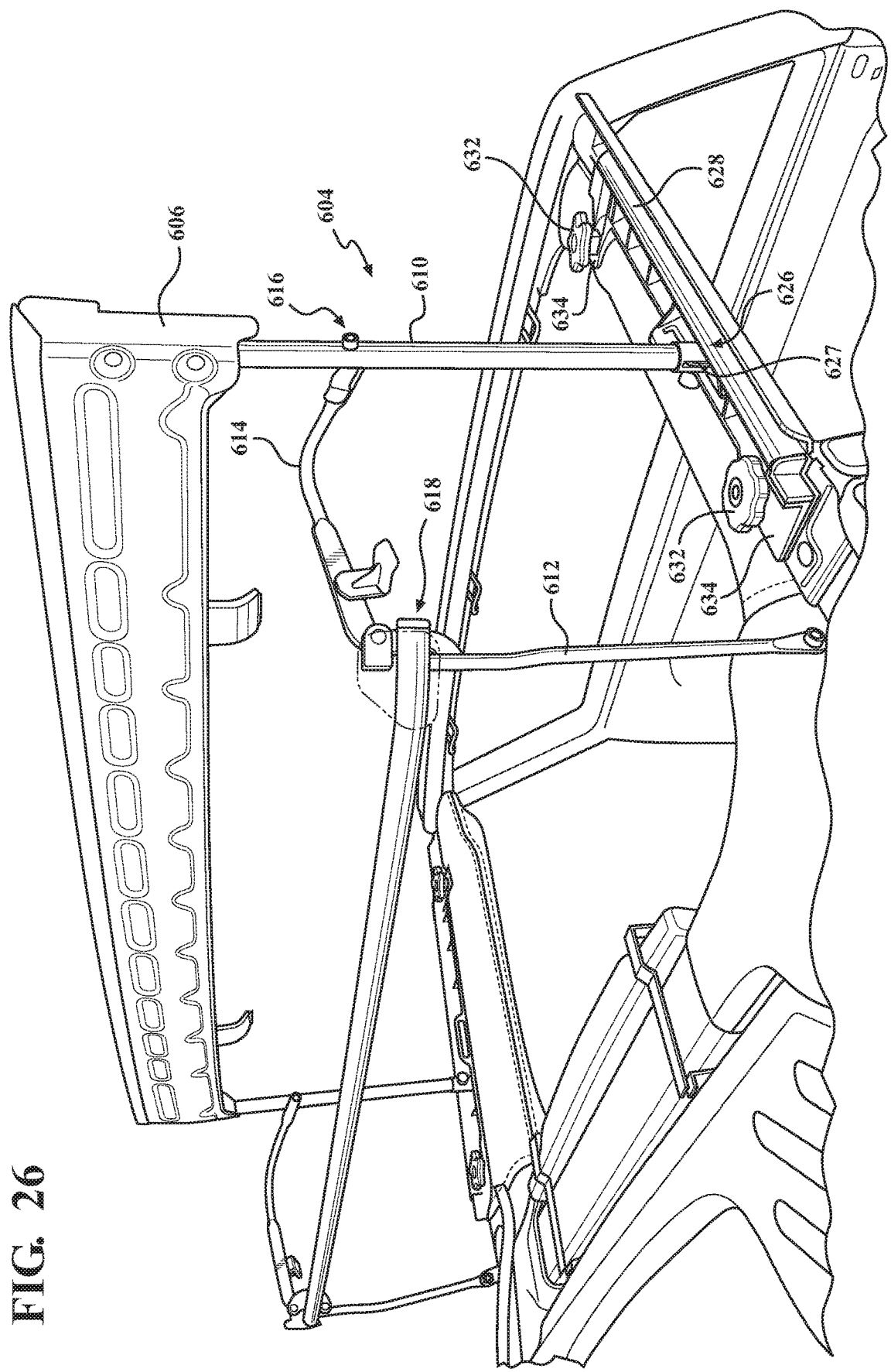
FIG. 26 is an enlarged perspective view of a pivotal portion of the soft top cover assembly in rotation to an open sunroof position, in accordance with the present invention.
Figure 27:
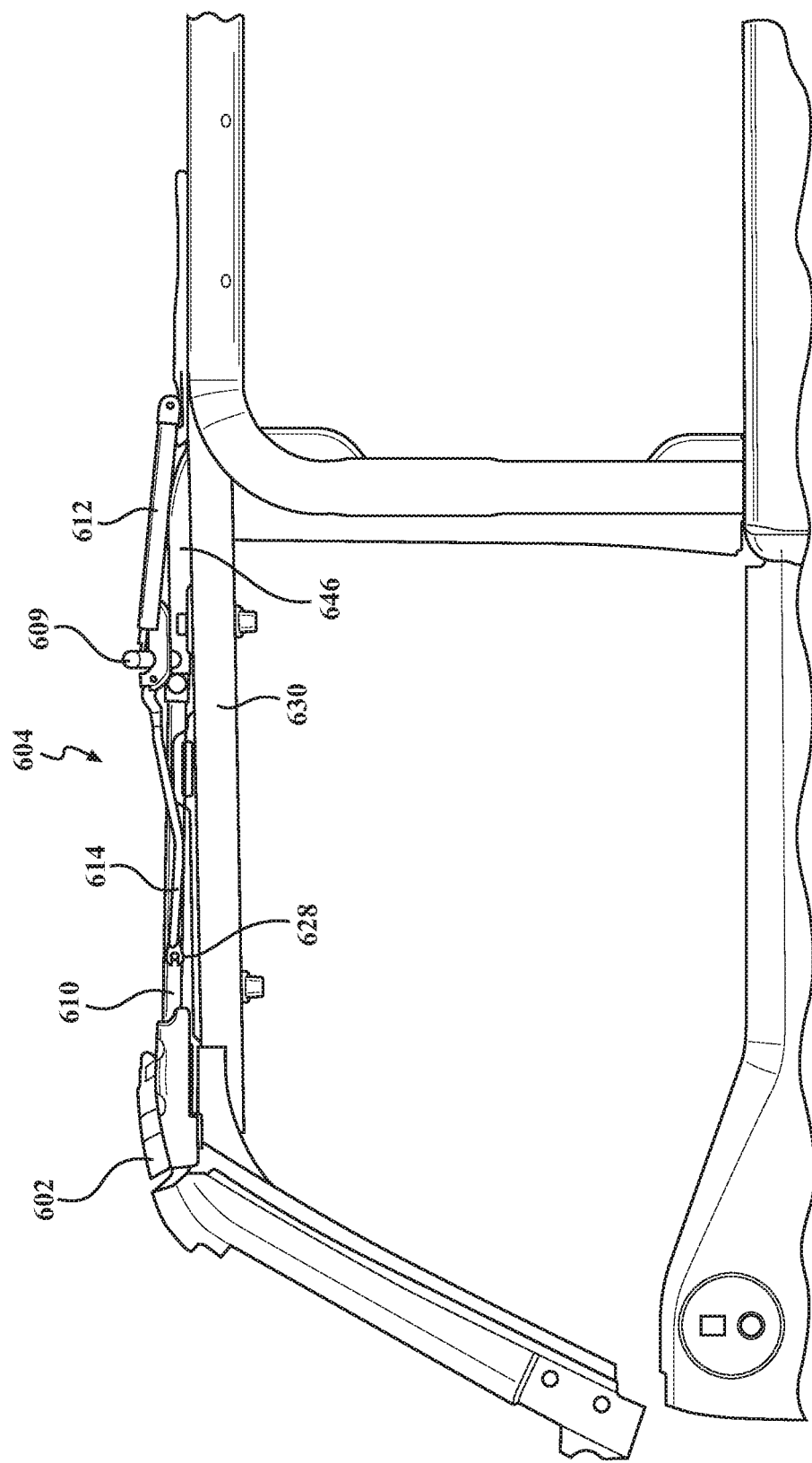
FIG. 27 is an enlarged side elevation view from the interior of a vehicle depicting the soft top cover assembly, in accordance with the present invention.
Figure 28:
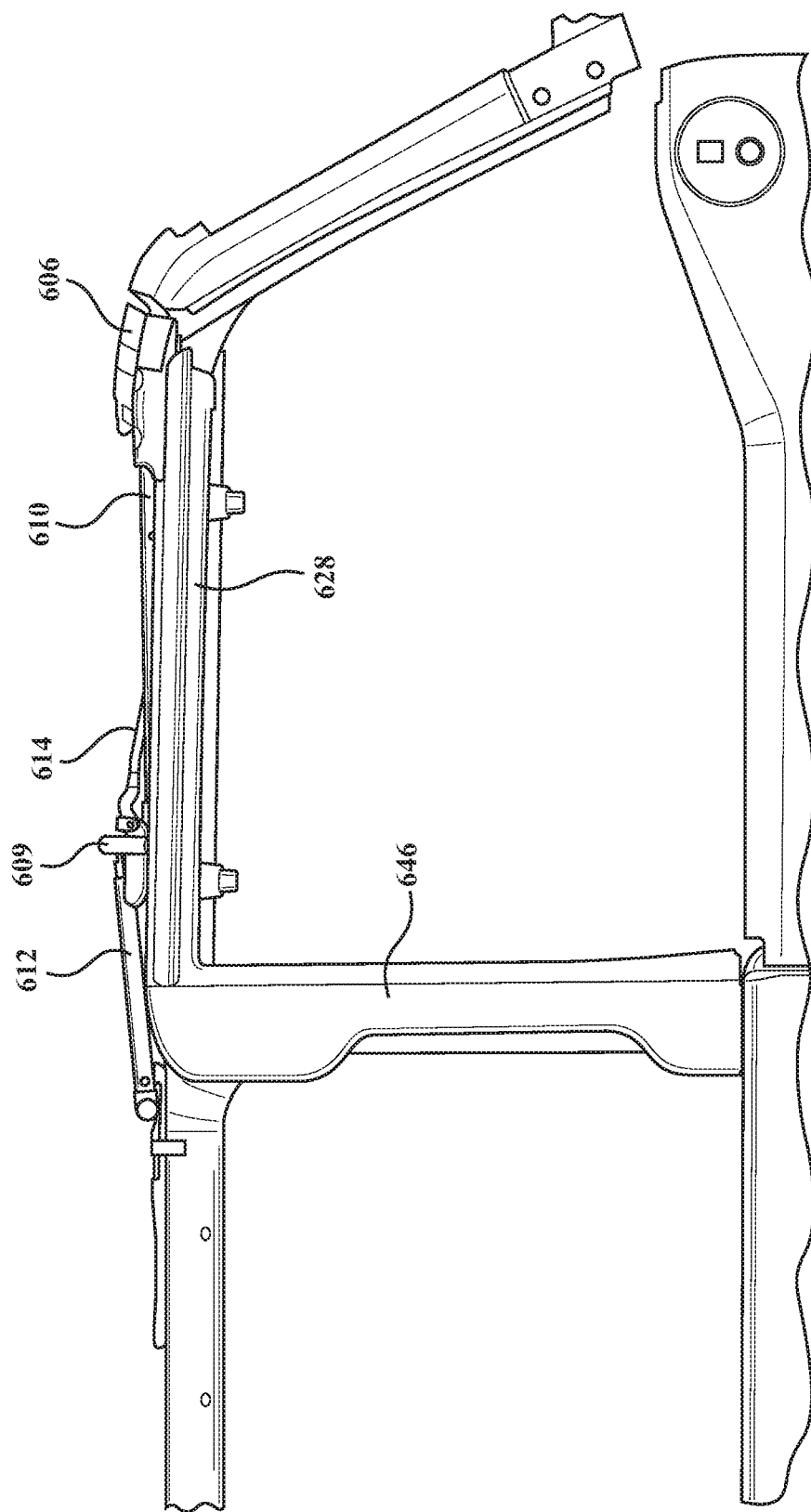
FIG. 28 is an enlarged side elevation view of the soft top cover assembly, in accordance with the present invention.
Figure 29:
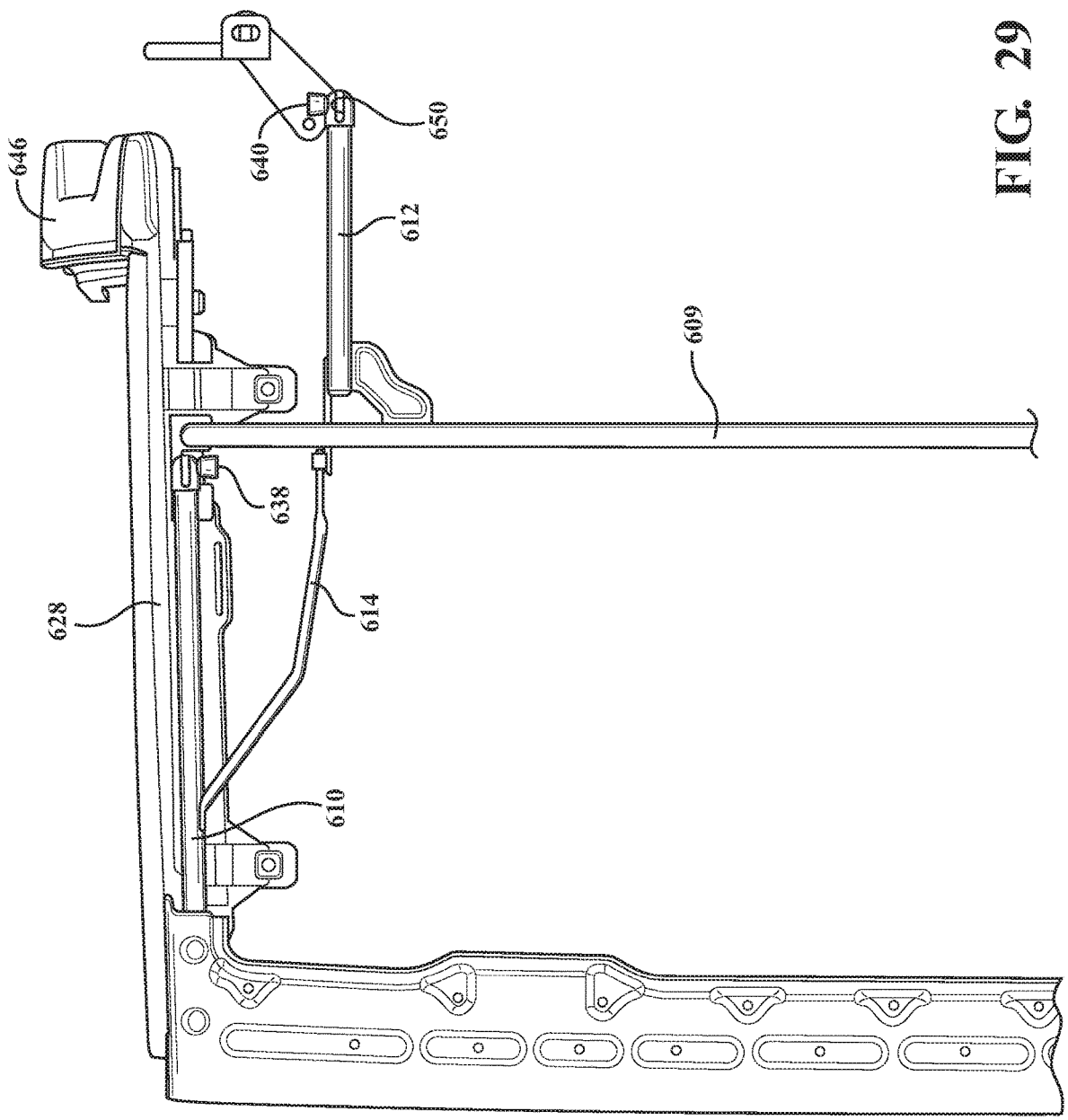
FIG. 29 is an enlarged top plan view of the soft top cover assembly, in accordance with the present invention.
Figure 30:
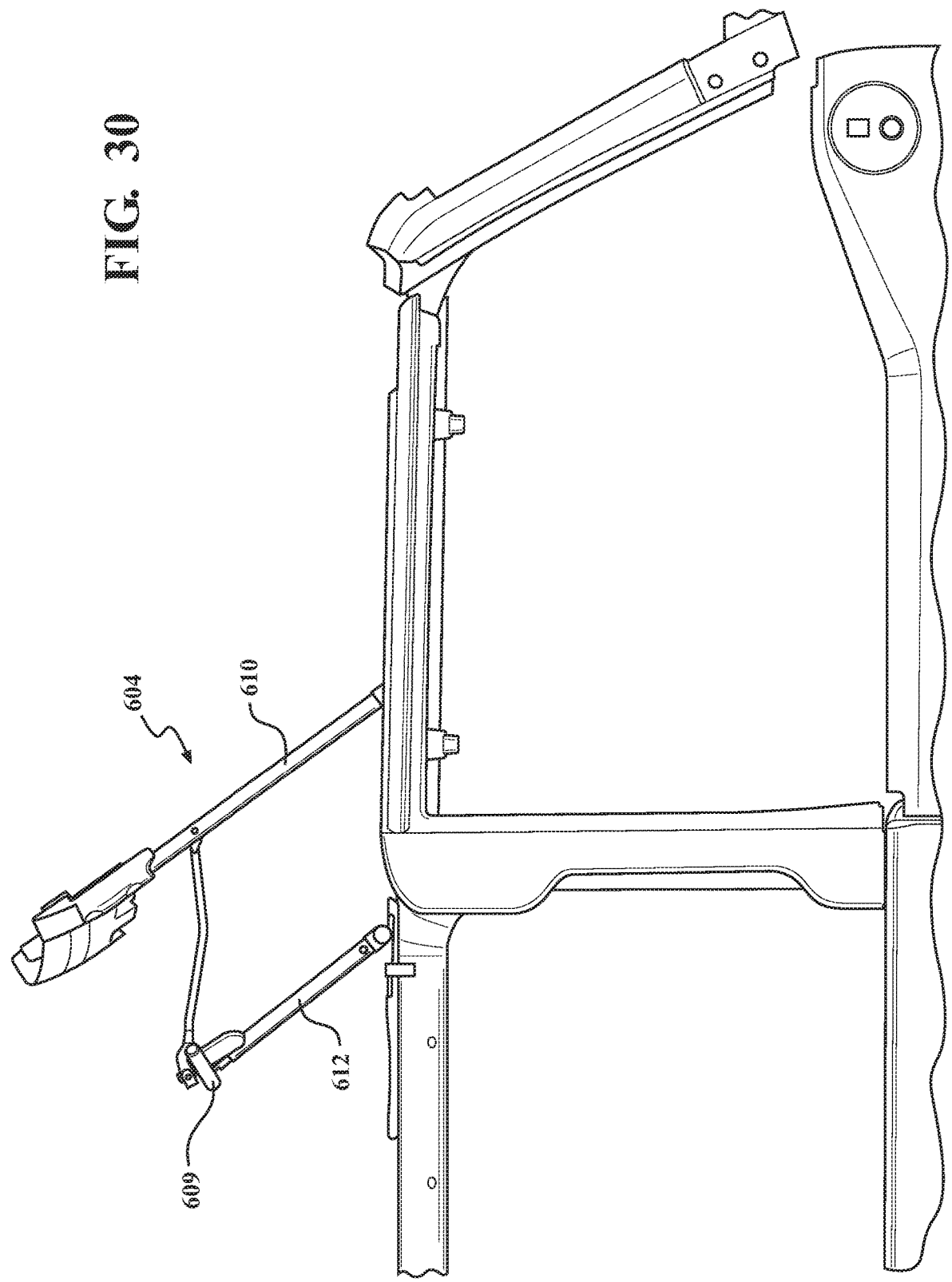
FIG. 30 is an enlarged side elevation view of the pivotal portion of the soft top cover assembly in rotation to the open sunroof position, in accordance with the present invention.
Figure 31:
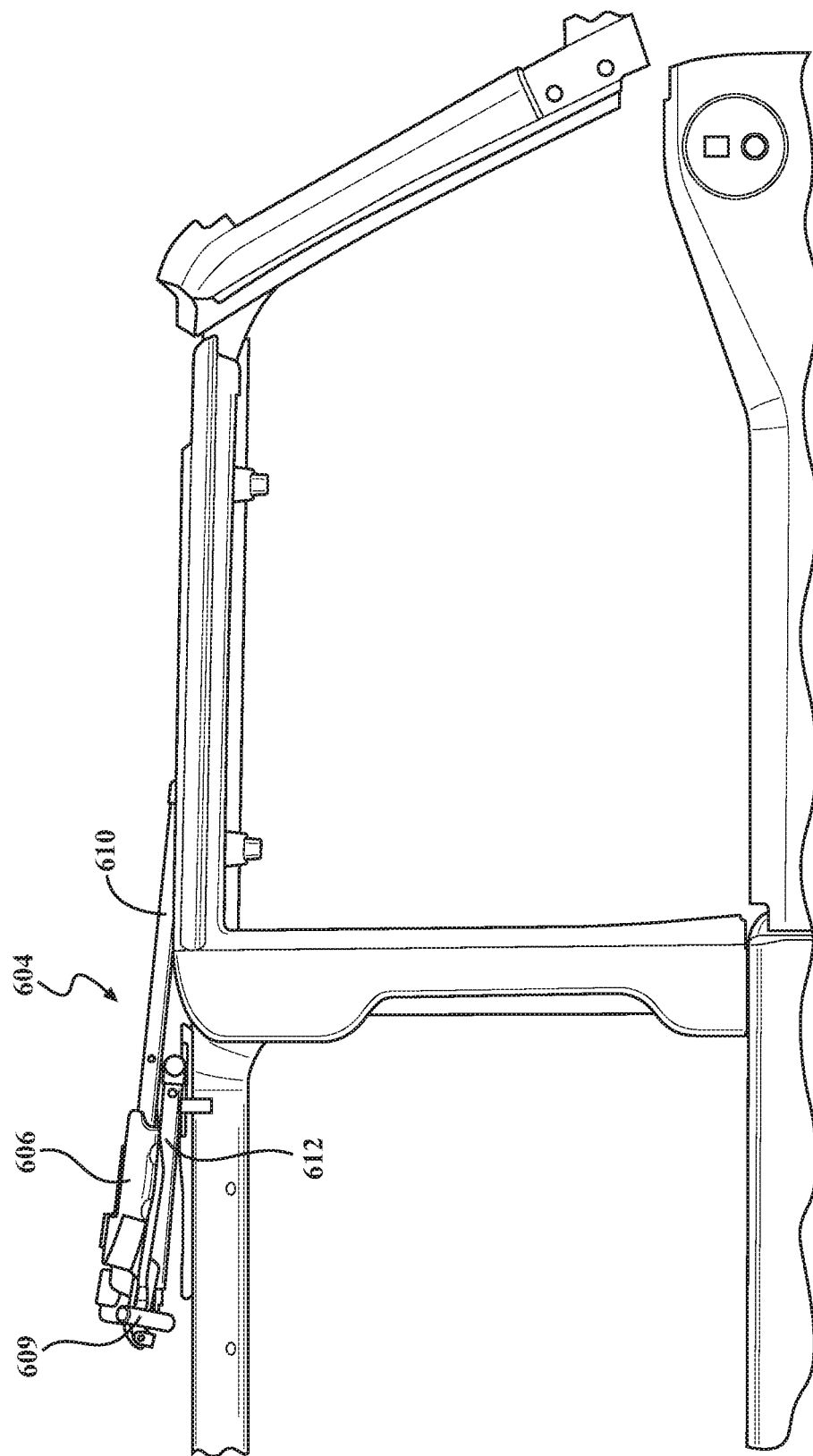
FIG. 31 is an enlarged side elevation view of the pivotal portion of the soft top cover assembly in the open sunroof position, in accordance with the present invention.

FIG. 22 is a side elevation view of the soft top cover assembly of FIGS. 20-21 in an open/down position, according to the present invention;

FIG. 23 is a side elevation view of a soft top cover assembly shown generally at 500 in a closed position connected to a 4-door vehicle 12 (with portions removed for clarity), according to another embodiment of the present invention. In one embodiment, a rear bow link 502 is rotatably connected to the rear sport bars 504 by a bracket 506. A 5-bow upright 508 is connected to a 4-bow shown generally at 510. This embodiment is similar to FIG. 1, however, there is a rear bow 512 and rear bow link 502 added.

In another embodiment the soft top is removable from the vehicle when in the open/down position.

Figure 9:
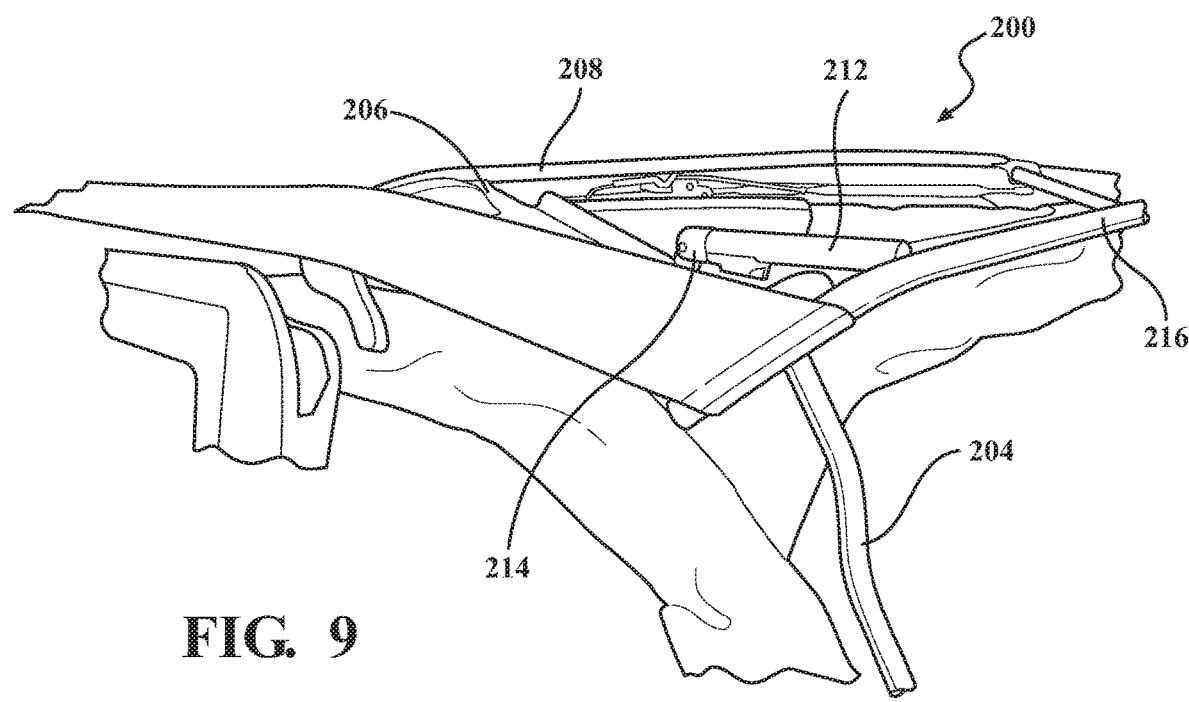
FIG. 9 is an enlarged perspective view including a rear transition area of the soft top cover assembly taken from FIG. 8.
Figure 11:
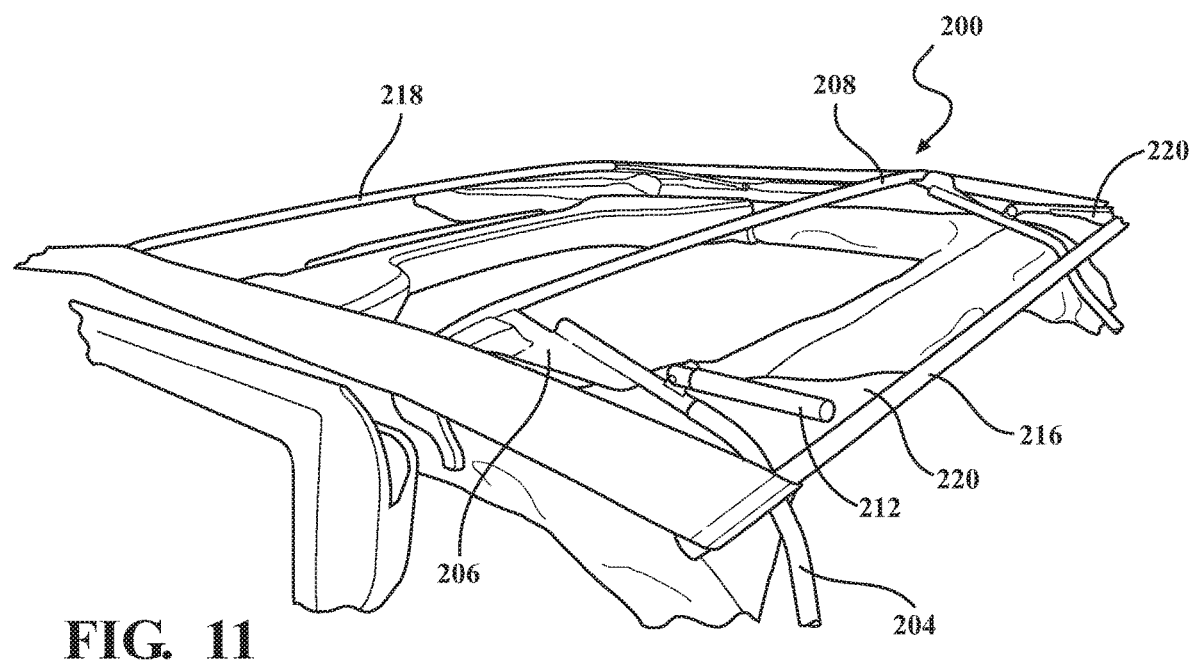
FIG. 11 is an enlarged perspective taken from FIG. 8.
Figure 12:
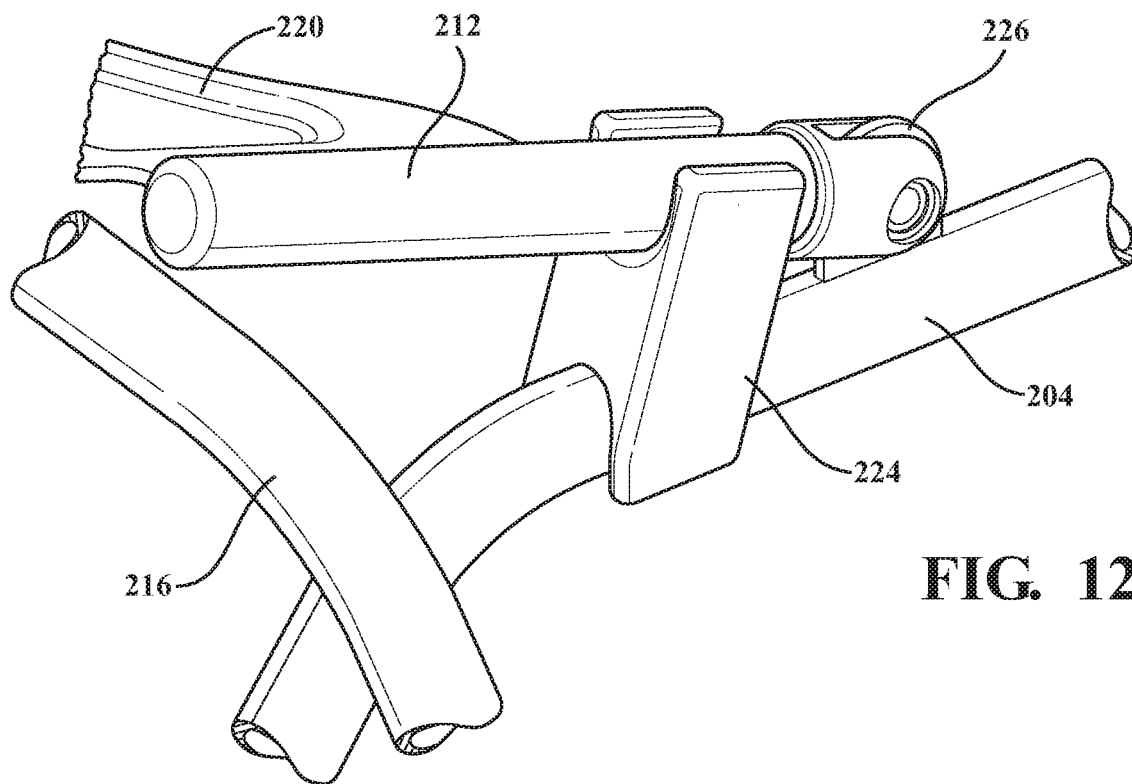
FIG. 12 is a right side rear perspective view including lockdown arrangement features of the soft top cover assembly of FIG. 8, in accordance with an embodiment of the present invention.
Figure 13:
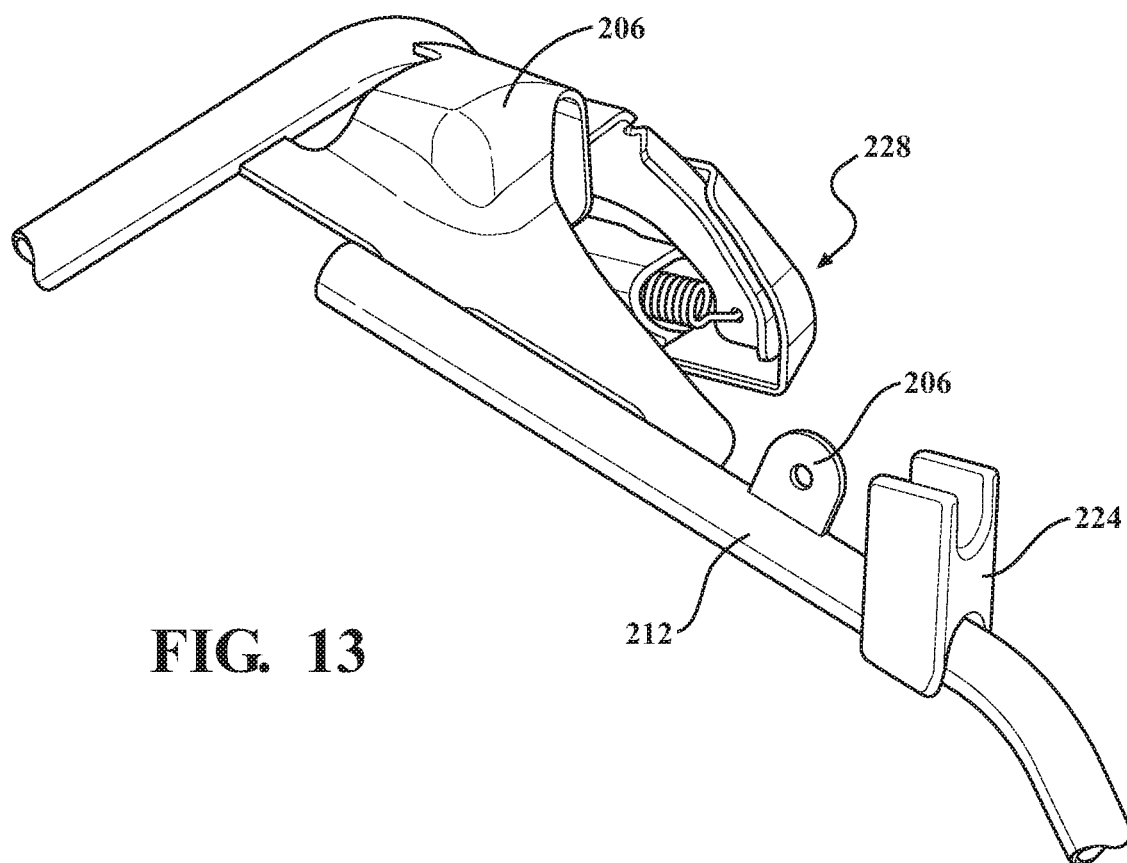
FIG. 13 is a left side rear perspective view including a rear assembly arrangement of the soft top cover assembly of FIG. 12.
Figure 14:
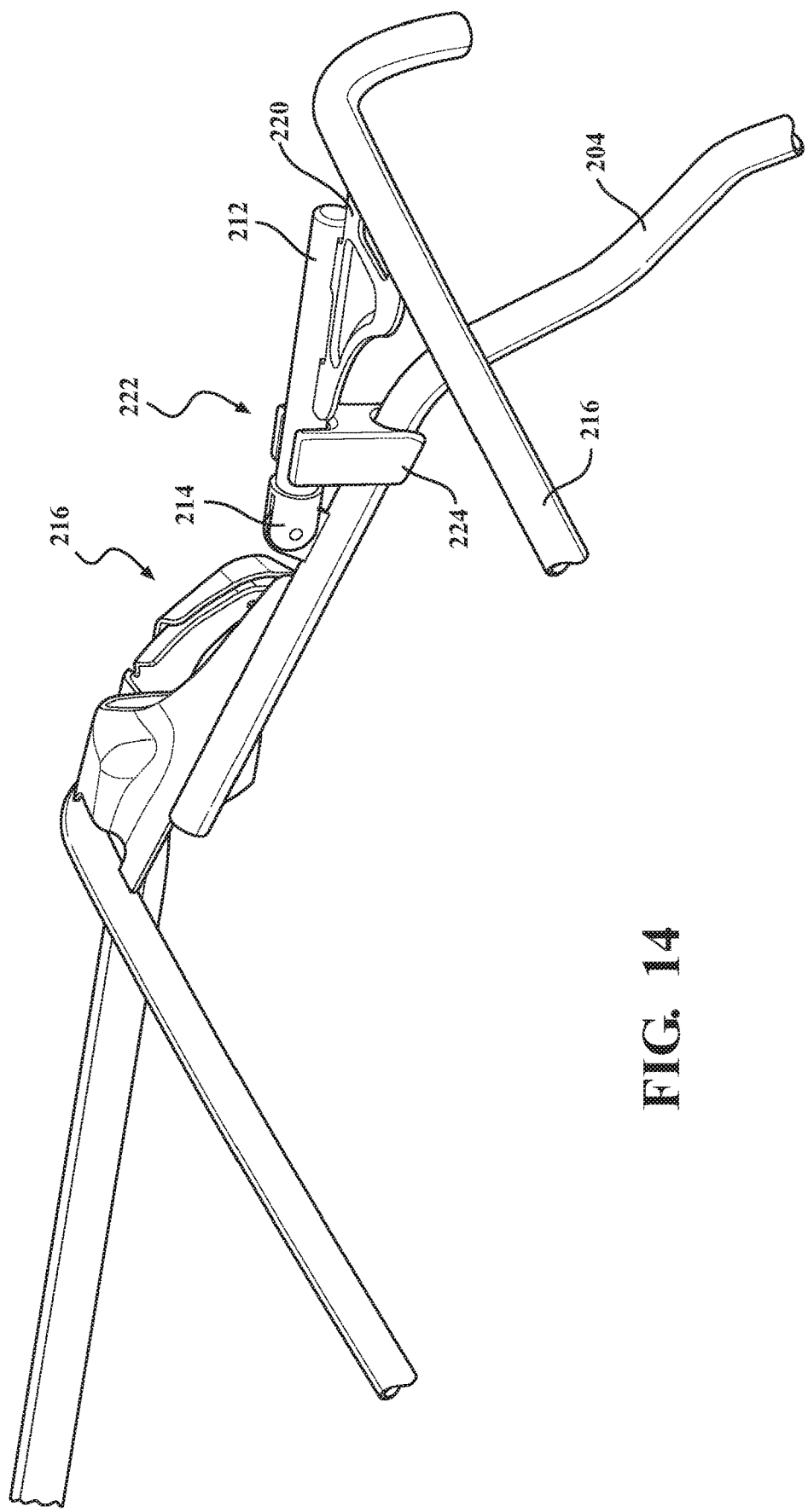
FIG. 14 is an enlarged rear perspective view including the lockdown arrangement of FIG. 12.

The soft top assembly according to any embodiment of the present invention is also preferably secured to front door surrounds, and additionally rear door surrounds for 4-door vehicles (such as FIGS. 9 and 11 rear door surround).

Providing at least one seal, e.g., rubber, foam, etc, to further prevent water from entering the vehicle is contemplated without departing from the scope of the present invention. Preferably, rubber to prevent water permeation. According to one embodiment, the seal, e.g., bulb seal, is located on a door rail and seals off with the underside of the header.

Providing a unique header to door rail interface is contemplated without departing from the scope of the present invention. Adding at least one seal in this region is contemplated without departing from the scope of the present invention.

Providing at least one hole in a trough/lip area of a door rail, e.g., between door edge and door weather-strip, for assisting with water drainage is contemplated without departing from the scope of the present invention.

Providing at least one stop to set the predetermined height of the assembly in the open sunroof position is contemplated without departing from the scope of the present invention.

Providing a header that is steel, cast aluminum, molded plastic, or any other material to meet predetermined requirements is contemplated without departing from the scope of the present invention, preferably, the header is cast aluminum.

The cover is operably coupled to the header. Visual attachment of fasteners for access is contemplated without departing from the scope of the present invention.

Preferably, the soft top assembly is secured to a windshield frame with quick release latches. Locating features on each latch and a corresponding saddle on the windshield frame are contemplated without departing from the scope of the present invention.

At least one locking mechanism, e.g., rear location to lock down position of top in down position, and/or at least one trigger release arrangement is provided according to an embodiment of the present invention.

Incorporating removable soft upper half door(s), soft full door(s) and/or soft quarter panels with any of the above soft top cover assemblies is contemplated without departing from the scope of the present invention.

The 2-door and 4-door descriptions described herein are not limiting. It is understood that any embodiment, and combinations thereof, described herein can be modified and is/are utilizable on any convertible, 2-door or 4-door vehicle.

It is understood that the left side of the assemblies are substantially a mirror-image of the right side of the assemblies.

Figure 32:
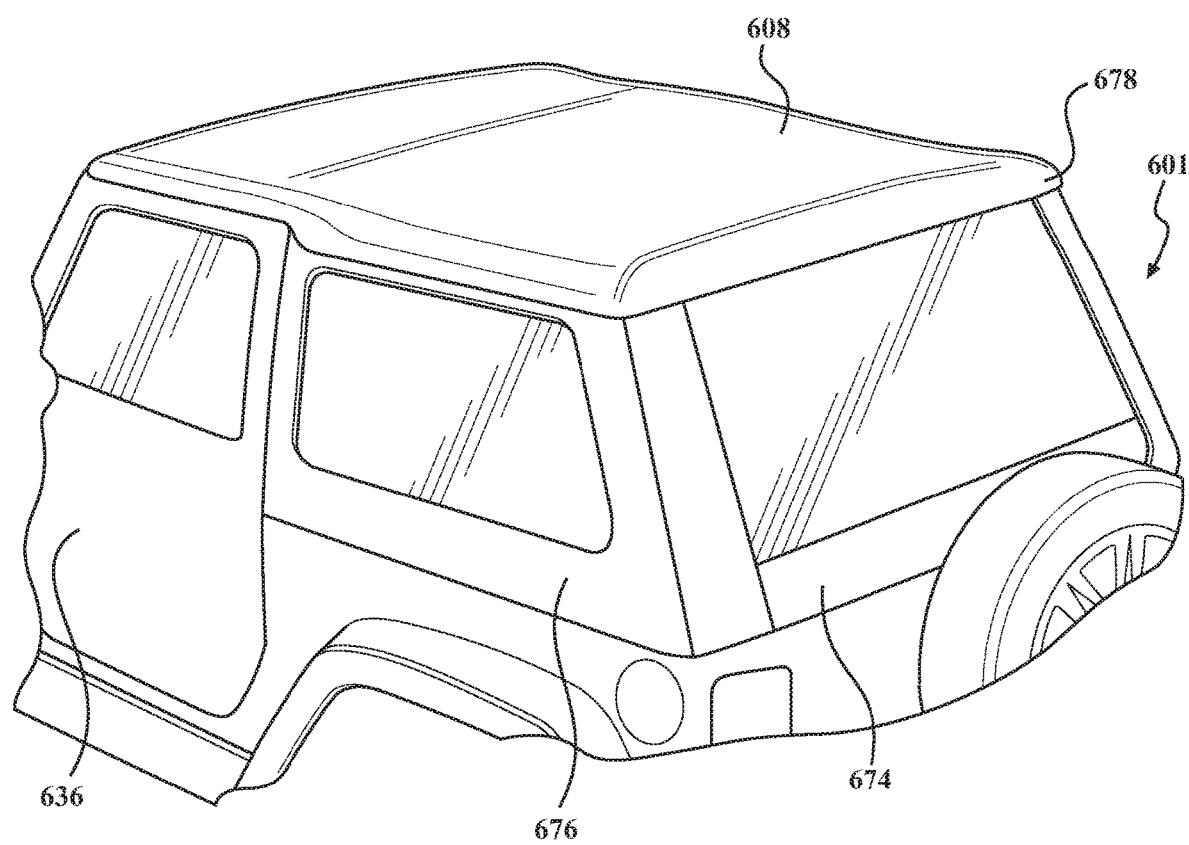
FIG. 32 is a perspective view of the slanted back soft top assembly in a closed position, in accordance with the present invention.

Referring now to FIGS. 24 to 32, there is provided a soft top cover assembly, shown generally at 600, that is a slanted back soft top assembly for a 2-door SUV, or any other suitable type of motor vehicle, in accordance with the present invention. As best shown in FIG. 32, the assembly 600 provides an angled back, as indicated at 601. This angle is a predetermined range amount off vertical. The assembly 600 is movable between at least a closed position closing off an opening generally above the front cockpit of the vehicle and at least one open sunroof position (see FIG. 31) to rotate the cover rearward out of the way to provide an open air feel.

The assembly 600 includes an articulating frame indicated generally at 602 including a pivotal portion shown generally at 604 forming a front bow system. The pivotal portion 604 is moveable between at least a closed position and at least one open sunroof position. The pivotal portion 604 includes a front header 606 or "1 bow" operable connected to a cover 608 that is a soft top material. The pivotal portion 604 also includes a second bow 609 and a linkage assembly including a front rail 610 and a rear rail 612 operably connected by at least one intermediate link 614 at pivot joints shown generally at 616,618. It is understood that additional links or rails are contemplated depending on the application without departure from the scope of the present invention. Alternatively, a single rail 610 or 612 is provided and operably pivotally connected to the vehicle or door rail depending on the application without departure from the scope of the present invention.

The rear rail 612 is affixed to the vehicle at a pivot point, shown generally at 620, provided on a mounting bracket 622. The mounting bracket 622 is located at a predetermined location on the vehicle depending on the application, preferably, mounted to a cross car structural member 624 adjacent to the front cockpit opening to provide an open air experience when the pivotal portion 604 is rotated to the open sunroof position. Alternatively, the mounting bracket 622 is mounted to a sport bar, e.g., such as the front sport bar 630, or a door rail.

Another pivot point, shown generally at 626, is provided on a front door rail 628. The pivot point 626 is a bracket integrally formed with the door rail 628 or is a pivot bracket fastened to the door rail 628. The door rail 628 is connected to the vehicle, preferably, connected to a front sport bar 630 of the vehicle with a plurality of fasteners 632, such as threaded fasteners, extending through clamping surfaces 634 on the door rail 628. The front door rail 628 is also in sealing engagement with the front door 636 of the vehicle.

Preferably, the front rail 610 is attached to the pivot joint 626 of the front door rail 628 with a quick release member 638, e.g., such as a spring catch release knob that is pulled out of an aperture of the front rail 610 and tab 627 on the bracket 626 to quickly release the front rail 610 knuckle from the front door rail bracket. A slot 648 is formed on the knuckle or end of the front rail 610 to receive the bracket 628. Preferably, the rear rail 612 is also attached to the mounting bracket 622 with a quick release member 640, e.g., such as a spring catch release knob that is pulled from an aperture to quickly release the rear rail 612 from the mounting bracket 622. A slot 650 is formed on the knuckle or end of the rear rail 612 to receive a tab of the bracket 622. Alternatively to the spring catch release knob, either rail 610 and 612 is attached with at least one fastener that is a bolt 642 and nut, screw or any other suitable fastener for attachment to the respective bracket 622 or 628.

The cover 608 extends over the second bow 609 and the bow 609 assists in managing the fabric to operably fold out of the way into the open sunroof position. It is understood that the cover 608 can be operable connected to the second bow 609 when desired depending on the application without departure from the scope of the present invention. By way of non-limiting example, an extrusion sewn to the cover 608 is received in a channel provided on the second bow 609 or vice versa.

The assembly 600 also includes at least one limiting stop 644. The stop 644 sets the height of the pivotal portion or any predetermined rail or link thereof in the open or closed positions. The stop 644 is depicted on the intermediate link 614, however, it is understood that at least one stop can be located anywhere on the pivotal portion 604 or front door rail 628 or on a rear door rail 646 or mounted to the vehicle.

Figure 42:
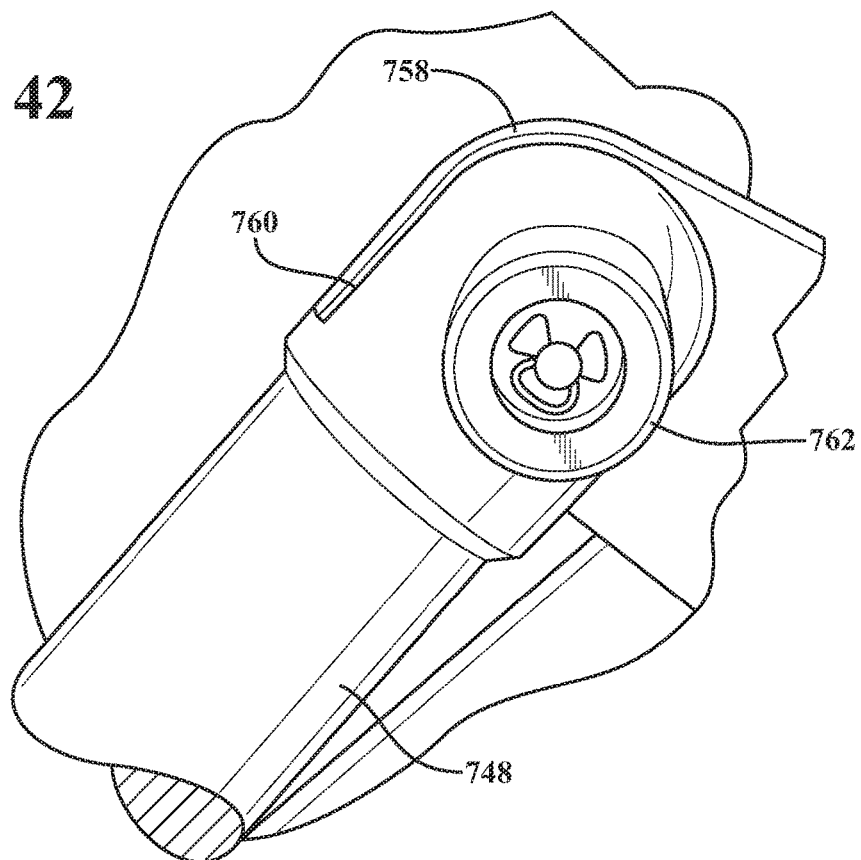
FIG. 42 is a perspective view of a bow with a quick release member mounted to a bracket, in accordance with the present invention.

The assembly 600 further includes a rearward fabric support bow assembly, shown generally at 652, which is fixedly connected to the vehicle, most preferably, to the rear sport bar 654 of the vehicle. The rearward fabric support bow is orientated in a generally upward position. A mounting bracket 656 is operably connected to the sport bar 654 (or other suitable vehicle structure) with at least one fastener. In a preferred embodiment, the mounting bracket 656 at least partially wraps around the sport bar 654 and includes a tab 658 that is received in a slot 660 formed on the knuckle or end of a rear bow upright 662. Preferably, the rear bow upright 662 is attached to the tab 658 with a quick release member (e.g., such as depicted in FIG. 42), e.g., such as a spring catch release knob that is pulled out of an aperture of the rear bow upright 662 and tab 658 on the bracket 656 to quickly release the rear bow upright 662 knuckle from the bracket 656.

The rear bow upright 662 is operably connected to a rear bow 664, preferably, by a bracket 668 connecting the rear bow upright 662 to the rear bow 664. The rearward fabric support bow assembly 652, preferably the rear bracket 668, also includes a tab with a grommet 680 for connecting windows of the assembly. Preferably, at least one bumper is provided on the upright bow 662 as a stand-off with the sport bar 654. Since the upright bow 662 is in a generally upward vertical position, the bumper is between the bow 662 and sport bar 654. The rear bow 664 includes an extension portion 672 to which stay straps for the cover 608 are operably connected, preferably by a plurality of fasteners. An aperture is provided on the extension portion 672 to receive a tensioning member, most preferably, a cable spring attached at one end to the extension portion 672 and that extends through pocket(s) formed on cover 608 edge and operably attaches at the other end to the pivotal portion 604, e.g., second bow 609 or a corner bracket of the second bow, or to a door rail or to the header.

The rear mounting bracket 656 is preferably on the rear of the sport bar 654. Alternatively, the mounting bracket 656 is mounted such that the tab 658 is located on an inner surface of the sport bar 654 to attach the rear bow upright 662 inward.

The cover 608 extends over the rear bow 664 and the rearward fabric support bow assembly 652 assists in cover 608 tensioning and setting the height of the slanted back of the assembly 600. The rear bow 664 also allows the cover 608 to clear the vehicle structure, such as a rear cross car member and sport bar.

It is understood that the cover 608 can additionally be operable connected to the rear bow 664 in the cross car direction when desired depending on the application without departure from the scope of the present invention. By way of non-limiting example, the cover 608 is connected to the rear bow 664 with a plurality of fasteners, e.g., screws, or an extrusion sewn to the cover 608 is received in a channel provided on the rear bow 664 or vice versa. Most preferably, the cover 608 is secured to the bows of the assembly with flaps of material provided on the inner surface of the cover. By way of non-limiting example, flaps are sewn or otherwise suitably attached to the surface of the cover that will face the inside of the vehicle and provided with tongue and loop. The 2-bow 609 and/or rear bow 664 are secured to the cover 608 with respective flaps of the cover 608. Alternatively, or additionally, straps are used. In a move preferred embodiment, the 2-bow 609 is a fabric management bow that assists in managing the cover to fold at least the open sunroof position.

At least one additional cross car member can be used which is/are inserted into slot(s) moved on the front rail 628.

The rearward fabric support bow assembly 652 is a significant improvement over any soft top that does not have a rear bow 664 or just an extruded stiffener in the rear of the top deck. The rearward fabric support bow assembly 652 of the present invention also helps to keep the cover 608 from shifting side-to-side.

The assembly 600 selectively provides further plurality of open air options, including, removal of a rear window 674 or one or both of rearward quarter windows 676. When the rear window 674 and both quarter windows 676 are removed, the cover 608 can remain attached providing a roof top with the top deck 678 alone or the pivotal portion 604 can be rotated to the open sunroof position such that the front cockpit is not covered but the rest of the top deck 678 covers the top of the vehicle. The assembly pivotal portion 604 and rearward fabric support bow assembly and cover 608 can also be removed from the vehicle to provide a fully open air experience. The quick release members assist in quicker removal of the assembly 600 from the vehicle when desired. The windows 674 and 676 are preferably connected to the top deck 678 and vehicle in a zipperless manner, which will be explained in greater detail below and as depicted in FIGS. 45 to 56, which are incorporated here. It is understood that the rearward fabric support bow assembly 652 is adaptable to be rotatably mounted to the sport bar 654 for rotating from a generally upward position to a generally downward position to stow the cover 608 in the tub to provide a yet further open air experience if desired depending on the application without departure from the scope of the present invention.

The back of the assembly 600 is slanted. Generally, the angle of the slanted back 601 is less than 90 degrees. Typically, from about 75 to about 30 degrees. Preferably, from 75 to about 40 degrees. Most preferably, from 70 to 45 degrees.

The present invention provides for the slanted back. The slanted back provides a profile that is angled downward in the rear of the vehicle toward the tailgate. More particularly, a rear window panel can be at a predetermined angle from the upright position, off-vertical. Generally, at least 15 degrees from vertical, typically at least 20 degrees, preferably at least 25 degrees, most preferably, at least 35 degrees, particularly preferred from about 15 to 45 degrees.

Figure 33:
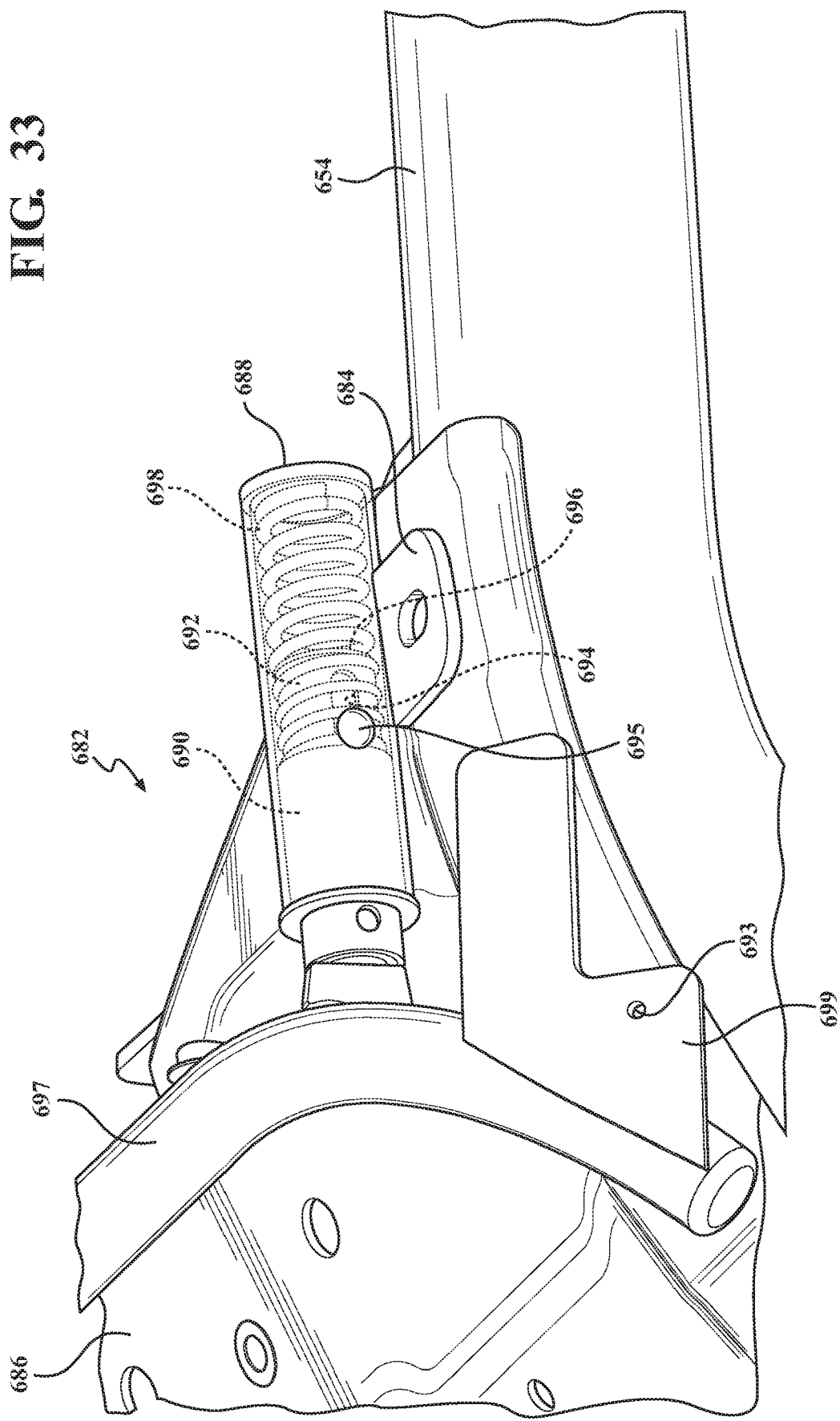
FIG. 33 is a perspective view of a rearward fabric support bow assembly, according to an embodiment of the present invention.
Figure 34:
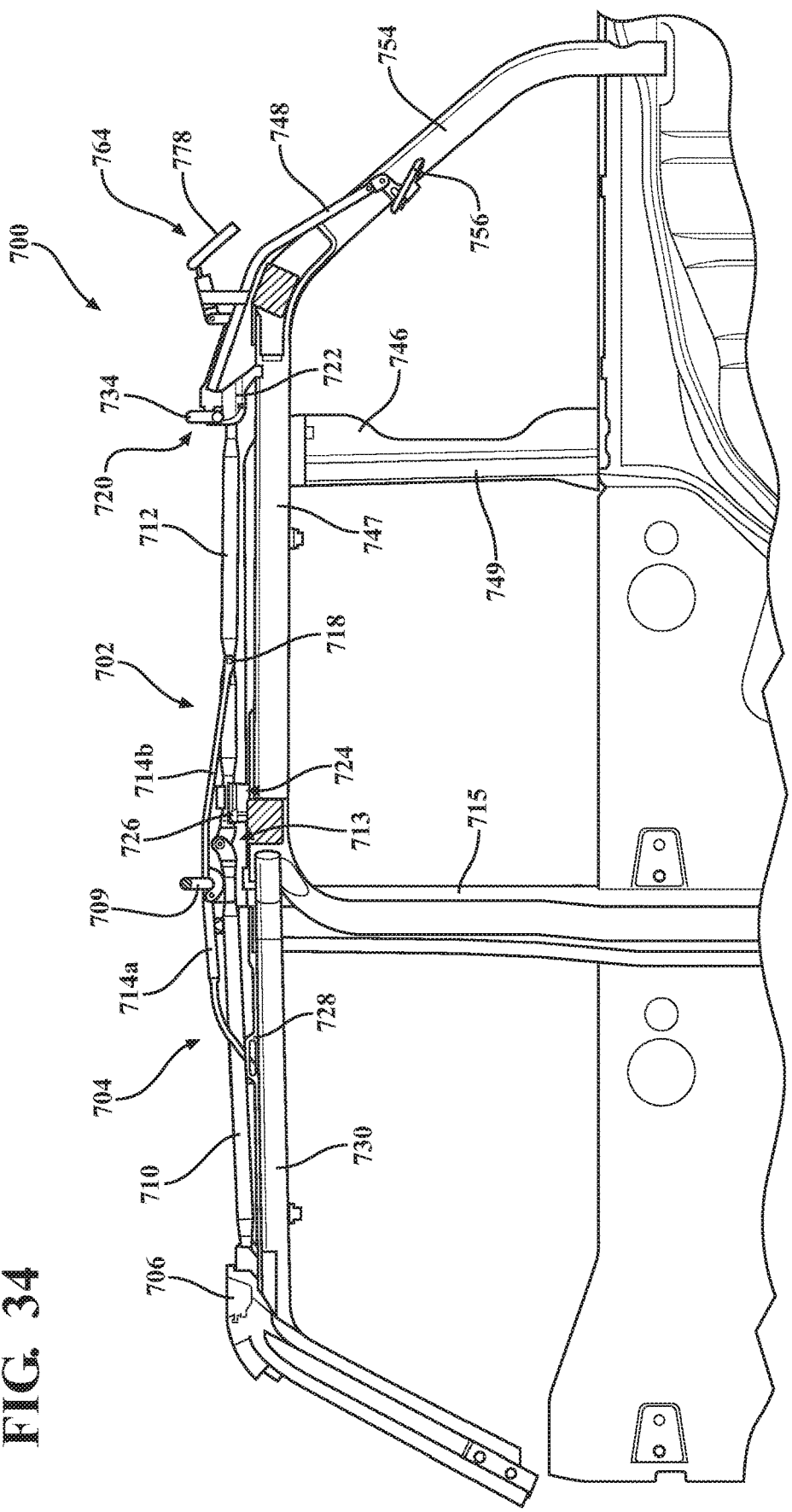
FIG. 34 is a side elevation view from the interior of a vehicle depicting a soft top cover assembly on a 4-door vehicle, in accordance an embodiment of the present invention.
Figure 35:
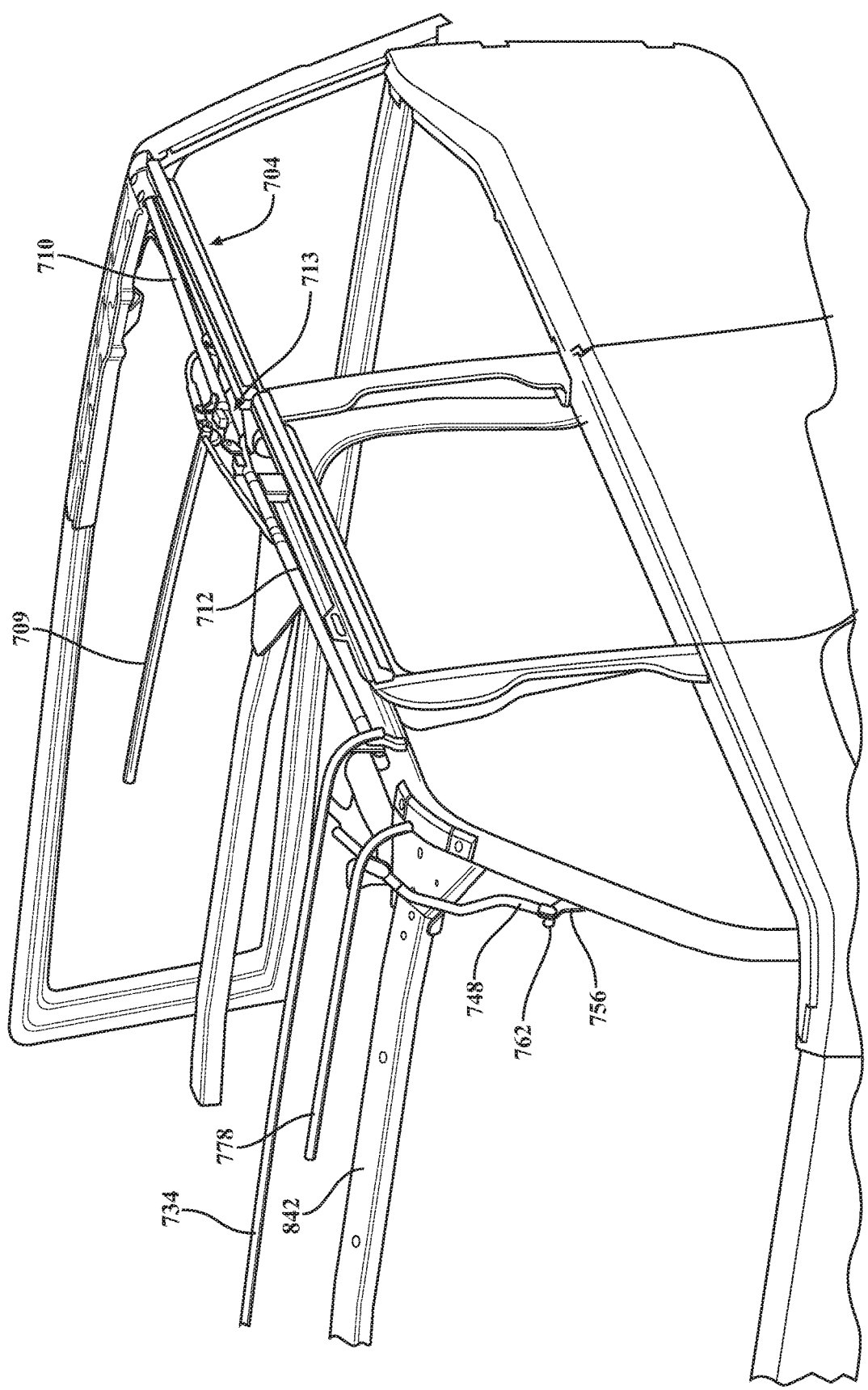
FIG. 35 is a perspective view of the soft top cover assembly, in accordance with the present invention.
Figure 36:
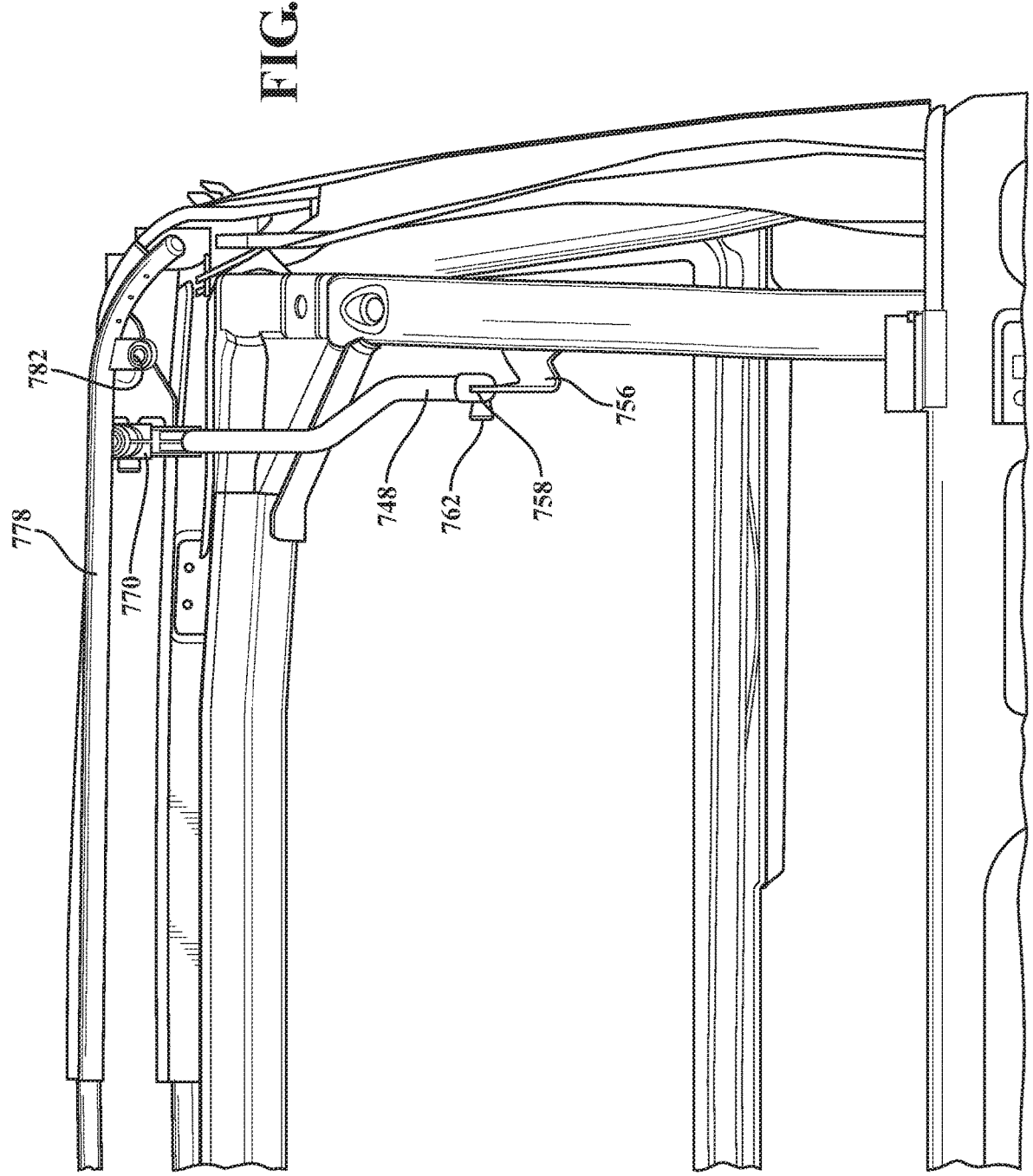
FIG. 36 is a rear elevation view of the soft top cover assembly, in accordance with the present invention.
Figure 37:
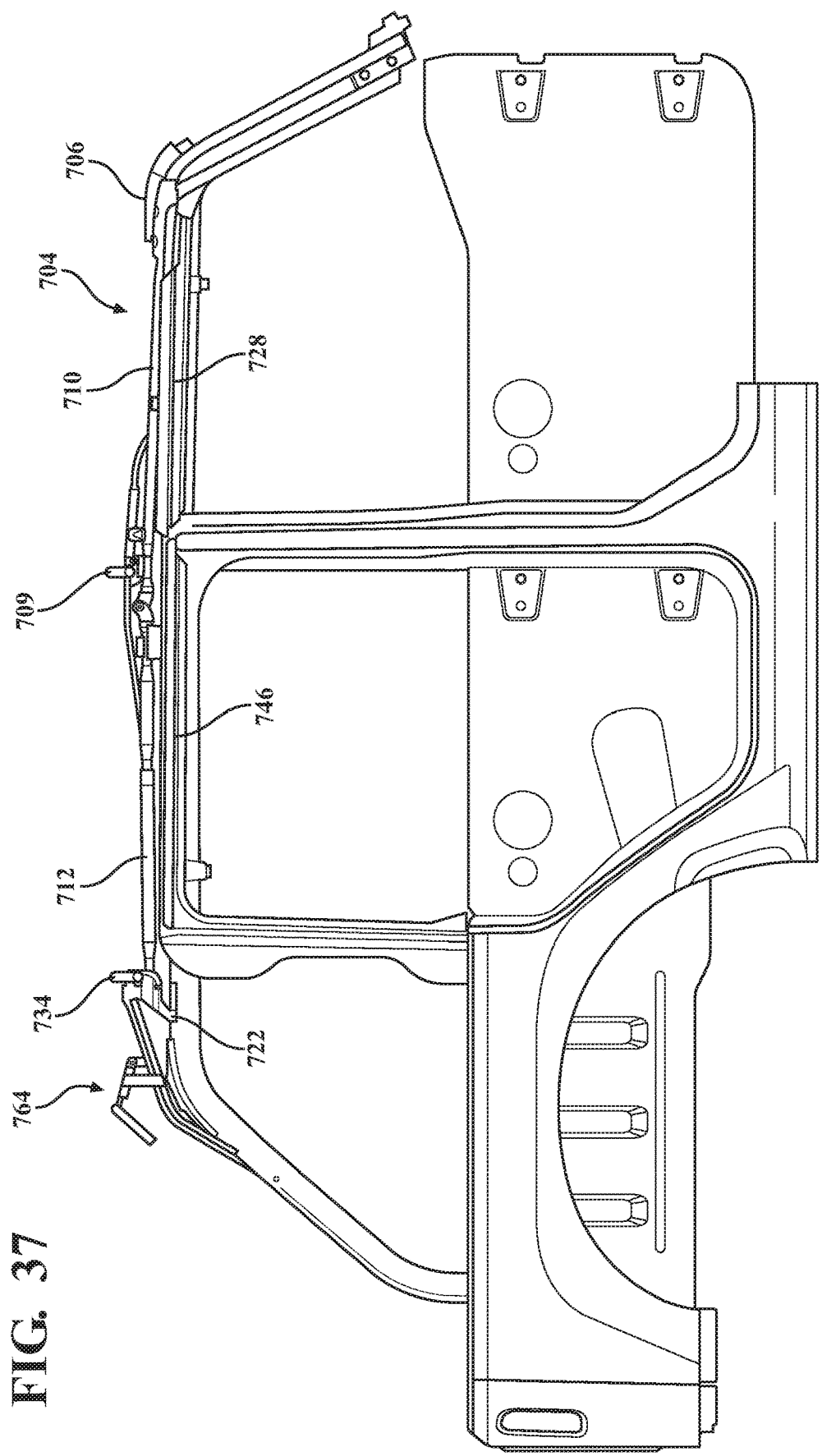
FIG. 37 is side elevation view of the soft top cover assembly, in accordance with the present invention.
Figure 38:
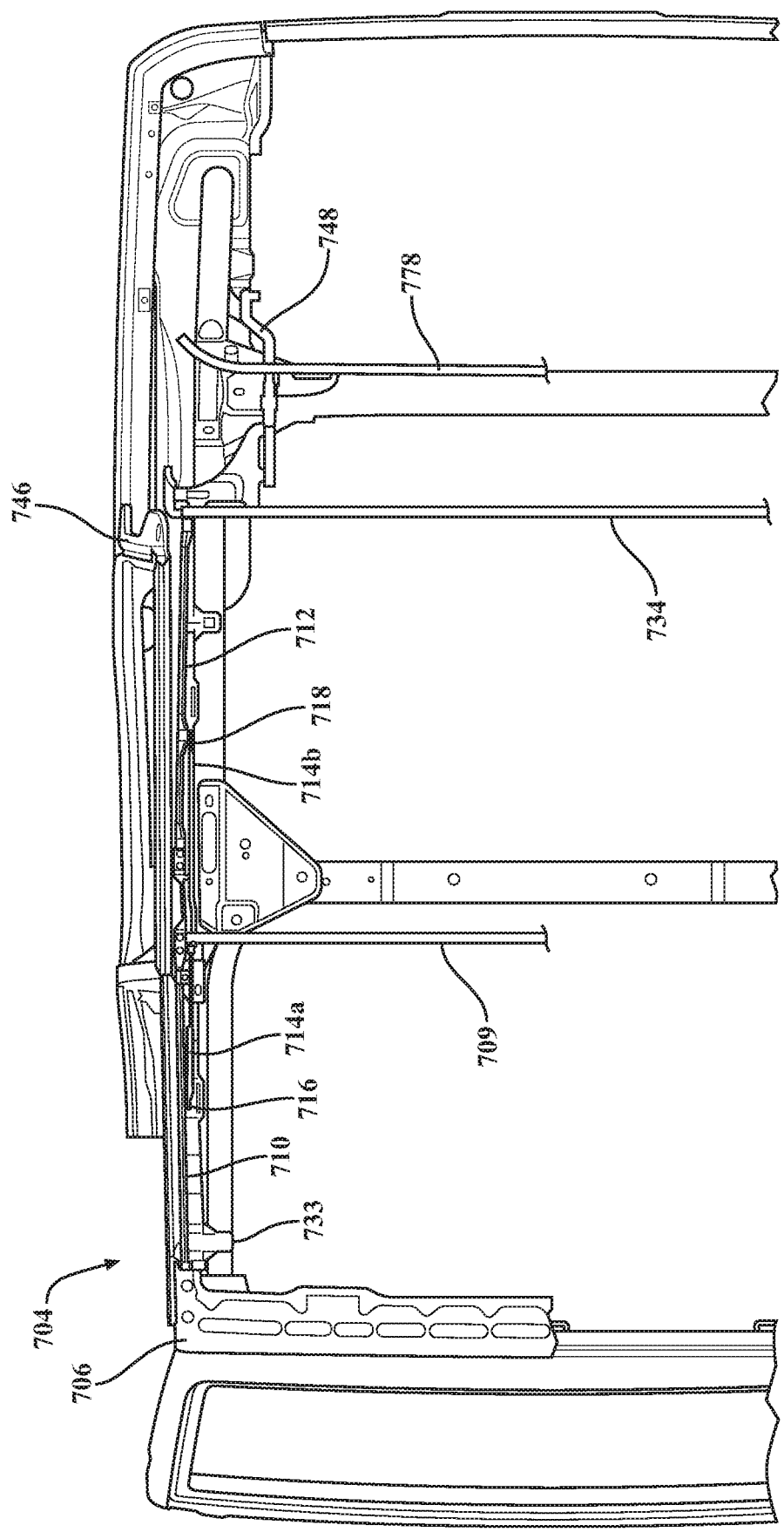
FIG. 38 is a top plan view of the soft top cover assembly, in accordance with the present invention.
Figure 39:
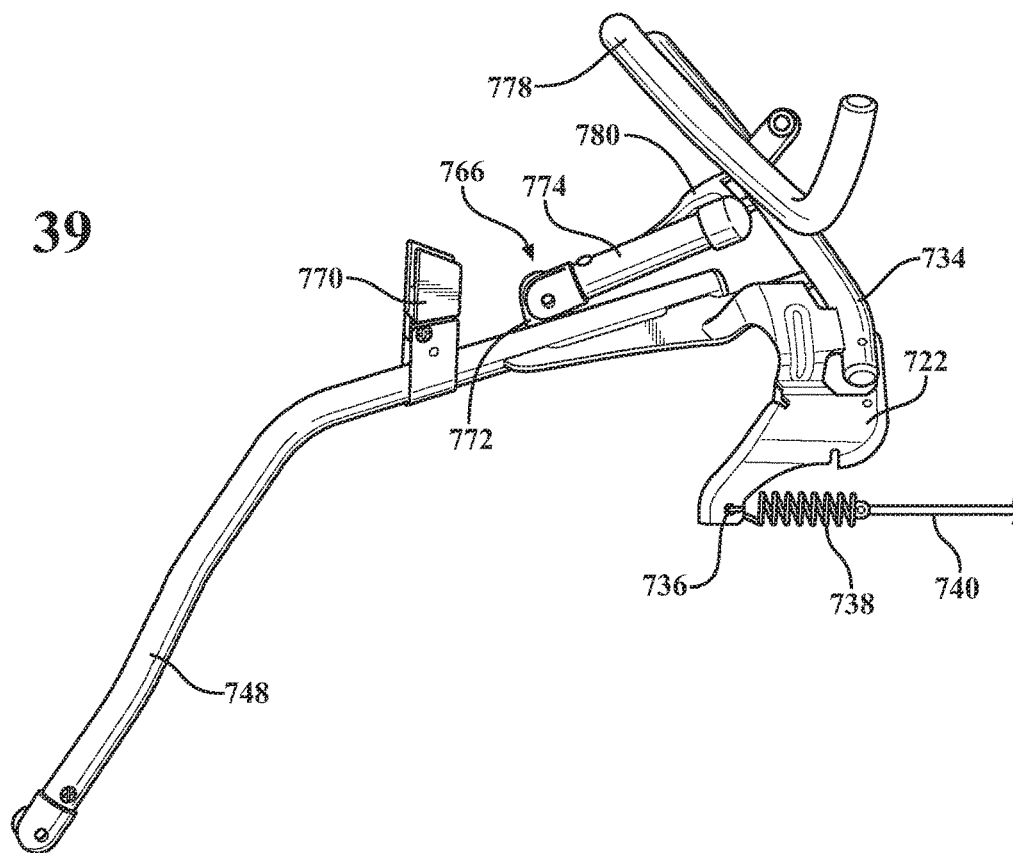
FIG. 39 is a perspective view of a rearward fabric support bow assembly in a forward/upward position, in accordance with the present invention.
Figure 40:
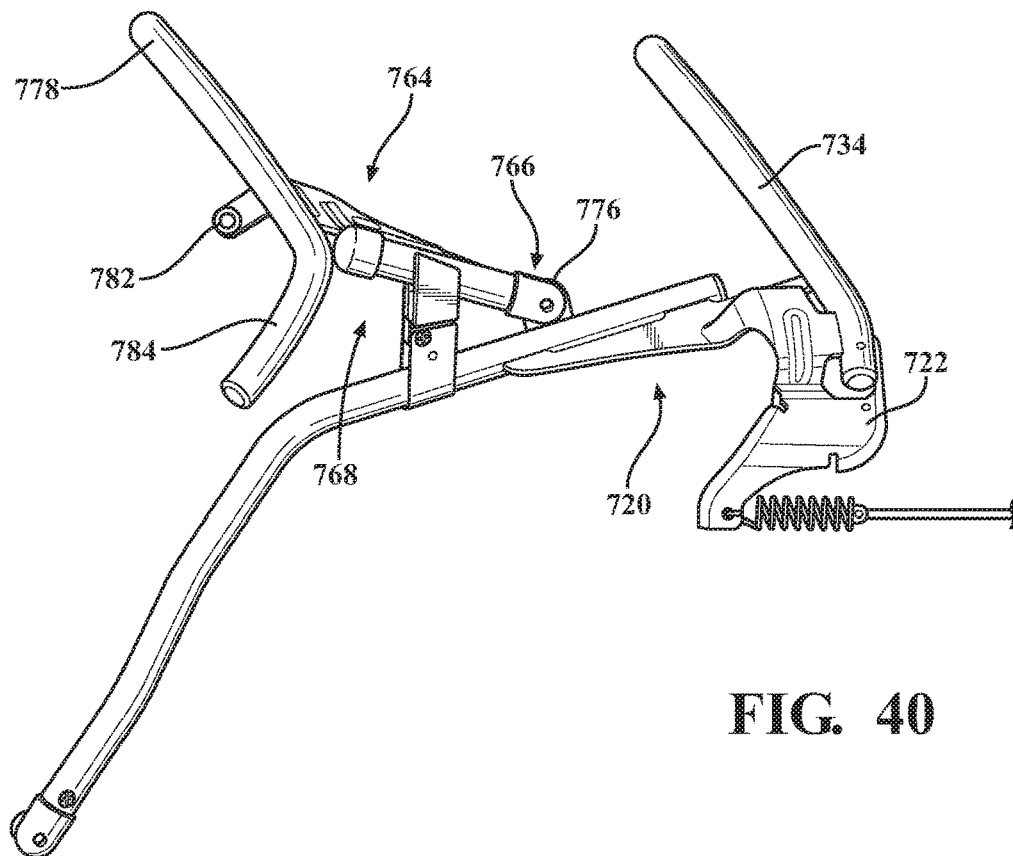
FIG. 40 is a perspective view of the rearward fabric support bow assembly rotated to a rearward/downward position, in accordance with the present invention.
Figure 41:
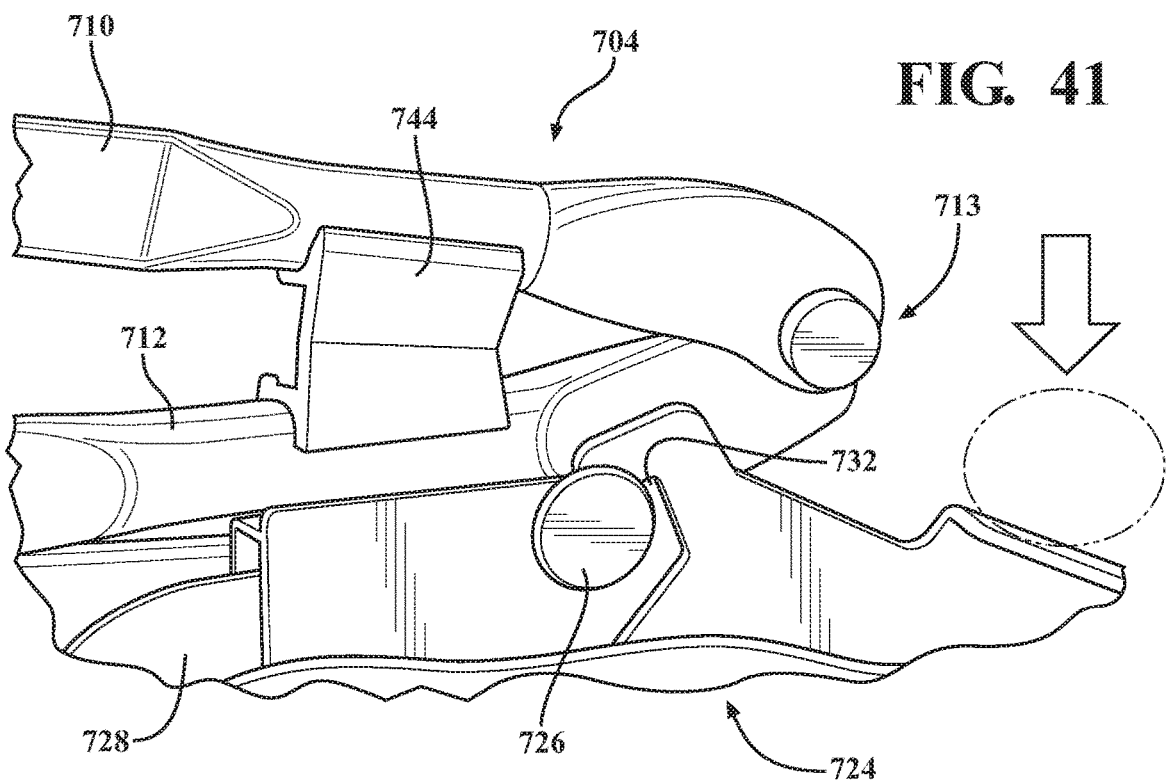
FIG. 41 is a perspective view of a locking mechanism for a pivotal portion of the soft top assembly, in accordance with the present invention.

Referring now to FIGS. 24 to 33, in particular to FIG. 33, there is provided a soft top cover assembly with an identical pivotal portion 604 as described previously, but the soft top assembly has an alternative rearward fabric support bow assembly, shown generally at 682, incorporating a tensioning device that is spring loaded to the vehicle for providing adjustable fabric tensioning. A particularly preferred environment of use for the rearward fabric support bow assembly 682 is a 4-door SUV, however, the assembly 682 is adaptable for incorporating on a 2-door SUV or any other suitable type of motor vehicle, in accordance with the present invention. The soft top cover assembly also preferably includes front and/or rear door rails 628, 646 as described previously.

The rearward fabric support bow assembly 682 includes a mounting bracket 684 operably connected to the vehicle by at least one fastener, preferably, to a rear cross car member 686 of the vehicle, most preferably, to the rear sport bar 654. The bracket 684 is operably connected to a tube 688 that is closed on the end. A fixed bushing 690 is received in the tube 688. A cylinder 692 having a limiting slot 694 is received in the fixed bushing 690 that is located in the tube 688. A pin 695 is sized to travel in the limiting slot 694. A washer is located at the end of the cylinder 696. The other end of the cylinder 696 is operably connected to a rear bow 697 of the rearward fabric support bow assembly 682. A spring is located inside the tube 688 against the bushing 690 and about the outer diameter of the cylinder 692. An extension portion 699 is operably connected to the rear bow 686. An aperture 693 is provided on the extension portion 699 to receive a tensioning member, most preferably, a cable spring attached at one end to the extension portion 699 and with a cord that extends through pocket(s) formed toward the fore/aft edge of cover 208 and operably attaches at the other end with a spring to the pivotal portion 604, e.g., second bow 609 or a corner bracket of the second bow, or to a door rail. The pin 695 is goes through an aperture of the tube 688 and into the limiting slot 694. The pin 695 limits the travel in the slot 694 for tensioning the top cover 208. The cylinder 692 pushes on the bushing 690 and the washer 696, which in turn pushes on the spring 698 and bottoms out in the tube 688.

Thus, the spring loaded fabric support bow assembly 682 assists in cover tensioning and setting the height of the slanted back 601 of the soft top cover assembly. The rear bow 697 also allows the cover to clear the vehicle structure, such as a rear cross car member and sport bar.

Preferably, the spring loaded fabric support bow assembly 682 forms a rear bow that replaces a typical fixed cross car arch with a semi-permanent spring loaded bow installed on the sport bar. The unique spring feature includes a compression spring to provide adjustment for the attachment position and fabric tension which further reduces installation effort. Typically, the fabric is attached to the rear bow by snaps allowing the customer to completely remove the fabric without tools when desired. Alternatively, attachment is contemplated, e.g., adhesive, sewn pocket(s), and/or fastener(s), depending on the application without departure from the scope of the present invention.

The pivotal portion moves between at least a closed position and at least one open sunroof position. The assembly also selectively provides further plurality of open air options, including, removal of a rear window or one or both of rearward quarter windows. When the rear window and both quarter windows are removed, the cover can remain attached providing a roof top with the top deck alone or the pivotal portion can be rotated to the open sunroof position such that the front cockpit is not covered but the rest of the top deck covers the top of the vehicle. The assembly pivotal portion 604 and rearward fabric support bow assembly 682 and cover can also be removed from the vehicle to provide a fully open air experience. The windows are preferably connected to the top deck and vehicle in a zipperless manner, which will be explained in greater detail below and as depicted in FIGS. 45 to 56, which are incorporated here.

Referring now to FIGS. 34 to 58, there is provided a soft top cover assembly, shown generally at 700, that is a slanted back soft to assembly for a 4-door SUV, or any other suitable type of motor vehicle, in accordance with the present invention. As best shown in FIG. 56, the assembly 700 provides a slanted back, as indicated at 701. This angle is a predetermined range amount off vertical. The assembly 700 is movable between a closed position closing off an opening generally above at least the front cockpit of the vehicle, more preferably, generally above the front and rear cockpit, and at least one open sunroof position (see FIG. 45) to rotate the cover rearward of the rear passenger compartment out of the way to provide an open air feel.

The assembly 700 includes an articulating frame indicated generally at 702 including a pivotal portion shown generally at 704, forming a front bow system, and a rearward fabric support bow assembly. The pivotal portion 704 is moveable between at least a closed position and at least one open sunroof position. The pivotal portion 704 includes a front header 706 or "1 bow" operable connected to a cover 708 that is a soft top material. The pivotal portion 704 also includes a second bow 709 and a linkage assembly including a front rail 710 pivotally connected to a rear rail 712 at a pivot joint, generally shown at 713. The pivot joint 713 is generally located adjacent to and behind the B-pillar 715 of the vehicle. However, any predetermined location is contemplated depending on the application without departure from the scope of the present invention. Alternatively, a single rail 710 or 712 is provided and operably pivotally connected to the door rail depending on the application without departure from the scope of the present invention.

The first rail 710 is operably connected to the second bow 709 by at least a first intermediate link 714a that is also pivotally connected to the first rail 710. The rear rail 712 is operably connected to the second bow 709 by a second intermediate link 714b that is also pivotally connected to the rear rail 712 at pivot joint 718. It is understood that additional links and rails are contemplated depending on the application without departure from the scope of the present invention.

The rear rail 712 is connected at a forward end to the first rail 710, and the rearward end of the rear rail 712 is operably connected to an intermediate bow assembly, shown generally at 720 (e.g., 3-bow assembly), preferably, to a bracket 722 provided on the 3-bow assembly 720. Most preferably, the rear rail 712 includes a slot at the knuckle or end of the rear rail 712 that receives a tab of the bracket 722 secured with at least one fastener thereby providing a pivotal connection for the rear rail 712.

At least one locking mechanism is provided, shown generally at 724, to engage a tab 726 provided to secure the pivotal portion in place when in the closed position and open sunroof position. A door rail, e.g., rear door rail 728, is operably coupled to a rotatable latch 730 having spring catch 732 that rotates to lock to the tab 726. In this position the pivotal portion 704 is kept from moving rearward when in the open sunroof position. Depressing the latch 730 (indicated by the arrow in FIG. 41) causes the latch 730 to rotate to release the spring catch 732 from the tab 726. Once released, the pivotal portion 704 can be removed from the rear door rail 728 and moved rearward toward the tailgate and down into the cargo area of the vehicle, as will be explained in further detail below.

The assembly 700 also includes at least one limiting stop 744. The stop 744 sets the height of the pivotal portion or any predetermined rail or link thereof in the open or closed positions. The stop 744 is depicted coupled to the front or rear rail 710, 712, however, it is understood that at least one stop can be located anywhere on the pivotal portion 704 or front door rail 728 or on a rear door rail 746 or mounted to the vehicle. The rear door rail 746 is operable coupled to the vehicle, e.g., sport bar 747 and D-pillar area 749.

The assembly 700 also includes a front door rail 728 connected to the vehicle, preferably, connected to a front sport bar 730 of the vehicle with a plurality of fasteners, such as threaded fasteners, extending through clamping surfaces 733 on the front door rail 728. The front door rail 728 is also in sealing engagement with the front door 735 of the vehicle.

The 3-bow assembly 720 includes a 3-bow 734. The bracket 722 of the 3-bow assembly 720 also includes at least one aperture 736 to connect a tensioning member 738, preferably, a spring 738 for a cable 740 running through pocket(s) of the cover 708 to tension the cover 708. The cover 708 extends over the second and third bows 709 and 734. It is understood that the cover 708 can be operable connected to the second bow 709 and/or third bows 734 when desired depending on the application without departure from the scope of the present invention. By way of non-limiting example, an extrusion sewn to the cover 708 is received in a channel provided on the second bow 709 or third bow 734, or vice versa. The other end of the cable can include a second tensioning member 738, most preferably, a cable spring, attached at the other end at a predetermined location, e.g., to the pivotal portion, e.g., second bow or a corner bracket of the second bow, three bow, or to a door rail or to the header, etc.

It is understood that the tensioning device 738, cable 740 and bracket 722 are adaptable for use on any other aspect of the present invention, including any of the soft top cover assemblies set forth herein.

The 3-bow assembly 720 further includes a rear bow upright 748 which is pivotally connected to the vehicle, most preferably, to the rear sloped sport bar 754 of the vehicle. The upright rear bow 748 rotates from a generally upward/angled forward position (e.g., FIG. 34) to a generally downward/angled rearward position (e.g., FIG. 46). A mounting bracket 756 is operably connected to the sport bar 754 (or other suitable vehicle structure) with at least one fastener. As best shown in FIG. 42, preferably, the mounting bracket 756 attaches to the inward surface of the sport bar 754 and includes a tab 758 that is received in a slot 760 formed on the knuckle or end of a rear bow upright 748. Preferably, the rear bow upright 748 is attached to the tab 758 with a quick release member 762, e.g., such as a spring catch release knob that is pulled out of an aperture of the rear bow upright 748 and tab 758 on the bracket 756 to quickly release the rear bow upright 748 knuckle from the bracket 756.

The rear mounting bracket 756 is preferably on the inner side of the sport bar 754. Alternatively, the mounting bracket 756 is mounted such that the tab 758 is extends from a rear surface of the sport bar 754 to attach the rear bow upright 748.

The assembly 700 further includes a rearward fabric support bow assembly, shown generally at 764, that is pivotally connected to the 3-bow assembly 720 at a pivot joint shown generally at 766. The 3-bow/rearward fabric support bow assembly includes a lockout system shown generally at 768, including an upstanding brace 770 connected to the 3-bow upright 748 to selectively hold the rearward fabric support bow assembly 764 in a locked position.

A mounting bracket 772 is provided on the 3-bow upright 748 to pivotally connect a leg 774 or short bow of the rearward fabric support bow assembly 764 to the 3-bow upright 748 at the pivot joint 766. Preferably, the bracket 772 is received in a slot 776 formed on the knuckle or end of the leg 774 and secured with a fastener to provide a pivot point.

The rearward fabric support bow assembly 764 assembly also includes a rear bow 778. The rear bow 778 is preferably connected to the leg 774 with a bracket 780. The rear bow 778 includes a tab with a grommet 782 for connecting windows of the assembly. Turned end portions 784 of the rear bow 778 provide an attachment location for stay straps 786 of the cover 708, e.g., using a plurality of fasteners 788 such as screws. The leg 774 is rotated rearward and to fit into the upstanding brace 770 and is held by the upstanding brace 770 to set the height and top edge location of the slanted back and tension the top deck 790. When desired (such as to gain access to attachment features of a rear window 795, the leg 774 is disengaged from the upstanding brace 770 and rotated toward the front of the vehicle.

Most preferably, the cover 708 is secured to the bows of the assembly with flaps of material provided on the inner surface of the cover. By way of non-limiting example, flaps are sewn or otherwise suitably attached to the surface of the cover that will face the inside of the vehicle and provided with tongue and loop. The 2-bow 709, 3-bow 734 and/or 4-bow 764 are secured to the cover 708 with respective flaps of the cover 708. Alternatively, or additionally, straps are used.

At least one additional cross car member can be used which is/are inserted into slot(s) moved on the front rail 728.

Figure 43:
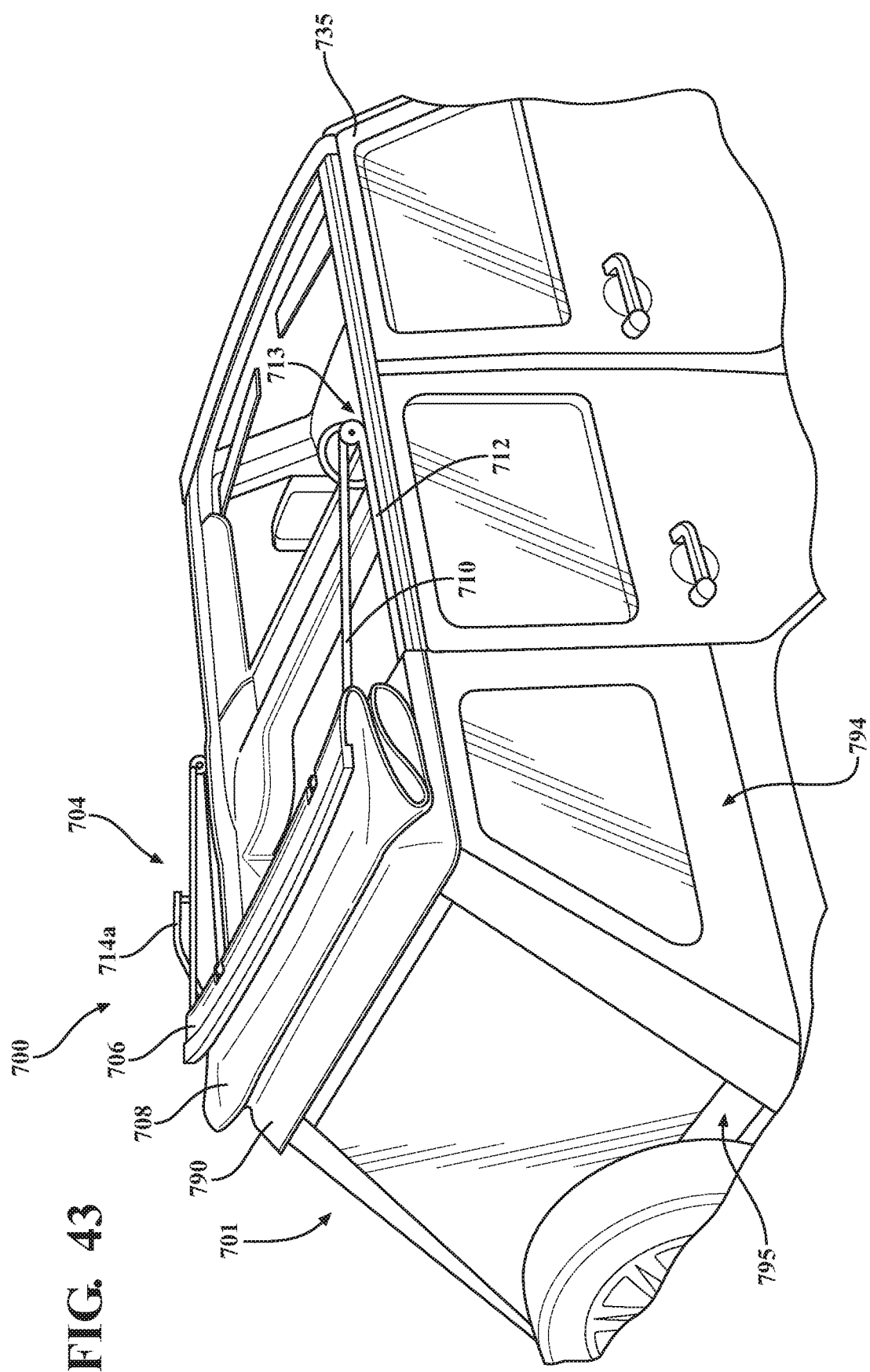
FIG. 43 is a perspective view of the soft top cover assembly in an open sunroof position, in accordance with the present invention.

FIG. 43 depicts an assembly 700 wherein the pivotal portion 704 has been rotated to an open sunroof position. Quarter windows, shown generally at 794, and the rear window 795 are depicted attached. An operator can also decide to rotate the pivotal portion 704 to the closed position and remove one or more of the windows. Further, when desired, one or more than one of the windows can be removed for a further open air experience while the pivotal portion 704 is in the open sunroof position.

Figure 44:
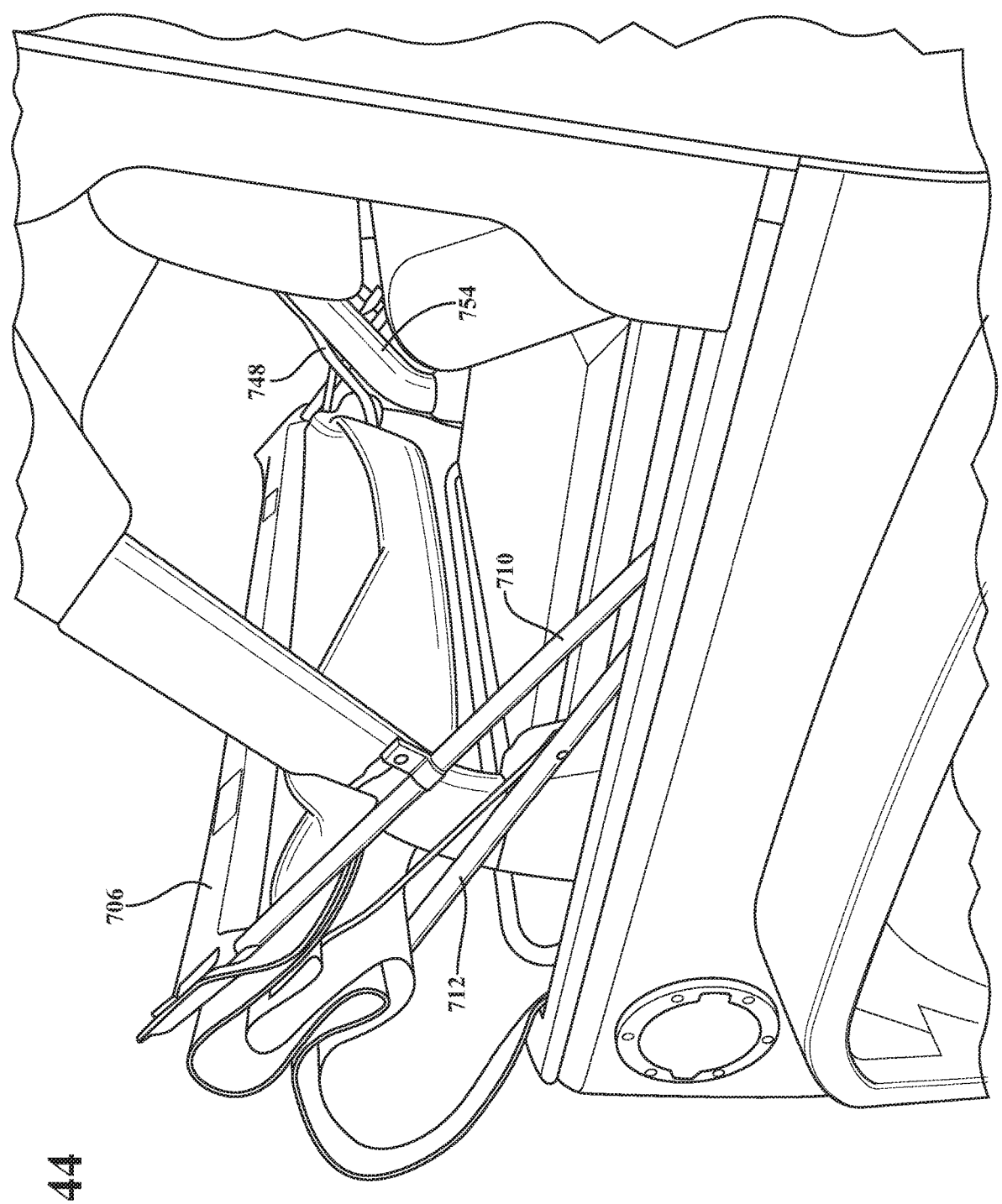
FIG. 44 is a perspective view of the soft top cover assembly in an open position, in accordance with the present invention.
Figure 45:
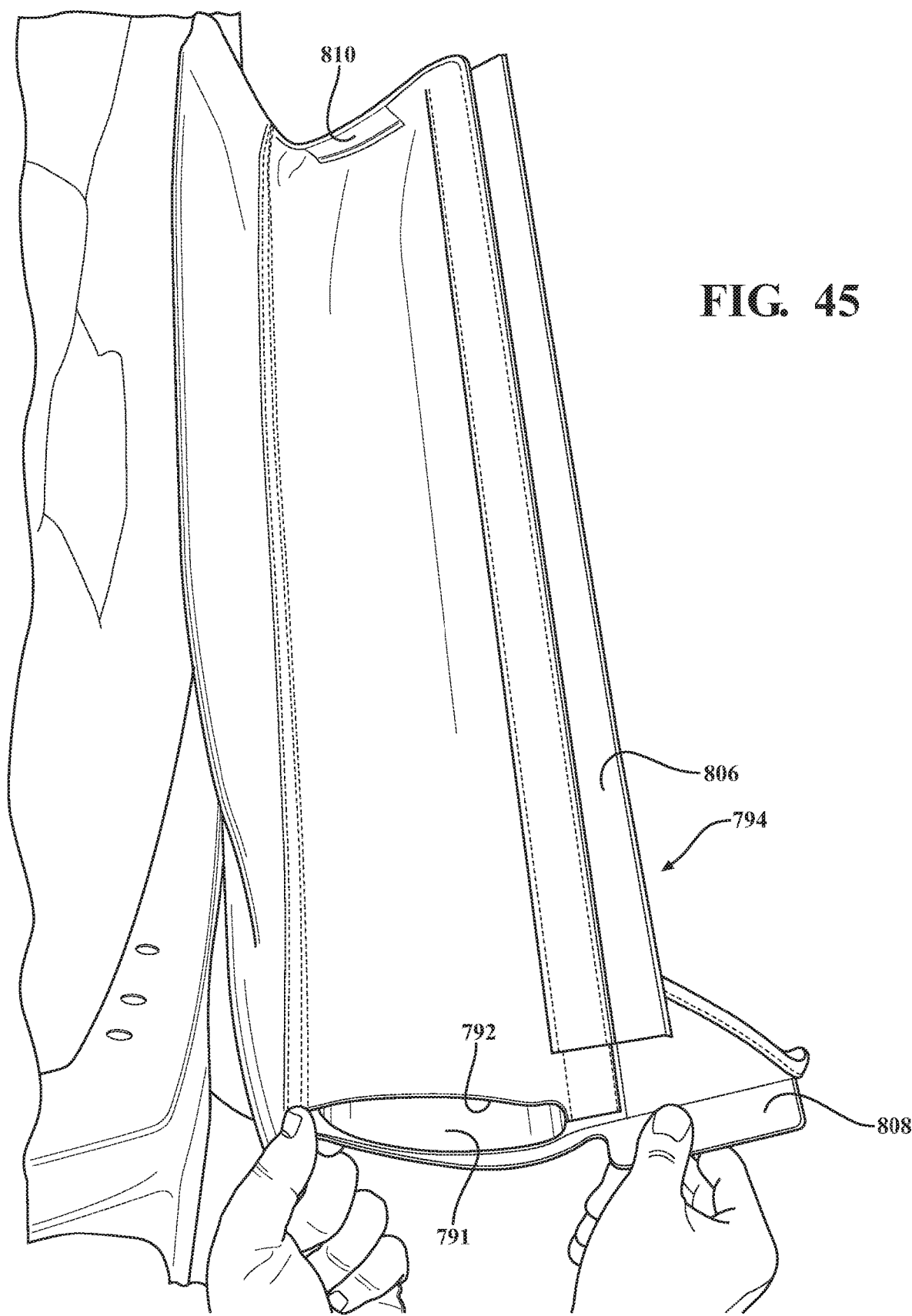
FIG. 45 is a perspective view of a quarter window stiffener for a planar slanted back of the soft top cover assembly, in accordance with the present invention.

FIG. 44 depicts the assembly 700 wherein the rear window 795 and quarter windows 794,794 have been removed and the assembly 700 has been rotated back and down into the tub or cargo area of the vehicle. To release the pivotal portion 704, the latch 730 of the locking mechanism 724 was depressed to rotate the catch 732 to release from the tab 726, thereby allowing the pivotal portion 704 to be released from the door rail for an operator to then rotate the entire frame to the cargo area. This provides another open position for a further open air experience. If desired, an operator can now additionally pull the quick release member 762 to release the rear bow upright 748 from the mounting bracket 756 to completely remove the assembly 700 from the vehicle. In addition, it is understood that, alternatively, the windows 795 or 794,794 are not removed prior to rotating the assembly 700 into the cargo area.

It is understood that the locking mechanism 724 and corresponding features are adaptable for use on any other aspect of the present invention, including any of the soft top cover assemblies set forth herein.

Referring more particularly to FIGS. 45-58, there is provided a zipperless installation of quarter windows, shown generally at 794,794 and the rear window 795. However, it is understood that the zipperless features and installation are adaptable and applicable for any 2-door and 4-door soft top assemblies set forth previously and below. The quarter windows 794,794 each include at least one rear corner stiffener 791 (best shown in FIG. 45) inserted into a corner pocket 792 of the quarter window panels 794,794. By way of non-limiting example, the stiffener 791 is metal, steel, injection molded, thermoformed, etc. The stiffener 791 holds the rear corner of the assembly 700 and the quarter window 794 planar.

Figure 46:
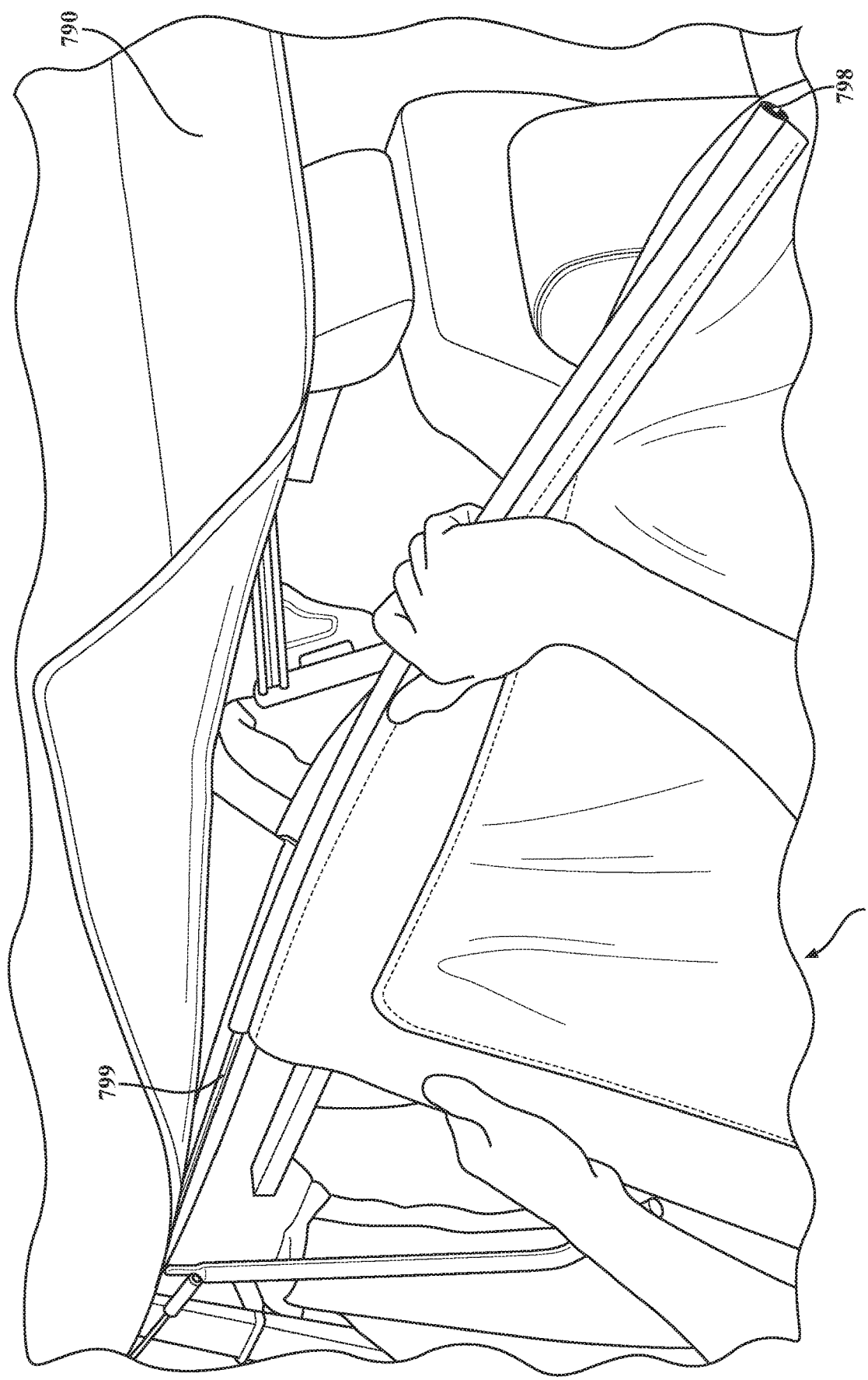
FIG. 46 is a perspective view of a quarter window of the soft top cover assembly slidably connecting to a top deck of the soft top cover assembly, in accordance with the present invention.

As best shown in FIG. 46, a channel 798, e.g., plastic channel, of a carrier provided toward the top of the quarter window 794 is slid onto an elongated thin tube 799 of the provided under the top deck 790 of the cover 708. It is understood that alternatively, the channel 789 can be provided on the underside of the top deck and the thin tube 799 provided on the quarter window 794.

Figure 47:
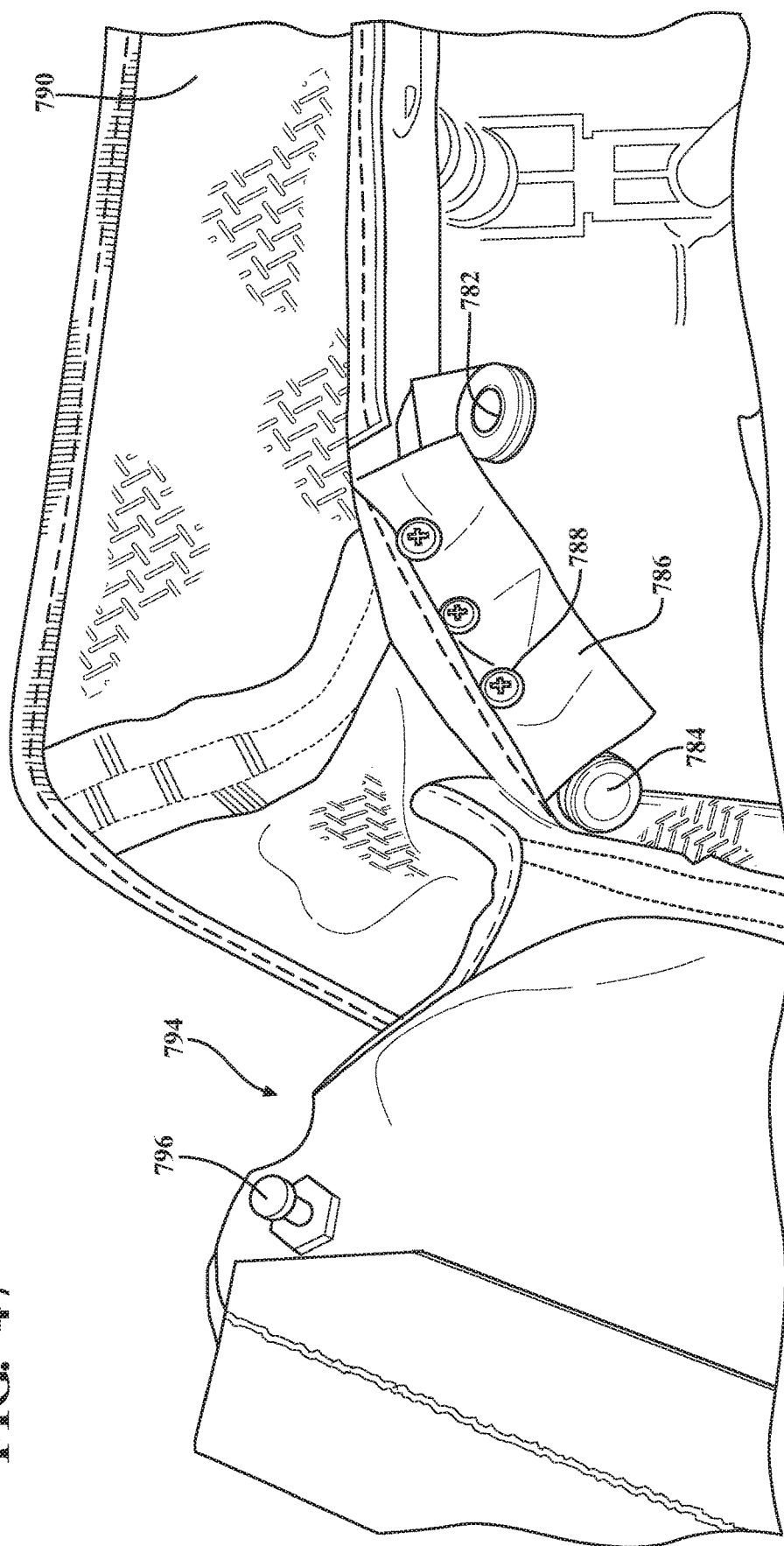
FIG. 47 is a perspective view of a quarter window locating pin and grommet of a rearward fabric support bow assembly of the soft top cover assembly, in accordance with the present invention.

As best shown in FIG. 47, a pin 769, e.g., metal pin, provided on an upper corner inner facing surface of the quarter window 796, e.g., on the corner flap section that also contains the stiffener 791, is inserted into the grommet 782 of the rear bow 778.

Figure 48:
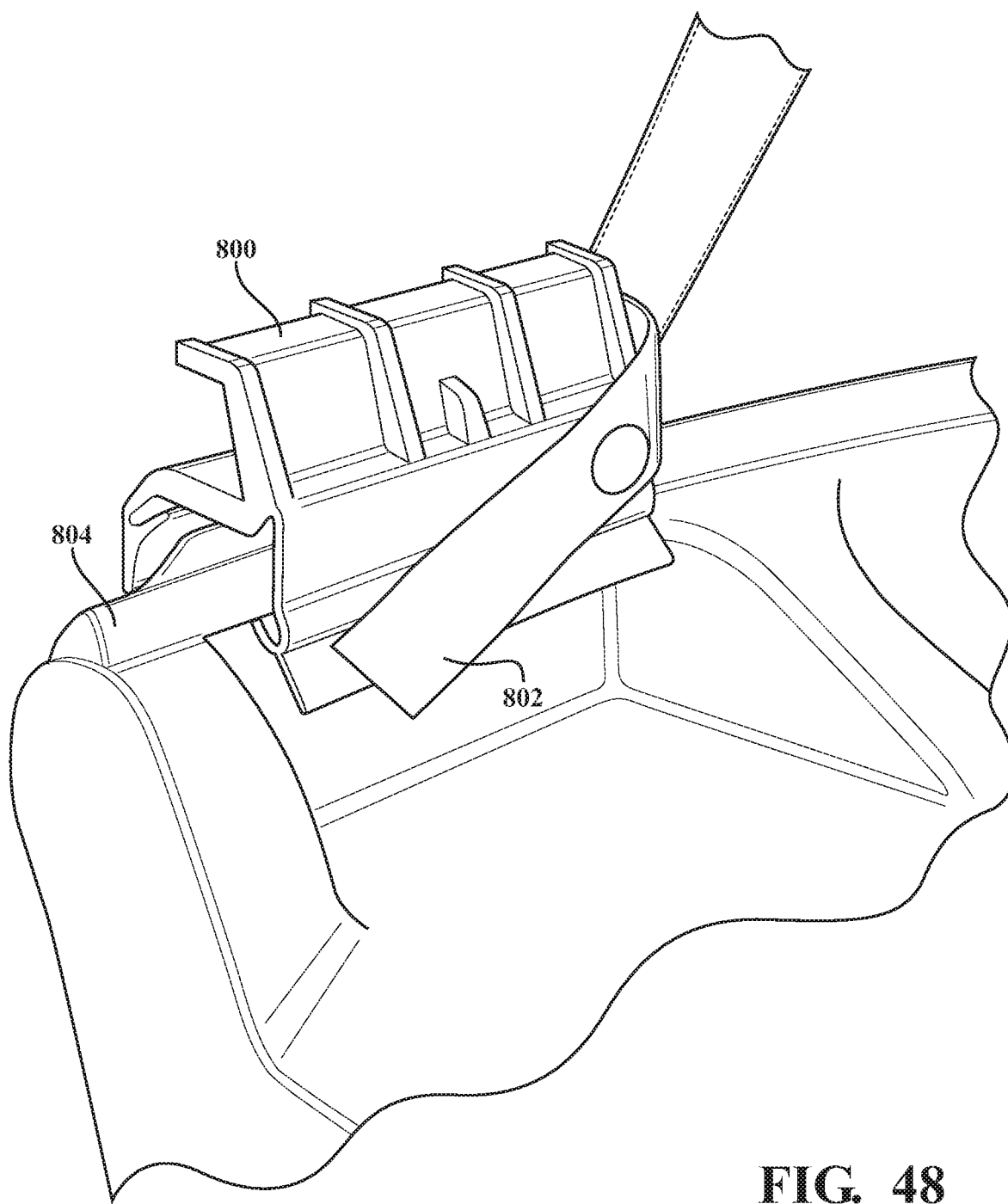
FIG. 48 is a perspective view of a quarter window connected to a tailgate mount coupled to the vehicle, in accordance with the present invention.

As best shown in FIG. 48, a pair of rear window mounts 800 are operably connected to the vehicle in predetermined locations depending on the application. Preferably, the mounts 800 are snapped into place on a rear belt rail 804 adjacent to opposite sides of the tailgate opening of the vehicle. A strap 802 from the lower end of the quarter window 794 is snapped to the back side of the mount 800. It is understood that other suitable attachments are contemplated depending on the application without departure from the scope of the present invention.

Figure 49:
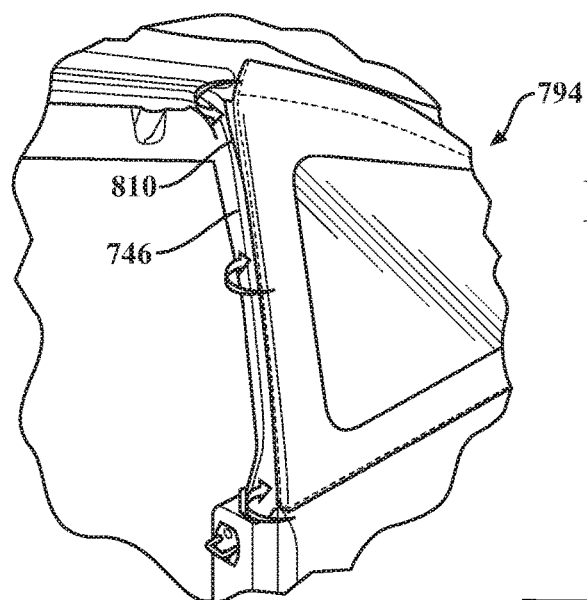
FIG. 49 is a perspective view of quarter window attachment members attaching to attachment features of the vehicle, in accordance with the present invention.

As best shown in FIG. 49, at least one front edge retainer 810 (e.g., angled plastic strip, J-hook, spaced tabs or other suitable retainer) of the quarter window 794 is inserted into a generally vertical channel (relative to the installed position) formed toward the front edge of the vertical section of the rear door rail 746.

Figure 50:
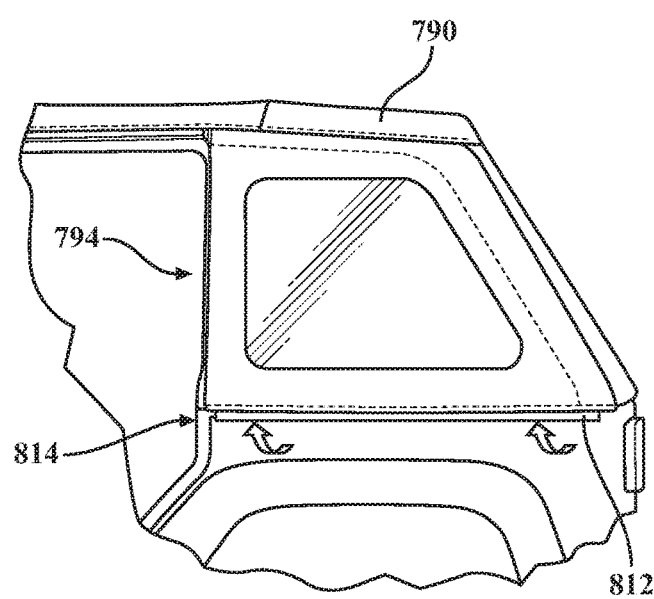
FIG. 50 is a perspective view of quarter window attachment members attaching to attachment features of the vehicle, in accordance with the present invention.

As best shown in FIG. 50, at least one bottom edge retainer 812 (e.g., angled plastic strip, J-hook, spaced tabs or other suitable retainer) of the quarter window 794 is inserted into a horizontal belt rail, indicated generally at 814, of the vehicle.

Figure 51:
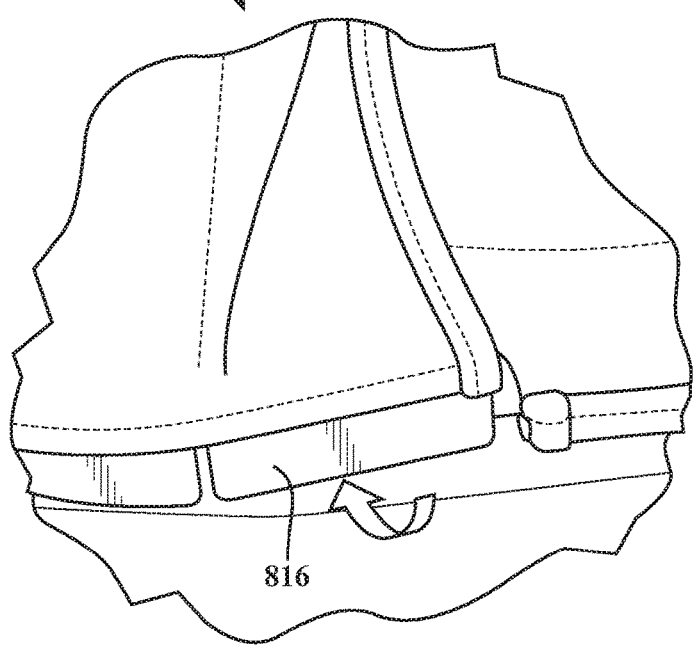
FIG. 51 is a perspective view of quarter window attachment members attaching to attachment features of the vehicle, in accordance with the present invention.

As best shown in FIG. 51, at least one bottom corner edge retainer 816 (e.g., angled plastic strip, J-hook, spaced tabs or other suitable retainer) of the quarter window 794 is inserted into a horizontal rear belt rail of the vehicle adjacent the tailgate opening.

Figure 52:
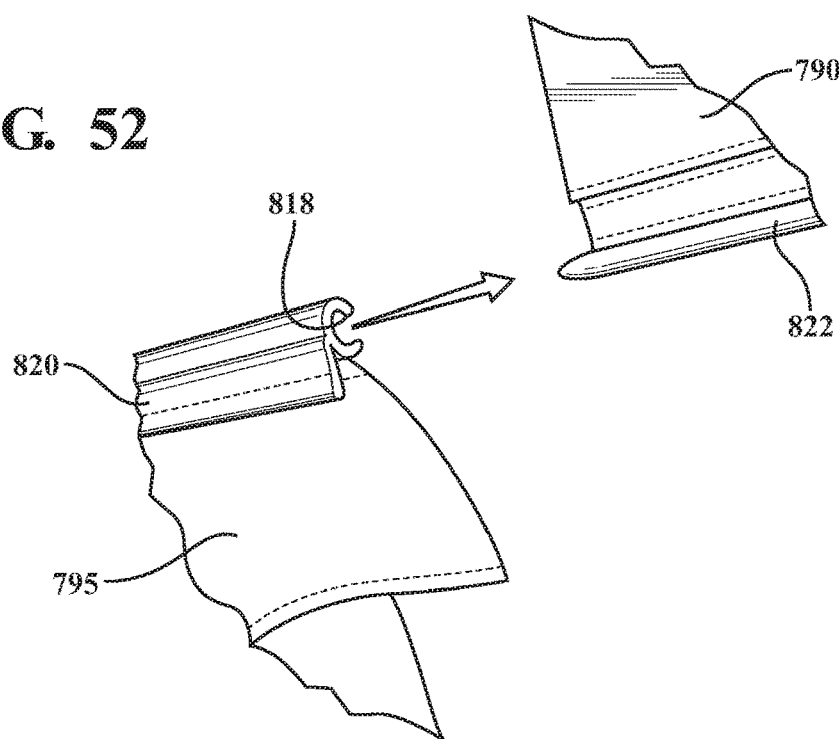
FIG. 52 is a perspective view of a rear window of the soft top cover assembly slidably connecting to a top deck of the soft top cover assembly, in accordance with the present invention.

As best shown in FIG. 52, a channel 818, e.g., plastic channel, of a carrier 820 provided toward the top of the rear window 795 is slid onto an elongated thin tube 822 of the provided under the top deck 790 of the cover 708. It is understood that alternatively, the channel 818 can be provided on the underside of the top deck and the thin tube 822 provided on the rear window 795.

Figure 53:
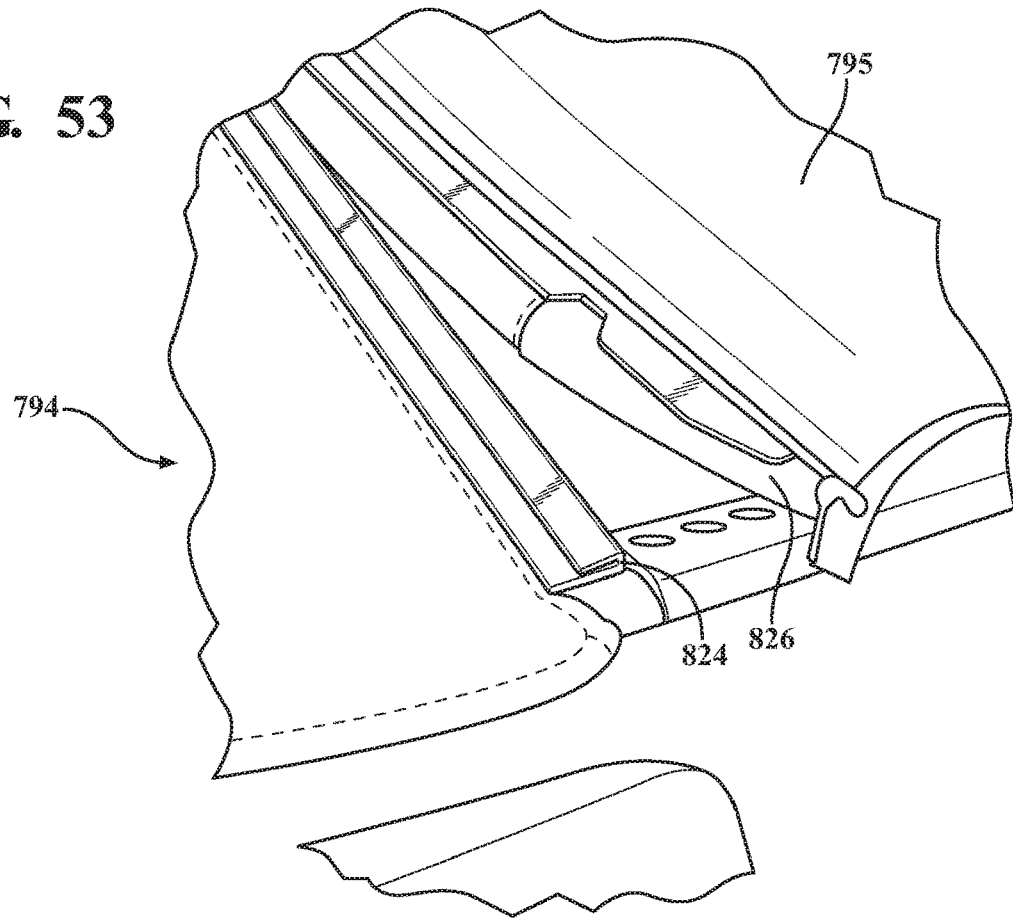
FIG. 53 is a perspective view of quarter window attachment members attaching to attachment features of the rear window, in accordance with the present invention.

As best shown in FIG. 53, a channel 824 is provided on the quarter panel 794, preferably, a plastic channel along an inner facing generally vertical edge of the window 794 (relative to the installed position) adjacent to the rear window 795. At least one retainer member 826, preferably, a plastic tab sewn in to the fabric panel of the rear window 795, is provided on the rear window 795, preferably on the outer edge of the rear window 795. The retainer 826 is inserted into the channel 824.

Figure 54:
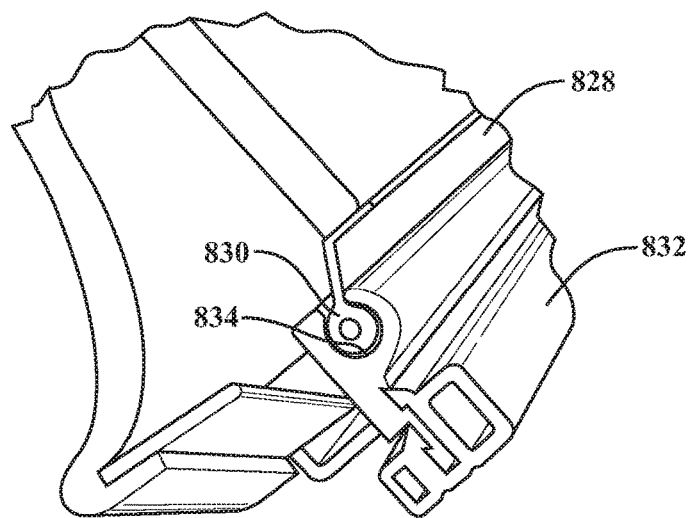
FIG. 54 is a perspective view of rear window tailgate bar attaching to attachment features of the rear window, in accordance with the present invention.
Figure 55:
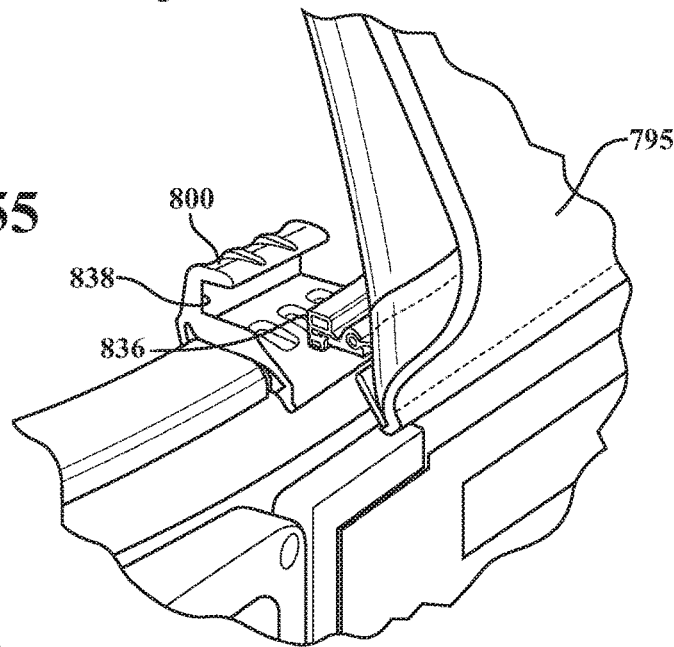
FIG. 55 is a perspective view of the rear window tailgate bar attaching to the tailgate mount connected to the vehicle in accordance with the present invention.
Figure 56:
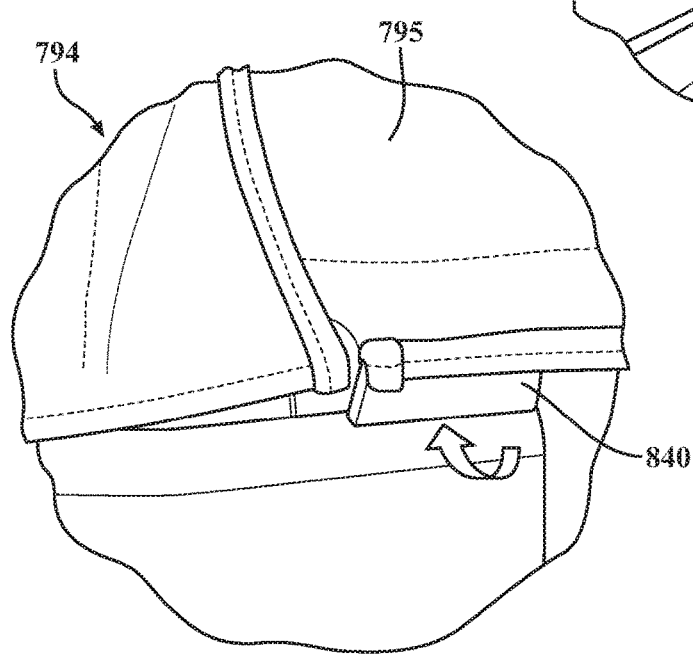
FIG. 56 is a perspective view of rear window attachment members attaching to attachment features of the vehicle, in accordance with the present invention.
Figure 57:
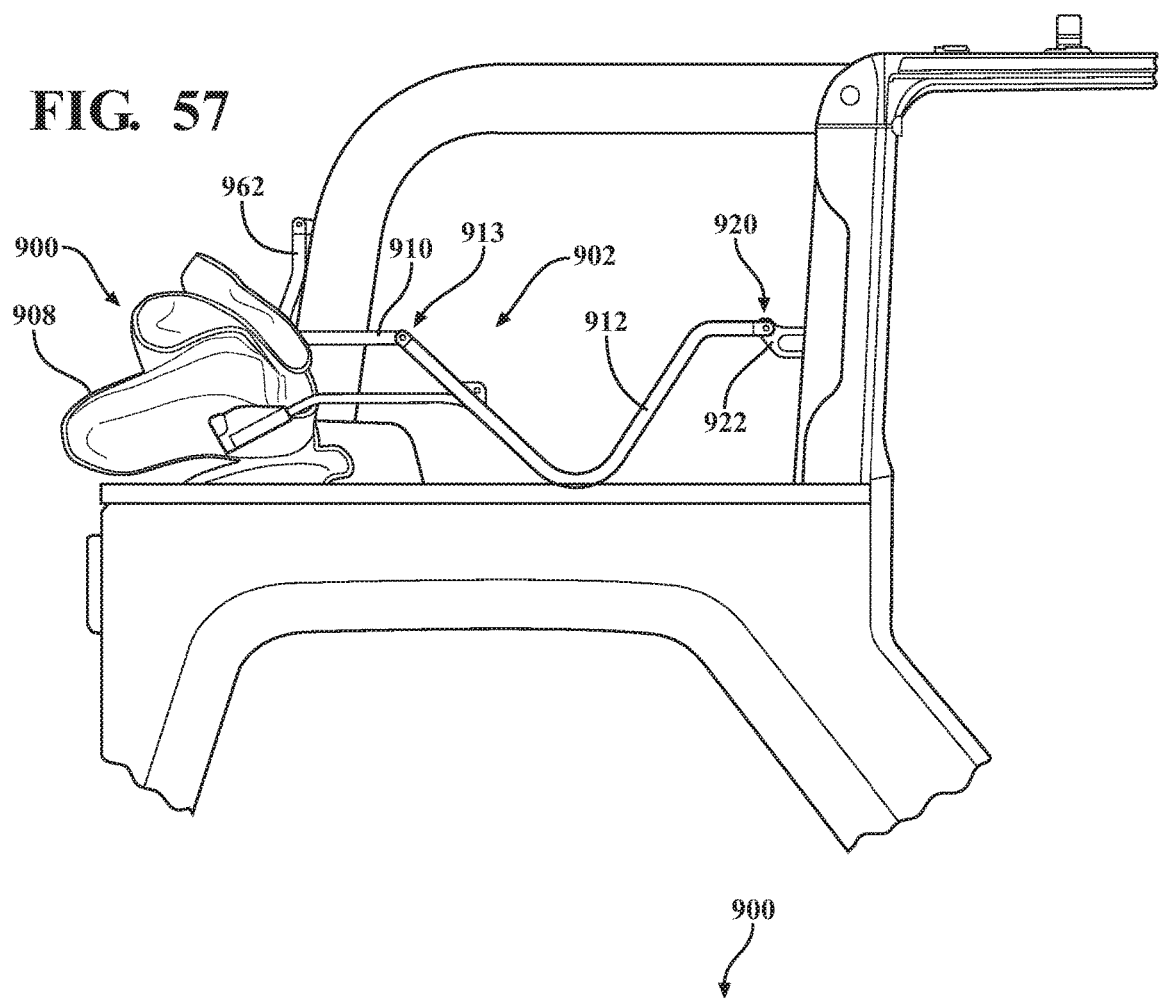
FIG. 57 is a side elevation view of a soft top assembly installed on a 2-door vehicle depicted in an open position, in accordance with another embodiment of the present invention.
Figure 58:
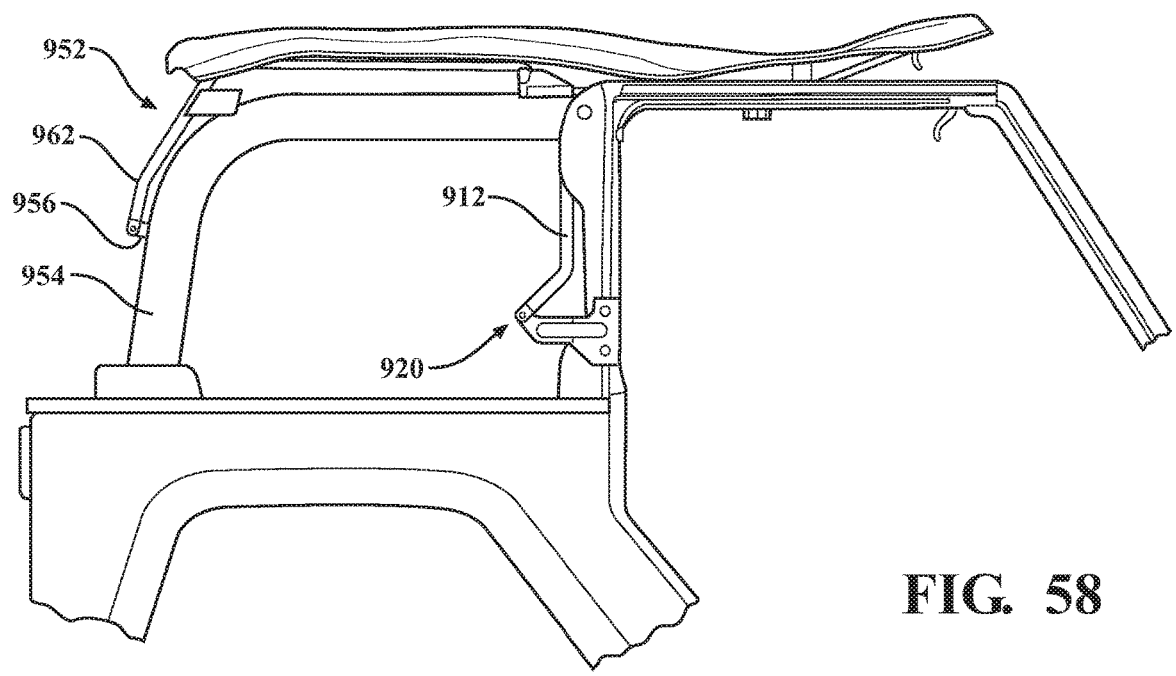
FIG. 58 is a side elevation view of the soft top assembly unlatched from a windshield area of the vehicle, in accordance with another embodiment of the present invention.
Figure 59:
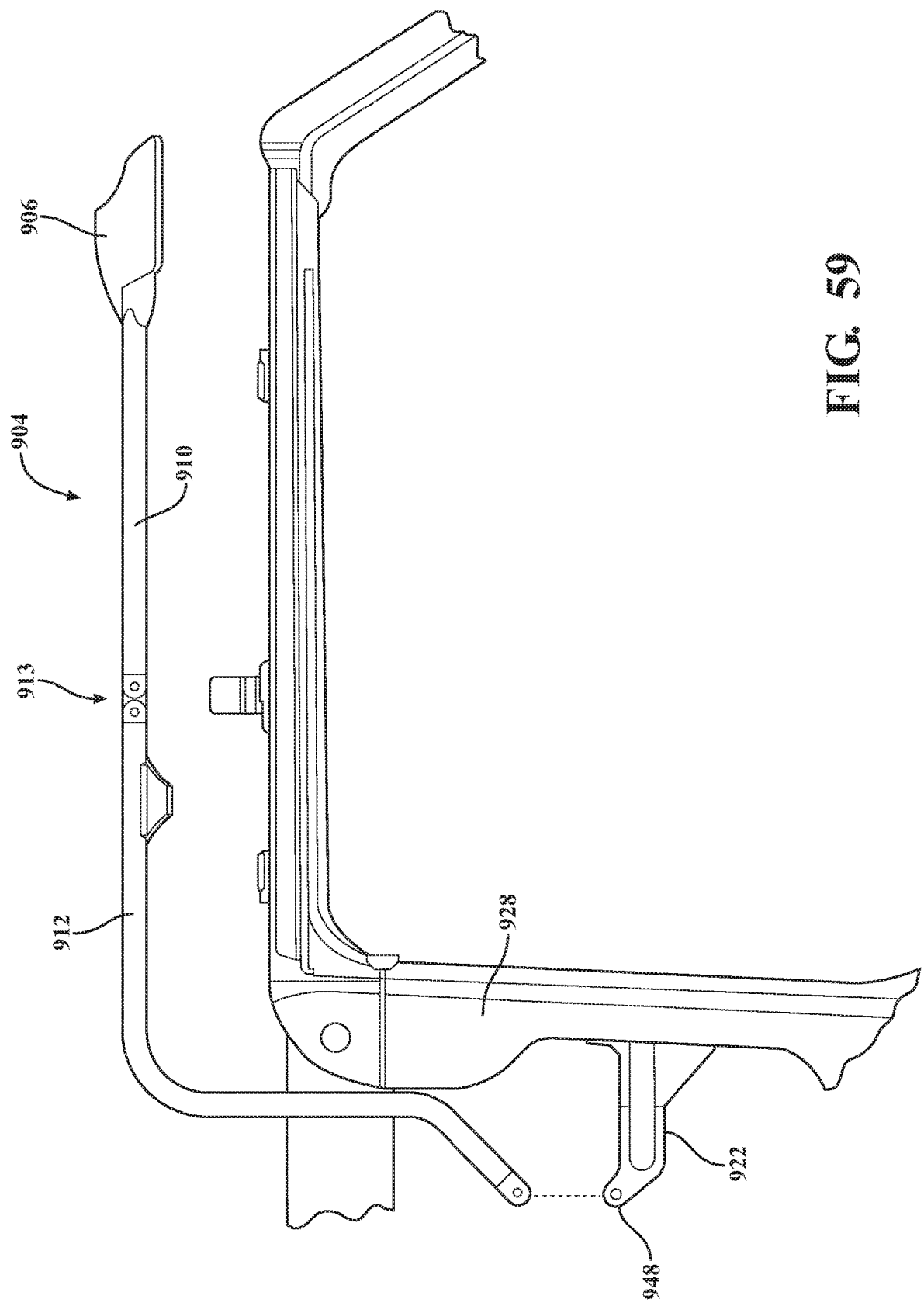
FIG. 59 is a partially exploded view of a pivotal portion mountable to the vehicle, in accordance with the present invention.
Figure 60:
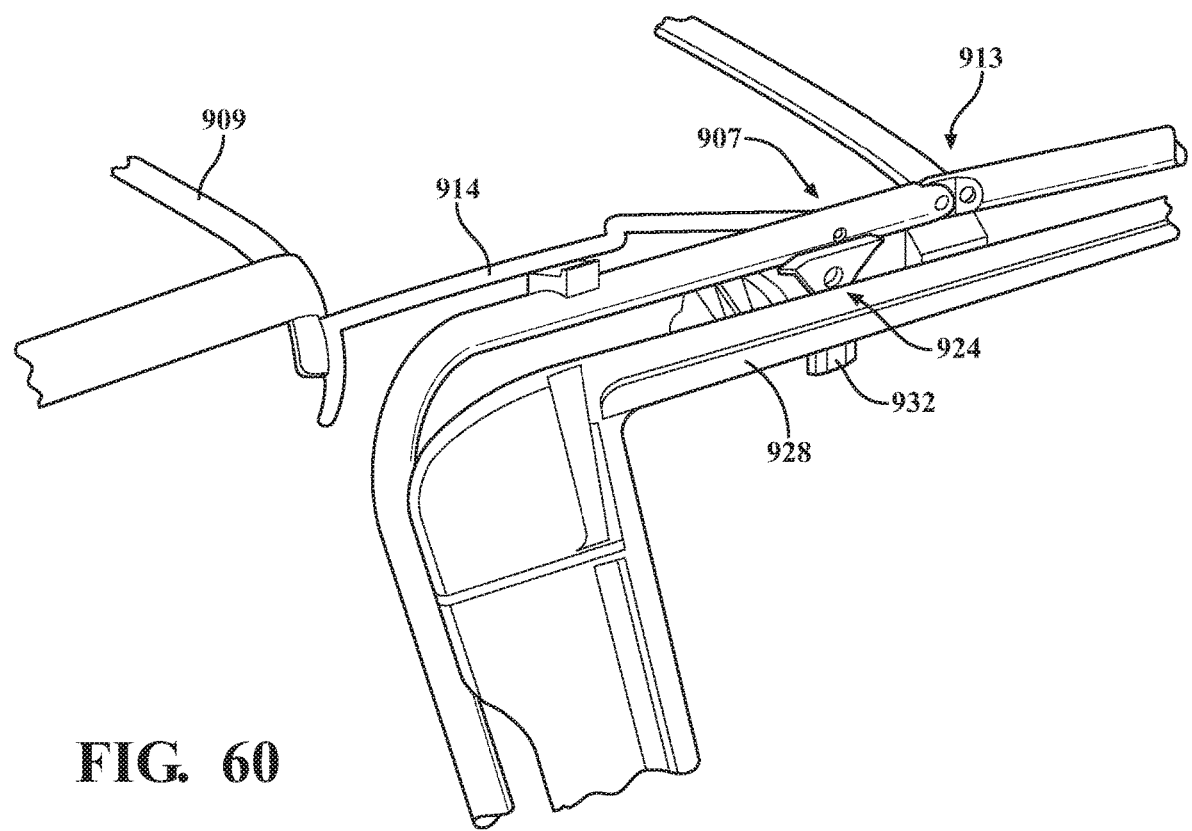
FIG. 60 is an enlarged perspective view of the pivotal portion, in accordance with the present invention.
Figure 61:
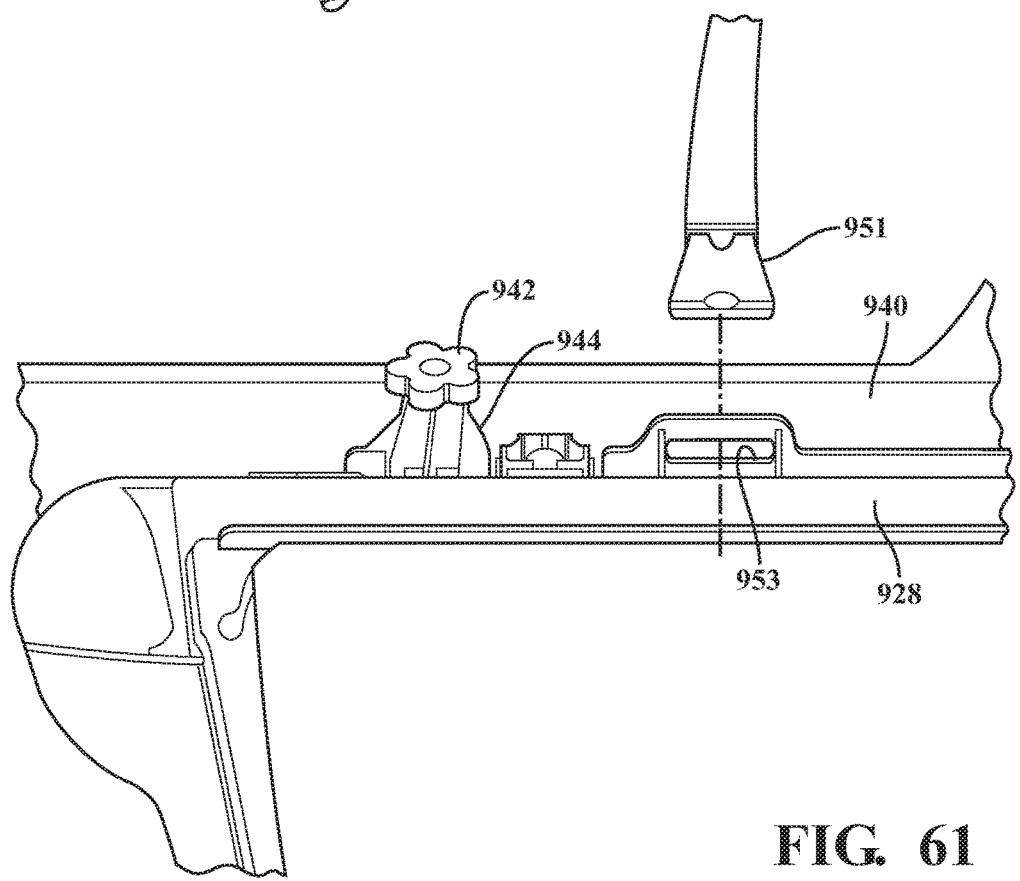
FIG. 61 is an enlarged perspective view of a door rail and bow strap of the soft top assembly, in accordance with the present invention.
Figure 62:
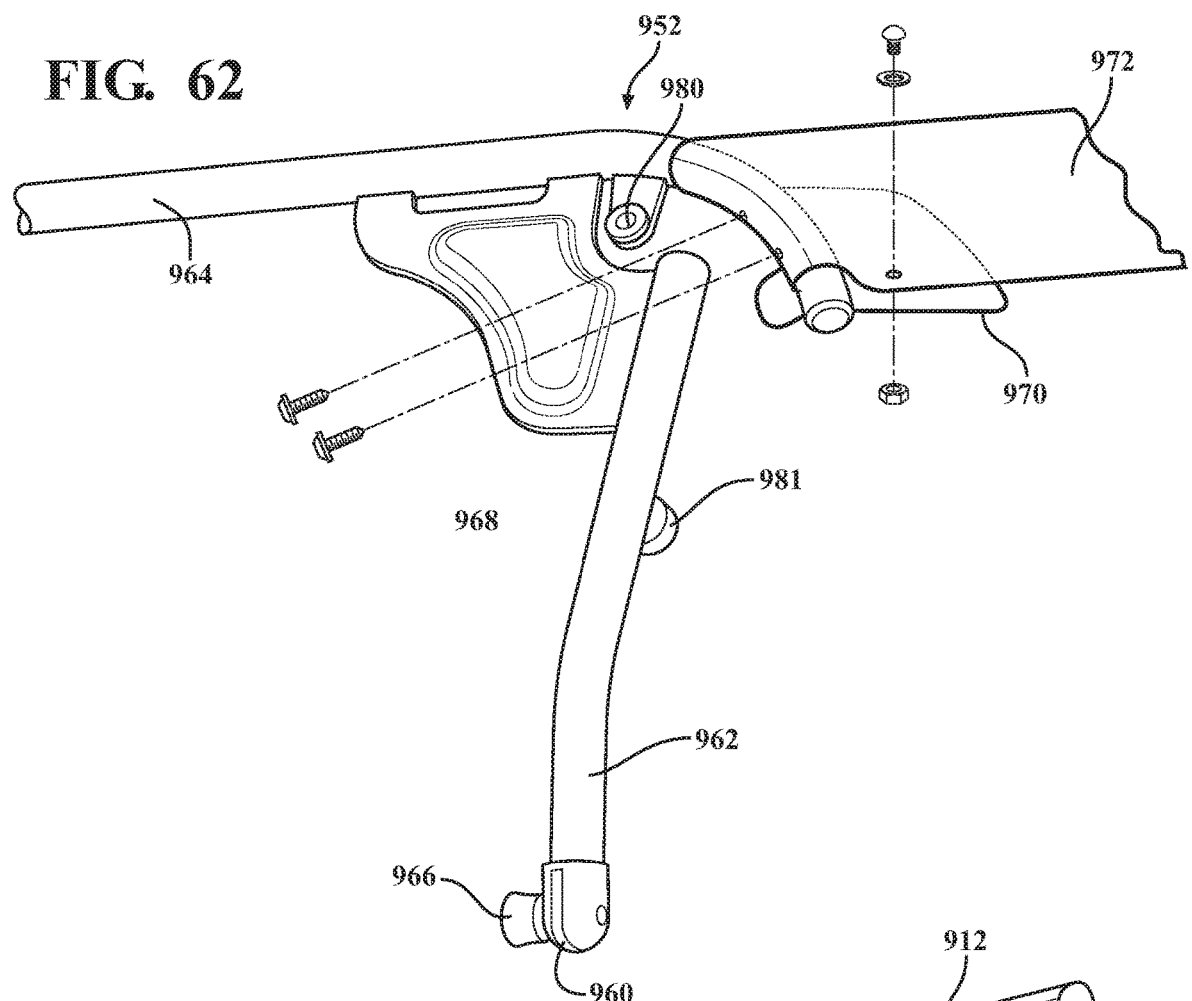
FIG. 62 is a perspective view of a rearward fabric support bow assembly in a forward/upward position, in accordance with the present invention.
Figure 63:
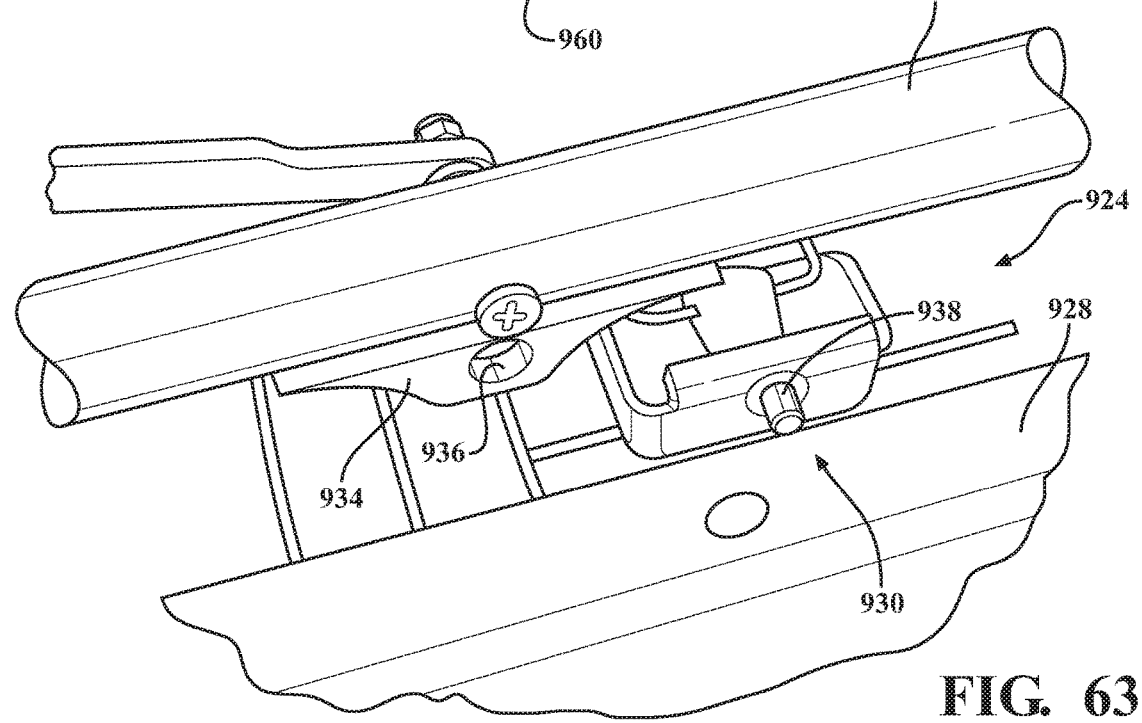
FIG. 63 is a perspective view of a locking mechanism for the pivotal portion, in accordance with the present invention.
Figure 64:
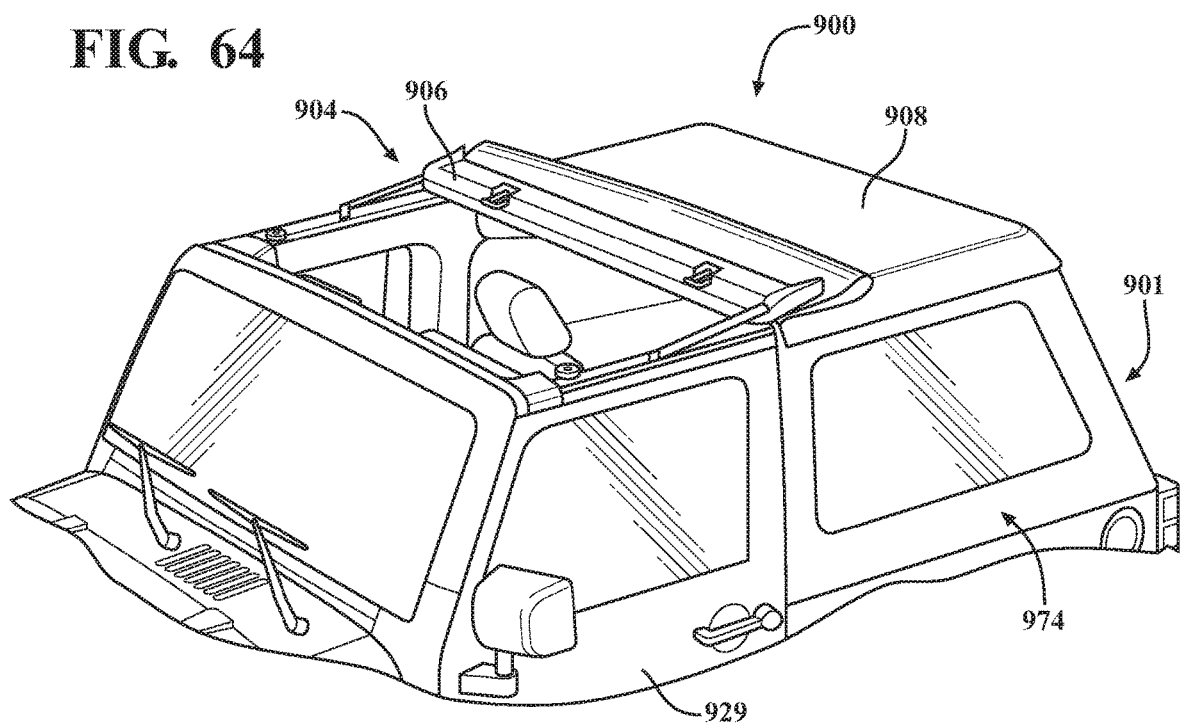
FIG. 64 is a perspective view of the soft top assembly in an open sunroof position, in accordance with the present invention.

Referring now to FIGS. 54-56, the rear window 795 includes at least one retainer 828, e.g., a P-welt retainer sewn and/or adhered to the window 795, located toward the bottom inner facing horizontal edge (relative to the installed position). The retainer 828 includes a protruding feature, preferably, a larger tube shaped elongated member 830. The assembly 700 includes a tailgate bar member 832 having at least one channel 834. The tailgate bar channel 834 is slid onto the tube 830 of the retainer 828. It is understood that alternatively, the channel 834 can be provided on the rear window 795 and the retainer 828 provided on the rear window 795. Once the tailgate bar 832 is slid onto the retainer 828, the tailgate bar 832 is then connected to the mount 800. Preferably, a rearward edge portion 836 of the tailgate bar 832 is snapped into a back channel 838 formed in the mount 800. At least one retainer 840 (e.g., plastic tab, short angled plastic strip, J-hook, spaced tabs or other suitable retainer) provided toward the bottom inner facing edge of the rear window 795 is inserted into a horizontal rear belt rail of the vehicle adjacent the tailgate opening and mount 800.

Additional bows, such as intermediate bows or fabric management bows, and additional linkages are within the scope of the present invention.

The back of the assembly 700 is slanted. Generally, the angle of the slanted back 701 is less than 90 degrees. Typically, from about 75 to about 30 degrees. Preferably, from 75 to about 40 degrees. Most preferably, from 70 to 45 degrees.

The present invention provides for the slanted back. The slanted back provides a profile that is angled downward in the rear of the vehicle toward the tailgate. More particularly, a rear window panel can be at a predetermined angle from the upright position, off-vertical. Generally, at least 15 degrees from vertical, typically at least 20 degrees, preferably at least 25 degrees, most preferably, at least 35 degrees, particularly preferred from about 15 to 45 degrees.

In accordance with an alternative embodiment of the present invention, the soft top assembly 700 is adapted to incorporate a guide track 1002 located in a door rail 1004 (e.g., see FIGS. 66-67). Alternatively, the guide track is fastened to the vehicle, e.g., bolted to the sport bar. Preferably, the door rail 1004 is a rear door rail extending generally above the rear door of the vehicle to adjacent the rear cross member 842 of the vehicle. Most preferably, the pivotal portion 704 incorporates the tab 726 for the locking mechanism 724, which mechanism 724 is located in front of the door rail 1004 or incorporated into the door rail 1004. Thus, the locking mechanism 724 secures the pivotal portion 704 in the open sunroof position, and, additionally, prevents the assembly 700 from sliding rearward in the guide track 1002 until desired. It is understood that an alternative locking mechanism can be used suitable for preventing the assembly 700 from sliding rearward when not desired.

As will be explained in greater detail below, when an operator desires to move the assembly 700 rearward and downward to the cargo area, at least one slidable feature of the top is slid generally rearward in a channel 1006 of the guide track 1004 until reaching a spring loaded mechanism, shown generally at 1008. The operator can leave the top in this open position. Further, the operator can operably manipulate the spring loaded mechanism to release the slidable feature from the channel 1006 to remove the top from the track 1002. This allows the top to be placed down further into the cargo area, or, further, to allow removal of the top from the vehicle once the quick release member 762 of the rear bow upright 748 is also released.

It is understood that guide track 1002 can, alternatively, be bolted to a front or rear door rail or to the vehicle, e.g., sport bar(s), depending on the application without departure from the scope of the present invention.

The guide track 1002 includes a channel 1006 operable for retaining a slidable feature operably mounted to any soft top assembly set forth previously.

Figure 65:
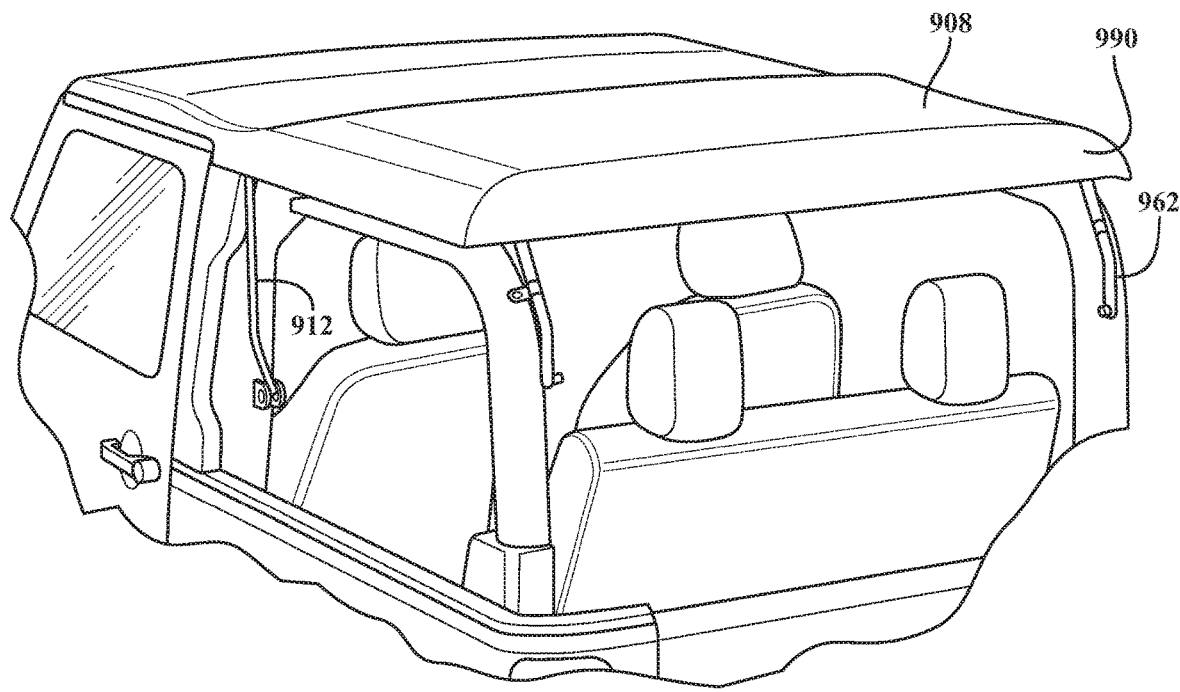
FIG. 65 is a perspective view of the soft top assembly in closed position with the rear window and quarter window removed, in accordance with the present invention.

Referring now to FIGS. 57 to 65 generally, there is provided a soft top cover assembly, shown generally at 900, that is a slanted back soft to assembly for a 2-door SUV, or any other suitable type of motor vehicle, in accordance with the present invention. As best shown in FIG. 65, the assembly 900 provides an angled back, as indicated at 901. This angle is a predetermined range amount off vertical. The assembly 900 is movable between a closed position closing off an opening generally above the front cockpit of the vehicle and at least one open sunroof position (see FIG. 64) to rotate the cover rearward out of the way to provide an open air feel and further to an open position with the assembly 900 rotated into the cargo are of the vehicle.

The assembly 900 includes an articulating frame indicated generally at 902 including a pivotal portion shown generally at 904 forming a front bow system. The pivotal portion 904 is moveable between at least a closed position and at least one open sunroof position. The pivotal portion 904 includes a front header 906 or "1 bow" operable connected to a cover 908 that is a soft top material. The pivotal portion 904 also includes a second bow 909 and a linkage assembly including a front rail 910 pivotally connected to a rear rail 912 at a pivot joint shown generally at 913. The second bow 909 is operably connected to the front or rear rail 910,912, preferably, to the rear rail 912. An intermediate link 914 is operably connected to the second bow 909 toward one end and pivotally connected to the rear rail 912 toward the other end with at least one fastener creating a pivot point indicated generally at 907. It is understood that additional link, bows and rails are contemplated depending on the application without departure from the scope of the present invention.

The rear rail 912 is rotatably connected to the vehicle at a pivot point, shown generally at 920, provided on a mounting bracket 922. The mounting bracket 922 is located at a predetermined location on the vehicle depending on the application, preferably, mounted to a B-pillar or door side rail 928 connected to the B-pillar. The door side rail 928 includes a generally vertical portion and a generally horizontal portion in sealing engagement with a door 929 of the vehicle.

A locking mechanism is provided, shown generally at 924, to secure the pivotal portion 904 in place when in the closed position and open sunroof position. A locking flange is aligned with a bushing positioned above a spring loaded locking lever assembly, shown generally at 930, preferably, located in the top of the door rail 928. A latch release lever 932 is pressed, preferably, located on the underside of the door rail 928, and a flange 934 with an aperture 936 is brought into alignment with a spring loaded locking pin 938 and the lever released 932. Once engaged with the pin 938, the pivotal portion 904 remains secured to the door rail 928 when the pivotal portion is in the closed position or open sunroof position. To disengage the pivotal portion 904 from the door rail 928, the lever 932 is pressed and the pivotal portion 904 is lifted from the locking mechanism 924.

It is understood that the locking mechanism 924 and locking lever assembly 930 and corresponding features are adaptable for use on any other aspect of the present invention, including any of the soft top cover assemblies set forth herein.

The door rail 928 is connected to the vehicle, preferably, connected to a front sport bar 940 of the vehicle with a plurality of fasteners 942, such as threaded fasteners, extending through a plurality of clamping surfaces 944 on the door rail 928.

The pivotal portion 904 can include at least one limiting stop.

In a particularly preferred embodiment, the mounting bracket 920 at least partially wraps around the sport bar 940 and includes a tab 948 that is received in a slot formed on the knuckle or end of a rear rail 912. Preferably, the rear rail 912 is attached to the tab 948 with a quick release member (e.g., such as depicted in FIG. 42), e.g., such as a spring catch release knob that is pulled out of an aperture of the rear rail 912 and tab 948 on the bracket 922 to quickly release the rear rail 912 knuckle from the bracket 922. The bracket 922 of the rear rail is located generally in the B-pillar area such that the rear rail 912 curves generally upward and over the cross car member of the vehicle adjacent the front cockpit when the assembly 900 is in the closed position or open sunroof position. The rear rail 912 can then rotate generally rearward and down to the cargo area of the vehicle for an additional open are position.

At least one top arch 951 is provided that is held in respective slots 953 formed in the door rail 928. The top arch 951 extends cross car for further support of the cover 908 in at least the closed position.

The assembly 900 further includes a rearward fabric support bow assembly, shown generally at 952, which is pivotally connected to the vehicle, most preferably, to the rear sport bar 954 of the vehicle. The rearward fabric support bow assembly 952 rotates from a generally upward position to a generally downward position. A mounting bracket 956 is operably connected to the sport bar 954 (or other suitable vehicle structure) with at least one fastener. In a particularly preferred embodiment, the mounting bracket 956 at least partially wraps around the sport bar 954 and includes a tab that is received in a slot 960 formed on the knuckle or end of a rear bow upright 962. Preferably, the rear bow upright 962 is attached to the tab with a quick release member 966 (e.g., such as also depicted in FIG. 42), e.g., such as a spring catch release knob that is pulled out of an aperture of the rear bow upright 962 and tab on the bracket 956 to quickly release the rear bow upright 962 knuckle from the bracket 956.

The rear mounting bracket 956 is preferably on the rear of the sport bar 954. Alternatively, the mounting bracket 956 is mounted such that the tab is located on an inner surface of the sport bar 954 to attach the rear bow upright 962 inward.

The rear bow upright 962 is operably connected to a rear bow 964, preferably, by a bracket 968 connecting the rear bow upright 962 to the rear bow 964. The rear bow 964 includes an extension portion 970 to which stay straps 972 for the cover 908 are operably connected, preferably by a plurality of fasteners to the end of the rear bow 964.

The rearward fabric support bow assembly 952 also includes a tab with a grommet 980 for connecting windows of the assembly, as described previously in further detail.

Preferably, at least one bumper 981 is provided on the upright bow 962 as a stand-off with the sport bar 954. When the upright bow 962 is in a generally upward vertical position, the bumper 981 is between the bow 962 and sport bar 954. It is understood that at least one bumper can also be provided on the rear rail 912 to touch off with the sport part 930 when in the upright position.

The cover 908 extends over the second bow 909 and the rear bow 964 and also assists in managing the fabric to operably fold out of the way into the open sunroof position and open down position. It is understood that the cover 908 can be operable connected to the second bow 909 and/or rear bow 964 when desired depending on the application without departure from the scope of the present invention. By way of non-limiting example, an extrusion sewn to the cover 908 is received in a channel provided on the second bow 909 or vice versa. Preferably, the cover 608 is operable connected to the rear bow 964 and/or 2-bow 909. Most preferably, the cover 908 is secured to the bows 909 and 964 of the assembly 900 with flaps of material provided on the inner surface of the cover 908. By way of non-limiting example, flaps are sewn and/or adhered or otherwise suitably attached to the surface of the cover that will face the inside of the vehicle and provided with tongue and loop. The 2-bow 909 and/or rear bow 964 are secured to the cover 908 with respective flaps of the cover 908. Alternatively, or additionally, straps are used.

The assembly 900 selectively provides further plurality of open air options, including, removal of a rear window or one or both of rearward quarter windows shown generally at 974. When the rear window and both quarter windows 974 are removed, the cover 908 can remain attached providing a roof top with the top deck 990 alone or the pivotal portion 904 can be rotated to the open sunroof position such that the front cockpit is not covered but the rest of the top deck 990 covers the top of the vehicle. The assembly pivotal portion 904, rearward fabric support bow assembly 952, and cover 908 can also be removed from the vehicle to provide a fully open air experience. The quick release members assist in quicker removal of the assembly 900 from the vehicle when desired. The rear and quarter windows are preferably connected to the top deck 990 and vehicle in a zipperless manner, as was explained in greater detail above and depicted in FIGS. 45 to 56, which are incorporated here.

The back of the assembly 900 is slanted. Generally, the angle of the slanted back 901 is less than 90 degrees. Typically, from about 75 to about 30 degrees. Preferably, from 75 to about 40 degrees. Most preferably, from 70 to 45 degrees.

The present invention provides for the slanted back. The slanted back provides a profile that is angled downward in the rear of the vehicle toward the tailgate. More particularly, a rear window panel can be at a predetermined angle from the upright position, off-vertical. Generally, at least 15 degrees from vertical, typically at least 20 degrees, preferably at least 25 degrees, most preferably, at least 35 degrees, particularly preferred from about 15 to 45 degrees.

In accordance with an alternative embodiment of the present invention, the soft top assembly 900 is adapted to incorporate a guide track 1002 located in a door rail 1004 (e.g., see FIGS. 66-67). Alternatively, the guide track is fastened to the vehicle, e.g., bolted to the sport bar. Preferably, the door rail 1004 is a rear door rail extending generally behind the front seats of the vehicle and/to adjacent the rear cross member of the vehicle. Most preferably, the top assembly 900 incorporates the locking mechanism 924 which mechanism 924 is located in front of the door rail 1004 or incorporated into the door rail 1004. Thus, the locking mechanism 924 secures the pivotal portion 904 in the open sunroof position, and, additionally, prevents the assembly 900 from sliding rearward in the guide track 1002 until desired. It is understood that an alternative locking mechanism can be used suitable for preventing the assembly 900 from sliding rearward when not desired.

As will be explained in greater detail below, when an operator desires to move the assembly 900 rearward and downward to the cargo area, at least one slidable feature of the top is slid generally rearward in a channel 1006 of the guide track 1004 until reaching a spring loaded mechanism, shown generally at 1008. The operator can leave the top in this open position. Further, the operator can operably manipulate the spring loaded mechanism to release the slidable feature from the channel 1006 to remove the top from the track 1002. This allows the top to be placed down further into the cargo area, or, further, to allow removal of the top entirely from the vehicle once the quick release member 966 of the rear bow upright 962 is also released.

It is understood that guide track 1002 can, alternatively, be bolted to a front or rear door rail or to the vehicle, e.g., sport bar(s), depending on the application without departure from the scope of the present invention.

Referring now to FIGS. 66-67 generally, there is depicted the guide track 1002 located in the door rail 1004. The guide track 1002 includes the channel 1006 operable for retaining a slidable feature operably mounted to any soft top assembly set forth previously. A particularly preferred environment of use for the door rail 1004 incorporating the guide track 1002 is a 4-door SUV. However, it is understood that the door rail 1004 incorporating the guide track 1002 can be adapted to a 2-door SUV depending on the application without departure from the scope of the present invention.

At the rearmost end of the channel 1006 there is provided a securing mechanism 1008 which prevents the soft top assembly from sliding out of the channel 1006. Preferably, the securing mechanism 1008 is a spring loaded mechanism. An operator can slide the top until the slidable feature in the track or any other suitable feature on the top, contacts the securing mechanism 1008. The operator can leave the top in this open/down position. Further, the operator can selectively operably manipulate the spring loaded mechanism 1008 when desired to release the slidable feature from the channel 1006 to remove the top from the track 1002 entirely. This allows the top to be placed down further into the cargo area, or, further, to allow removal of the top entirely from the vehicle.

It is understood that the guide track 1002 and corresponding features are adaptable for use on any other aspect of the present invention, including any of the soft top cover assemblies set forth herein.

Figure 68:
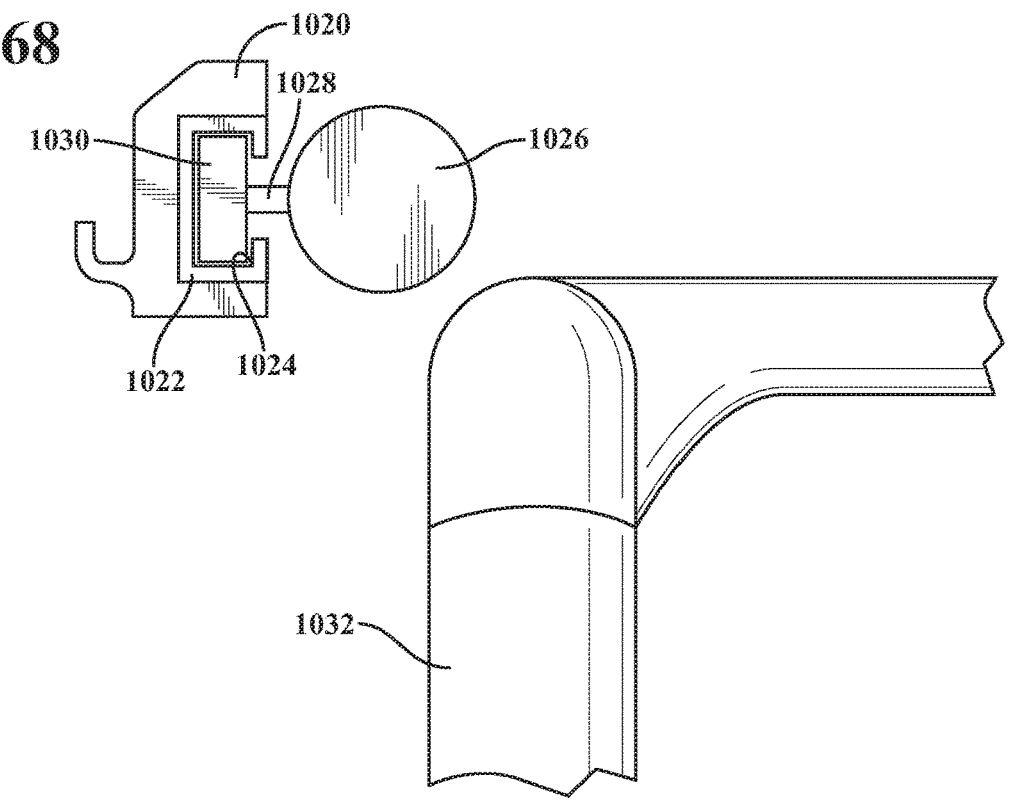
FIG. 68 is a sectional schematic of a door rail with an integrated track, in accordance with an embodiment of the present invention.

FIG. 68 depicts a door rail 1020 with an integrated guide track 1022 having a channel 1024 that is opened in the direction toward the center of the vehicle (in an inward direction). The door rail 1020 is operably connected adjacent to a sport bar 1032, or other structure of the vehicle, and is preferably in sealing engagement with the door of the vehicle. The soft top assembly includes framework 1026, e.g., side rails or bows, for articulating the top, as set forth previously, and additionally includes at least one standoff feature 1028 (e.g., bracket(s), pins, bolts, etc) operably connected to at least one roller bearing(s) 1030. The roller bearing 1030 travels in the channel 1024, as described previously. A particularly preferred environment of use for the door rail 1020 with an integrated guide track 1022 is a 4-door SUV. However, it is understood that the door rail 1020 with an integrated guide track 1022 can be adapted to a 2-door SUV or any other motor vehicle depending on the application without departure from the scope of the present invention.

It is understood that the door rail 1020 with an integrated guide track 1022 having a channel 1024 and corresponding features are adaptable for use on any other aspect of the present invention, including any of the soft top cover assemblies set forth herein.

Figure 69:
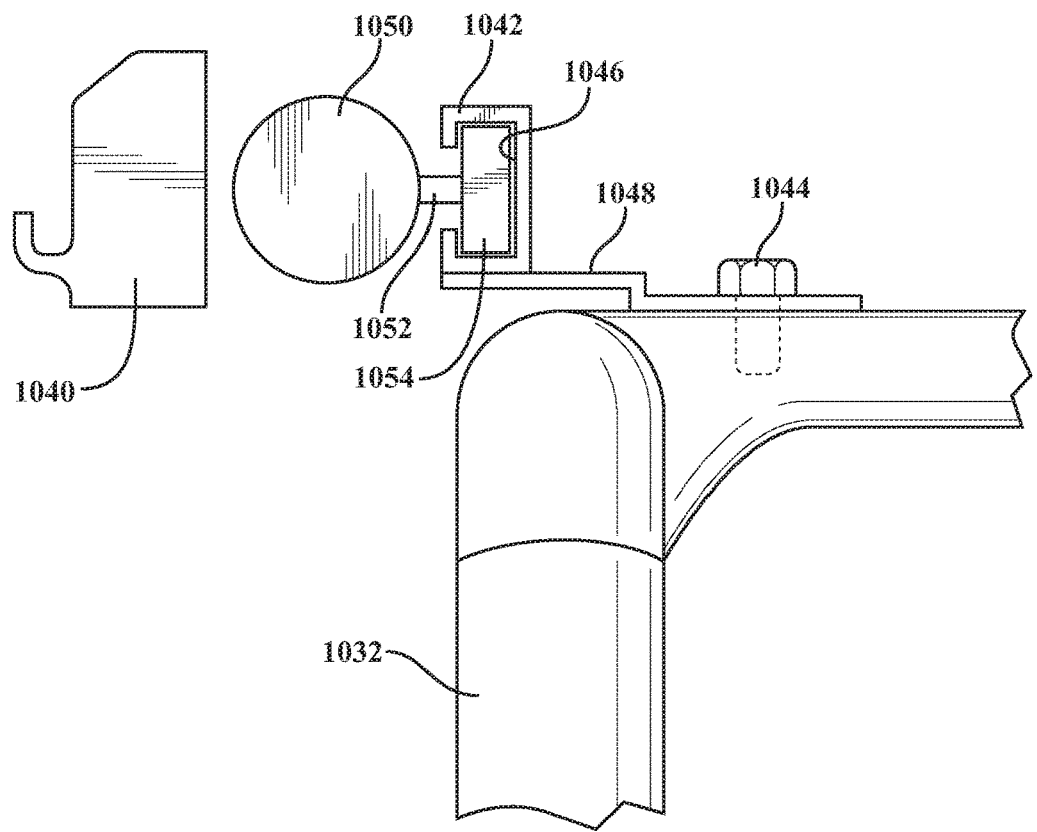
FIG. 69 is a sectional schematic of a track mounted to a sport bar of a vehicle, in accordance with an embodiment of the present invention.

FIG. 69 depicts a door rail 1040 where the track 1042 is not integrated with the door rail 1040. The door rail 1040 is operably connected adjacent to a sport bar 1032, or other structure of the vehicle, and is preferably in sealing engagement with the door of the vehicle. The track 1042 is connected to the vehicle by at least one fastener 1044, e.g., operably bolted to the sport bar 1032. The track 1042 has a channel 1046 that opens away from the center of the vehicle (in an outward direction). At least one bracket or brace 1048 connects the track 1042 to the sport bar 1032 each with at least one fastener 1044. The soft top assembly includes framework 1050, e.g., side rails or bows, for articulating the top, as set forth previously, and additionally includes at least one standoff feature 1052 (e.g., bracket(s), pins, bolts, tabs etc) operably connected to at least one roller bearing(s) 1054. The roller bearing 1054 travels in the channel 1046, as described previously. A particularly preferred environment of use for the door rail 1040 without an integrated guide track 1042 is a 2-door SUV. However, it is understood that the door rail 1040 without an integrated guide track 1042 can be adapted to a 4-door SUV or any other motor vehicle depending on the application without departure from the scope of the present invention.

It is understood that the track 1042 and corresponding features are adaptable for use on any other aspect of the present invention, including any of the soft top cover assemblies set forth herein.

Providing at least one seal, e.g., rubber, foam, etc, to further prevent water from entering the vehicle is contemplated without departing from the scope of the present invention. Preferably, rubber to prevent water permeation. According to one embodiment, the seal, e.g., bulb seal, is located on a door rail and seals off with the underside of the header.

Providing a unique header to door rail interface is contemplated without departing from the scope of the present invention. Adding at least one seal in this region is contemplated without departing from the scope of the present invention.

Providing at least one hole in a trough/lip area of a door rail, e.g., between door edge and door weather-strip, for assisting with water drainage is contemplated without departing from the scope of the present invention.

Providing at least one stop to set the predetermined height of the assembly in the open sunroof position is contemplated without departing from the scope of the present invention.

Providing a header that is steel, cast aluminum, molded plastic, or any other material to meet predetermined requirements is contemplated without departing from the scope of the present invention, preferably, the header is cast aluminum.

The cover is operably coupled to the header. Visual attachment of fasteners for access is contemplated without departing from the scope of the present invention.

Preferably, the soft top assembly is secured to a windshield frame with quick release latches. Locating features on each latch and a corresponding saddle on the windshield frame are contemplated without departing from the scope of the present invention.

At least one locking mechanism, e.g., rear location to lock down position of top in down position, and/or at least one trigger release arrangement is provided according to an embodiment of the present invention.

Incorporating removable soft upper half door(s), soft full door(s) and/or soft quarter panels with any of the above soft top cover assemblies is contemplated without departing from the scope of the present invention.

The 2-door and 4-door descriptions described herein are not limiting. It is understood that any embodiment, and combinations thereof, described herein can be modified and is/are utilizable on any convertible, 2-door or 4-door vehicle.

It is understood that the left side of the assemblies are substantially a mirror-image of the right side of the assemblies.

Figure 71:
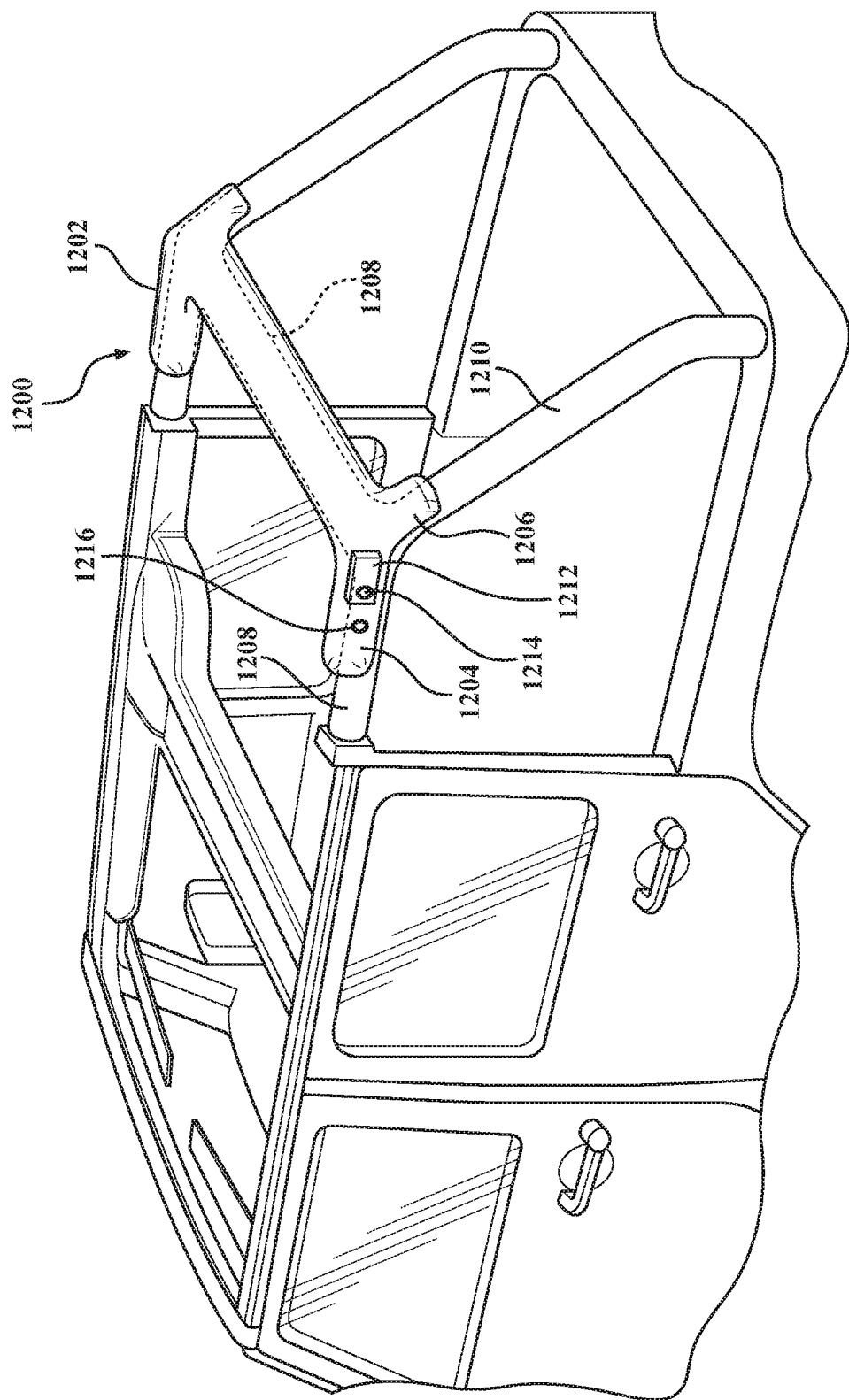
FIG. 71 is perspective view of a tensioning system with an inflation pump for incorporation with the soft top assembly, with the cover and windows removed for clarity, depicted in an environment of use on an SUV, according to the present invention.
Figure 72:
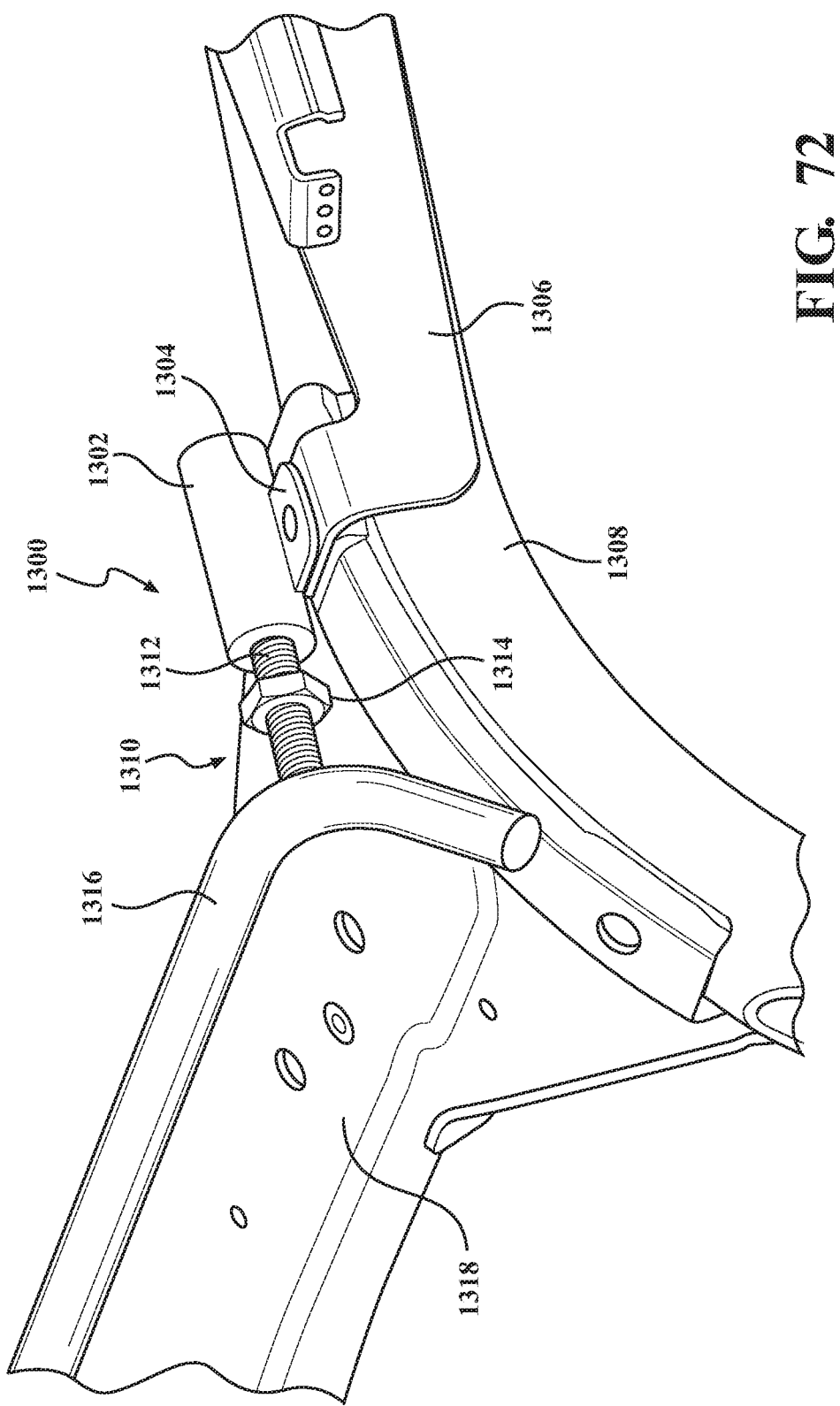
FIG. 72 is perspective view of a tensioning system incorporating an adjustable threaded member, with the cover and windows removed for clarity, connected to the SUV, according to the present invention.
Figure 73:
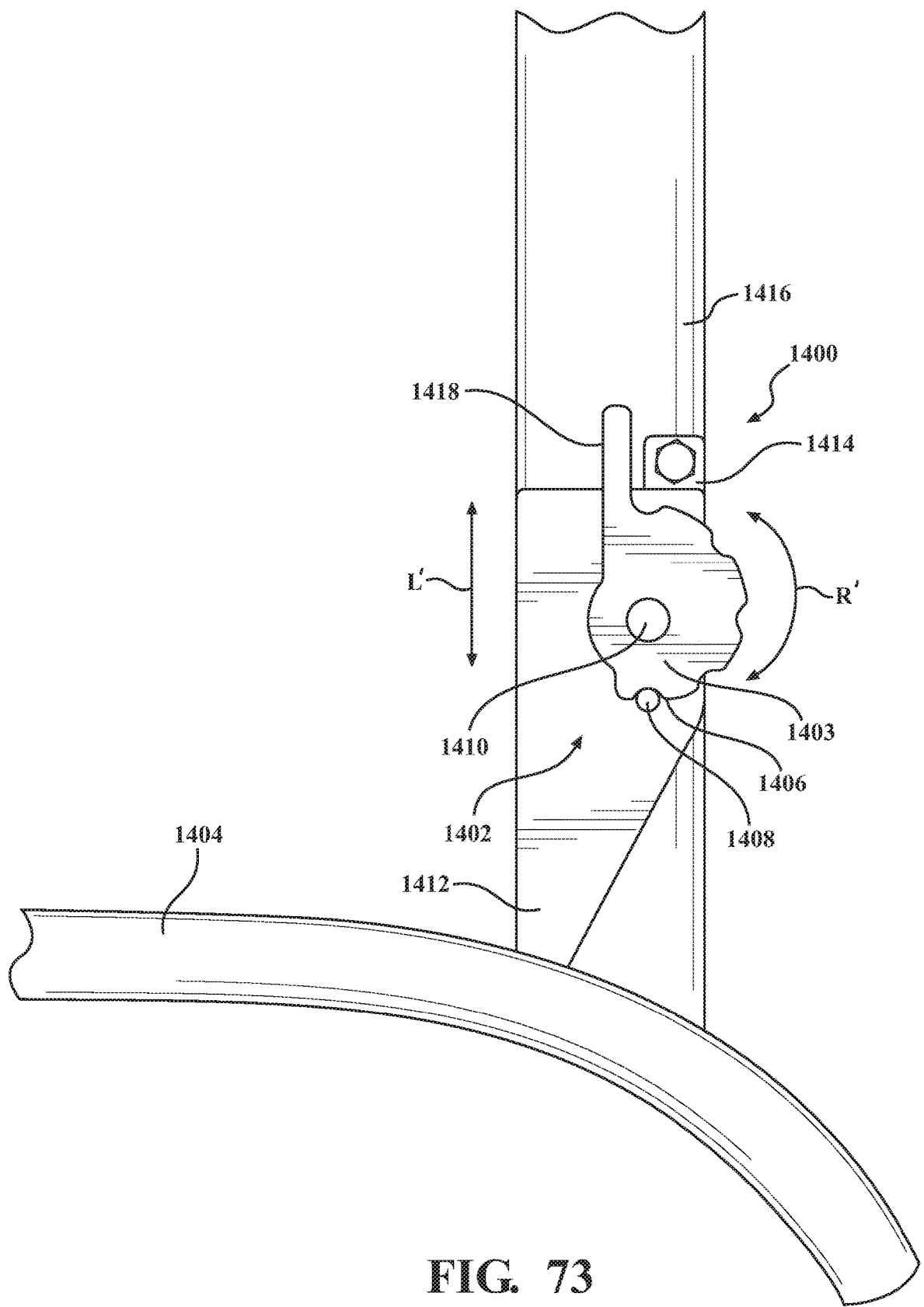
FIG. 73 is top plan view of a tensioning system incorporating a cam, with the cover and windows removed for clarity, connected to the SUV, according to the present invention.

Referring now to FIGS. 70-73 there is depicted adjustable tensioning devices or mechanisms to tension the top cover, as desired, e.g., to tension the top generally upward and rearward. It is understood that any of the adjustable tensioning mechanisms, and any of the soft top assemblies or parts described herein or shown in FIGS. 1-73, are adaptable for use on any aspect of the present invention, including integrating any aspects of the adjustable tensioning mechanism depicted in FIGS. 70-73 into any of the rear bow assemblies or soft top cover assemblies described or shown herein, including, but not limited to, assembly 10, 50, 80, 100, 200, 300, 400, 500, 600, 700, 900, depending on the particular application without departure from the scope of the present invention.

Figure 70:
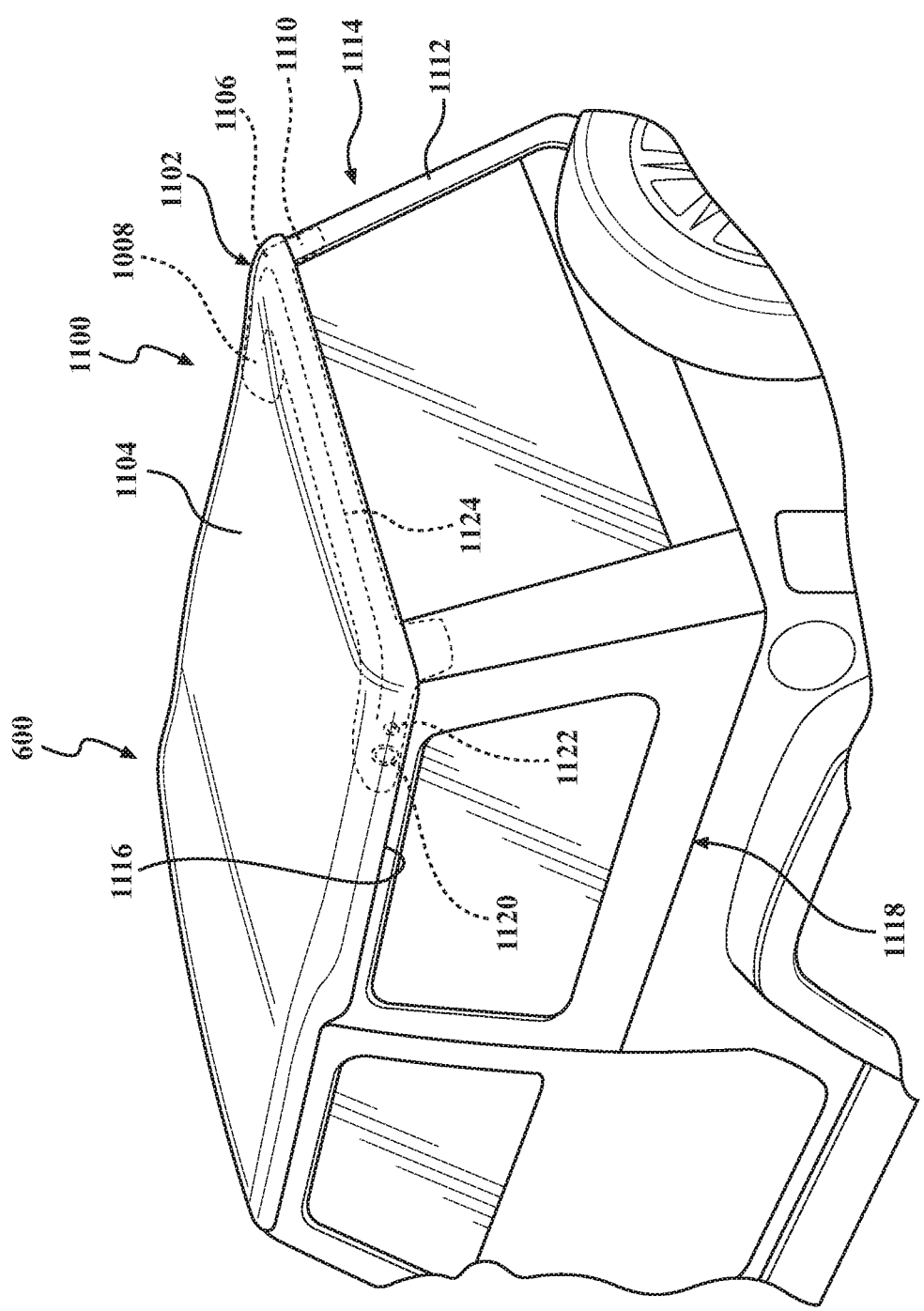
FIG. 70 is a perspective view of a tensioning system incorporated into the soft top assembly installed on a SUV, according to the present invention.

Referring more particularly to FIG. 70, at least one rearward fabric support assembly shown generally at 1100 is provided for incorporating into any of the soft top assemblies (e.g., 600, etc), according to the present invention. The rearward fabric support assembly 1100 includes at least one tensioning device 1102 that is inflatable, e.g., inflatable air bladder, and shaped to tension the soft top assembly. Alternatively, the tensioning device 1102 is an expandable foam or any other suitable material to expand and tension the top. The tensioning device 1102 is operably attached, indicated at 1124, to the cover 1104, e.g., to the inner surface of the top deck fabric, to set the generally rear position of the rearward fabric support assembly 1100. The tensioning device 1102 includes a cross car portion 1106 extending cross car generally at the rear of the top deck. When the vehicle has a rear cross car sport bar, the cross car portion 1106 rests generally over the cross car sport bar. The cover 1104 is attached by radio frequency welding. Alternatively, the attachment is by sewing, adhesive, fasteners, welding, sewn pocket in the fabric or any other suitable attachment. The tensioning device 1102 is a single piece or multiple pieces, e.g., three air bladders.

The tensioning device 1102 provides a mechanism to tension the top, e.g., tension the top generally upward and rearward. The tensioning device 1102 preferably includes the at least one cross car portion 1106, at least one pair of leg extensions 1108 and, optionally, at least one pair of downward extension portions 1110. The cross car portion 1106 extends cross car generally at the upper rear edge of the soft top assembly. The leg extensions 1108 are positioned generally on top of respective fore/aft sport bars. Each downward extension 1110 is positioned generally toward the top of a rear corner 1112 of the rear window panel, shown generally at 1114.

Adjustment of the tensioning device 1102 or inflation is preferably performed, when desired, after the soft top assembly is installed on the SUV. By way of example, the edge of the top deck 1116 is flipped up at the quarter window panel 1118 to access at least one inflation pump 1120 of the inflation portion 1102 to give an operator a custom fit after the top/fabric is installed. The inflation pump 1120 is an integrated internal quick inflation hand pump. Alternatively, the pump 1120 is an electric pump, external hand pump operated or any other pump suitable for inflation as desired. One inflation pump 1120 is depicted on the extension leg 1108, however, more inflation pumps 1120 are contemplated depending on the application without departure from the scope of the present invention. At least one inflation pump 1120 can be located in the cross car portion 1106 and/or either or both leg extensions 1108,1108 and/or downward extensions 1110.

At least one air valve 1122 is provided on the tensioning device 1102, such as a quick release air valve, to deflate tensioning of the top when desired. One air valve 1122 is depicted on the extension leg 1108, however, more air valves 1122 are contemplated depending on the application without departure from the scope of the present invention. At least one air valve 1122 can be located in the cross car inflation portion 1102 and/or either or both leg extensions 1108,1108.

FIG. 70 generally depicts the rearward fabric support assembly 1100 adapted to incorporate with the soft top cover assembly 600, which is exemplary and none limiting. It is understood that the adjustable rearward fabric support assembly 1100 and any of the soft top cover assemblies or parts herein can be integrated for tensioning the soft top including, but not limited to, assembly 10, 50, 80, 100, 200, 300, 400, 500, 600, 700, 900, etc depending on the particular application without departure from the scope of the present invention.

FIG. 70 generally depicts a 2-door SUV with the rearward fabric support assembly 1100 attached to the cover 1104 of any of the soft top assemblies. It is understood that the rearward fabric support assembly 1100 is adaptable for use with a 4-door SUV.

It is contemplated that the rearward fabric support assembly 1100 can eliminate the need for a cross car rear bow, according to an aspect of the present invention. It is contemplated that the cross car portion 1106 of the tensioning device 1102 is coupled to a rear bow of the soft top assembly depending on the application without departure from the scope of the present invention.

Referring more particularly to FIG. 71, at least one rearward fabric support assembly shown generally at 1200 is provided for incorporating into any of the soft top assemblies (e.g., 700, etc), according to the present invention. The rearward fabric support assembly 1200 includes at least one tensioning device 1202 that is inflatable, e.g., inflatable air bladder, and shaped to tension the soft top assembly. Alternatively, the tensioning device 1202 is an expandable foam or any other suitable material to expand and tension the top. The tensioning device 1202 rests on top of at least one sport bar 1208 and/or is operably attached to the cover, omitted for clarity, e.g., RF welded to the inner surface of the top deck fabric at the rear. Alternatively, when attached to the cover, the attachment is by sewing, adhesive, fasteners, welding, sewn pocket in the fabric or any other suitable attachment. The tensioning device 1202 is a single piece or multiple pieces, e.g., three air bladders.

The tensioning device 1202 provides a mechanism to tension the top, e.g., tension the top generally upward and rearward. The tensioning device 1202 preferably includes a pair of leg extensions 1204 and, optionally, a pair of downward extension portions 1206. The tensioning device 1202 sits generally on top of the cross car sport bar cross 1208. The leg extensions 1206 are positioned generally on top of respective fore/aft sport bars 1208,1208. Each downward extension 1206 is positioned generally toward the top of a rear corner of the rear window panel of downward angled portions 1210 of the sport bars 1208.

Adjustment of the rearward fabric support assembly 1200 or inflation is preferably performed, when desired, after the soft top assembly is installed on the SUV. By way of example, the edge of the top deck is flipped up at the quarter window panel to access at least one inflation pump 1212 of the tensioning device 1202 to give an operator a custom fit after the top/fabric is installed. The inflation pump 1212 is an electric pump with an on/off 1214 button or switch. Alternatively, the inflation pump 1212 is an integrated internal quick inflation hand pump or any other pump suitable for inflation as desired. One inflation pump 1212 is depicted on the extension leg 1204, however, more inflation pumps 1212 are contemplated depending on the application without departure from the scope of the present invention. At least one inflation pump 1212 can be located in the cross car inflation portion and/or either or both leg extensions 1204, 1204 and/or extension 1206,1206.

At least one air valve 1216 is provided on the tensioning device 1202, such as a quick release air valve, to deflate tensioning of the top when desired. One air valve 1216 is depicted on the extension leg 1204, however, more air valves 1216 are contemplated depending on the application without departure from the scope of the present invention. At least one air valve 1216 can be located in the cross car portion of the tensioning device 1202 and/or either or both leg extensions 1204,1204 and/or extensions 1206,1206.

According to a particularly preferred aspect of the present invention, which aspect is exemplary and none limiting, the rearward fabric support assembly 1200 is incorporated with the soft top cover assembly 700. It is understood that the adjustable rearward fabric support assembly 1200 and any of the soft top cover assemblies or parts herein can be integrated for tensioning the soft top including, but not limited to, assembly 10, 50, 80, 100, 200, 300, 400, 500, 600, 700, 900, etc depending on the particular application without departure from the scope of the present invention.

Referring more particularly to FIG. 72, a rearward fabric support assembly shown generally at 1300 is provided for incorporating into any of the soft top assemblies (e.g., 600, 700, etc), according to the present invention. By way of example, the rearward fabric support assembly is identical to FIG. 33 except the adjustment for fabric tensioning is done with a tensioning device shown generally at 1310 that includes a threaded member 1312, rather than a compression spring. A particularly preferred environment of use for the rearward fabric support assembly 1300 is a 4-door SUV, however, the assembly 1300 is adaptable for incorporating on a 2-door SUV or any other suitable type of motor vehicle and incorporation with any soft top assembly (e.g., 600, 700, 900, etc), in accordance with the present invention.

The tensioning device 1310 includes a mounting bracket 1304 operably connected to the vehicle by at least one fastener, preferably, to a bracket 1306 or rail operably connected to a sport bar 1308 adjacent a rear cross car member 1318 of the vehicle. The mounting bracket 1304 is operably connected to a tube 1302 that is a threaded tube. A threaded member 1312 is received in the threaded tube 1302 to move generally fore/aft. The other end of the threaded member 1312 is operably connected to a rear bow 1316. A tensioning nut 1314, e.g., of a jack screw nut, is received on the threaded member 1312 to move the threaded member 1312, and thereby the rear bow 1316, generally rearward to tension the top deck of the soft top assembly and generally forward to release the tension a desired amount, when desired.

Typically, the fabric is attached to the rear bow by snaps allowing the customer to completely remove the fabric without tools when desired. Alternatively, attachment is contemplated, e.g., adhesive, sewn pocket(s), and/or fastener(s) such as screws, etc, depending on the application without departure from the scope of the present invention.

It is understood that the rear bow 1316 can additionally be operably connected to a rear bow upright pivotally connected to the vehicle, e.g., sport bar, at a knuckle with a quick release member, as set forth previously, according to an aspect of the present invention.

According to a particularly preferred aspect of the present invention, which aspect is exemplary and none limiting, the rearward fabric support assembly 1300 is incorporated with the soft top cover assembly 600. It is understood that the adjustable rearward fabric support assembly 1300 and any of the soft top cover assemblies or parts herein can be integrated for tensioning the soft top including, but not limited to, assembly 10, 50, 80, 100, 200, 300, 400, 500, 600, 700, 900, etc depending on the particular application without departure from the scope of the present invention.

Referring more particularly to FIG. 73, a rearward fabric support assembly shown generally at 1400 is provided for incorporating into any of the soft top assemblies (e.g., 600, 700, 900, etc), according to the present invention. The assembly 1400 incorporates a cam style bracket which allows an operator to change the front to back position of the rear bow to adjust for fabric tension and reduce installation effort. The assembly 1400 has a tensioning device shown generally at 1402 with a cam 1403, preferably, an eccentric cam, to adjust the rear bow 1404 front to back by indexing the cam bracket 1412 between fixed positions. The cam 1403 includes a plurality of recesses 1406 formed in the cam 1403 that receive a pin 1408 connected to the bracket 1412 for adjustment. The cam 1403 is operably connected to the bracket 1412 such as by fastener 1410. The bracket 1412 is operably connected to the rear bow 1404, e.g., welded. Preferably, the rear bow 1404 is mounted to the sport bar with existing fasteners using the rotating eccentric cam 1403 to adjust the rear bow 1404 front/back by indexing the cam bracket between fixed positions generally defined by the recesses 1406. The cover is operably connected to the rear bow 1404, e.g., such as by a bracket connected to the bracket with the cover snapped or fastened with fasteners to the rear bow, as set forth previously. Preferably, both ends of the rear bow 1404 have a tensioning device 1402 with corresponding recesses 1406.

Optionally, at least one mounting bracket 1414 connects the bracket 1412 to the sport bar 1416, preferably, the rearward fore/aft sport bar 1416. Preferably, the mounting bracket 1414 includes a slot to receive the fastener, e.g., bolt, to slide back and forth. Alternatively, no mounting bracket 1414 is provided and rather the bracket 1412 is only connected to the rear bow 1404, e.g., welded, in a position adjacent to the sport bar 1416.

A handle 1418 is provided for an operator to grasp to turn the cam 1402 about pivot point 1410. As the cam 1403 rotates in either direction, as indicated by arrow "R'", the recesses 1406 are brought into engagement with the pin 1408, respectively, where the position is held until desired release. The rotation of the cam 1403 moves the assembly 1400 generally front/back, as indicated by arrow "L'".

It is understood that the rear bow 1404 can additionally be operably connected to a rear bow upright pivotally connected to the vehicle, e.g., sport bar, at a knuckle with a quick release member, as set forth previously, according to an aspect of the present invention.

Typically, the fabric is attached to the rear bow by snaps allowing the customer to completely remove the fabric without tools when desired. Alternatively, attachment is contemplated, e.g., adhesive, sewn pocket(s), and/or fastener(s) such as screws, etc, depending on the application without departure from the scope of the present invention.

According to a particularly preferred aspect of the present invention, which aspect is exemplary and none limiting, the rearward fabric support assembly 1400 is incorporated with the soft top cover assembly 600. It is understood that the adjustable rearward fabric support assembly 1400 and any of the soft top cover assemblies or parts herein can be integrated for tensioning the soft top including, but not limited to, assembly 10, 50, 80, 100, 200, 300, 400, 500, 600, 700, 900, etc depending on the particular application without departure from the scope of the present invention.

A particularly preferred environment of use for the rearward fabric support assembly 1400 is a 4-door SUV, however, the assembly 1400 is adaptable for incorporating on a 2-door SUV or any other suitable type of motor vehicle and incorporation with any soft top assembly (e.g., 600, 700, 900, etc), in accordance with the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A folding/slanted back soft top assembly for a sport utility vehicle, comprising:
    a pivotal portion operably coupled to the sport utility vehicle and selectively pivotal between a closed position and at least one open position;
    a cover including a top deck operably coupled to the pivotal portion, wherein said top deck closes off an opening of the vehicle when in the closed position, and selectively pivoting the pivotal portion uncovers said opening of the vehicle;
    a rear window operably selectively coupled to the top deck and operably coupled to the vehicle;
    a rearward fabric support assembly positioned toward the rear underside of the top deck and providing adjustment for tensioning the cover.

2. The folding/slanted back soft top assembly of claim 1, wherein the rearward fabric support assembly includes at least one tensioning device that is adjustable to tension the top deck when desired.

3. The folding/slanted back soft top assembly of claim 1, wherein the rearward fabric support assembly includes at least one tensioning device that is an air bladder that is inflatable/deflatable when desired.

4. The folding/slanted back soft top assembly of claim 3, wherein the air bladder includes a cross car portion that rests upon at least a rear cross car sport bar.

5. The folding/slanted back soft top assembly of claim 3, wherein the air bladder includes a pair of leg extensions that rest upon respective fore/aft sport bars.

6. The folding/slanted back soft top assembly of claim 3, wherein the air bladder includes a pair of downward extensions that rest upon respective sport bars.

7. The folding/slanted back soft top assembly of claim 3, wherein the air bladder is operably connected to the underside of the top deck.

8. The folding/slanted back soft top assembly of claim 7, wherein the air bladder is radio frequency welded to the top deck.

9. The folding/slanted back soft top assembly of claim 3, wherein the at least one tensioning device includes at least one inflation pump to inflate the bladder to increase tensioning on the top deck as desired.

10. The folding/slanted back soft top assembly of claim 9, wherein the inflation pump is an electric pump.

11. The folding/slanted back soft top assembly of claim 9, wherein the inflation pump is an inflation hand pump.

12. The folding/slanted back soft top assembly of claim 3, wherein the at least one tensioning device includes at least one air valve to deflate the air bladder to decrease tensioning on the top deck as desired.

13. The folding/slanted back soft top assembly of claim 1, wherein the rearward fabric support assembly includes at least one tensioning device that operably moves fore/aft to increase/decrease tensioning on the top deck when desired.

14. The folding/slanted back soft top assembly of claim 1, wherein the rearward fabric support assembly includes a rear bow and at least one tensioning device, said rear bow selectively attached to the top deck and operably connected to said at least one tensioning device, said tensioning device operably moves the rear bow fore/aft to increase/decrease tensioning on the top deck when desired.

15. The folding/slanted back soft top assembly of claim 1, wherein the rearward fabric support assembly includes a rear bow selectively attached to the top deck and operably connected to at least one tensioning device that includes a threaded tube and a jack screw nut to move the rear bow fore/aft to increase/decrease tensioning on the top deck when desired.

16. The folding/slanted back soft top assembly of claim 1, wherein the rearward fabric support assembly includes a rear bow selectively attached to the top deck and operably connected to at least one tensioning device that includes a rotatable cam with a plurality of recesses to move the rear bow fore/aft to increase/decrease tensioning on the top deck when desired.

17. The folding/slanted back soft top assembly of claim 1, wherein the rearward fabric support assembly includes a fixed pin received within a respective one of said plurality of recesses as the cam is turned to said recess by an operator to retain the tensioned position until the cam is again rotated to another recess to increase/decrease the tension to the top deck, as desired.

18. The folding/slanted back soft top assembly of claim 1, wherein the rearward fabric support assembly is positioned to set the height of the top deck and rear window.

19. The folding/slanted back soft top assembly of claim 1, wherein the rear window is slanted downward and rearward to the vehicle at an angle of at least about 15 degrees.

20. The folding/slanted back soft top assembly of claim 1, further comprising a pair of quarter windows operably connected to the top deck and to the rear window.

21. The folding/slanted back soft top assembly claim 20, wherein the rear window and pair of quarter windows are selectively slideably connected to the top deck.

22. The folding/slanted back soft top assembly claim 1, further comprising a tailgate bar slideably connected to the rear window, said tailgate bar operably connected to the vehicle adjacent a tailgate.

23. A folding/slanted back soft top assembly for a sport utility vehicle, comprising:
  a pivotal portion operably coupled to the sport utility vehicle and selectively pivotal between a closed position and at least one open position;
  a cover including a top deck operably coupled to the pivotal portion, wherein said top deck closes off an opening of the vehicle when in the closed position, and selectively pivoting the pivotal portion uncovers said opening of the vehicle;
  a rear window operably selectively coupled to the top deck and operably coupled to the vehicle;
  a rearward fabric support assembly positioned toward the rear underside of the top deck and including a tensioning device for adjustment and tensioning of the top deck as desired.

24. A folding/slanted back soft top assembly for a sport utility vehicle, comprising:
  a pivotal portion operably coupled to the sport utility vehicle and selectively pivotal between a closed position and at least one open position;
  a cover including a top deck operably coupled to the pivotal portion, wherein said top deck closes off an opening of the vehicle when in the closed position, and selectively pivoting the pivotal portion uncovers said opening of the vehicle;
  a rear window operably selectively coupled to the top deck and to the vehicle;
  a pair of quarter windows selectively coupled to the top deck and to the vehicle;
  a rearward fabric support assembly positioned toward the rear underside of the top deck and including a tensioning device for adjustment and increased/decreased tensioning of the top deck and rear window as desired after the folding/slanted back soft top assembly is installed on the vehicle.

* * * * *